INVENTOR.
Richard K. Richards

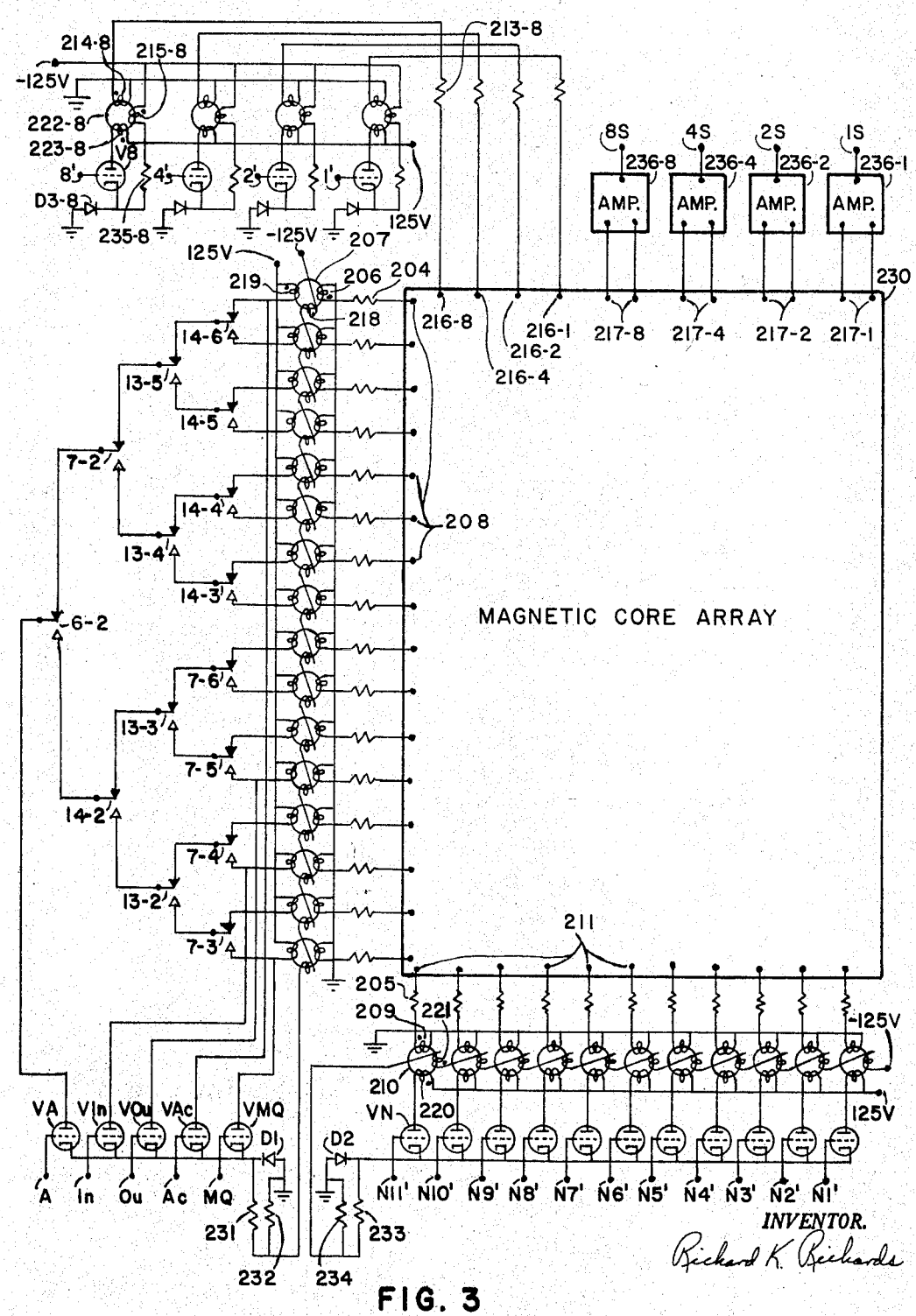

Aug. 9, 1966   R. K. RICHARDS   3,265,875
ELECTRONIC CALCULATOR
Filed Nov. 19, 1962   18 Sheets-Sheet 4
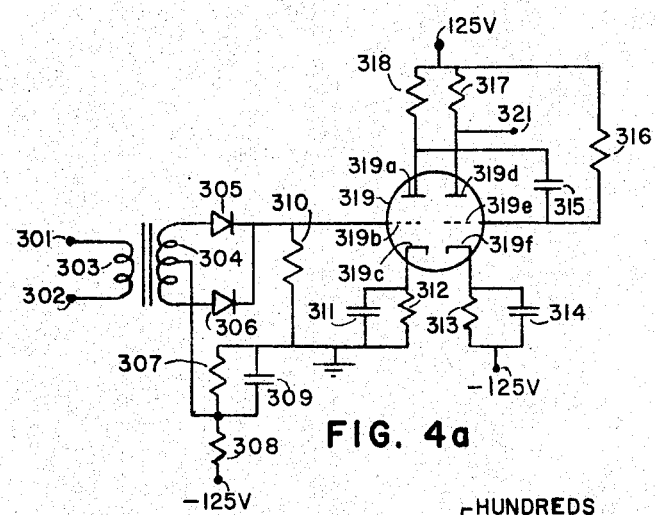
FIG. 4a
FIG. 4b
FIG. 4c
INVENTOR.
Richard K. Richards Aug. 9, 1966  R. K. RICHARDS  3,265,875
ELECTRONIC CALCULATOR Filed Nov. 19, 1962   18 Sheets-Sheet 5

INVENTOR.
Richard K. Richards

Aug. 9, 1966 R. K. RICHARDS 3,265,875
ELECTRONIC CALCULATOR
Filed Nov. 19, 1962 18 Sheets-Sheet 6

INVENTOR.
Richard K. Richards

INVENTOR.
Richard K. Richards

|   |       | T1 | T2 | T3 | T4    | T5   | T6   | T7 | T8     |       |
|---|-------|----|----|----|-------|------|------|----|--------|-------|
|K1 |       | O  | D  | In |       | U    | Read | In*|        | D     | O |
|K2 | Ar    | O  | U  | A  |       |      |      | Ac*|        |       | 11 |
|   | Ad    | O  | U  | A  |       |      | I    | Ac |        |       | 0/11 |
|   | Sr    | O  | U  | A  | 9's   |      |      | Ac*|        |       | 11 |
|   | Su    | O  | U  | A  | 9's   |      | I    | Ac |        |       | 0/11 |
|   | Ry    | O  | U  | A  | 9's   |      | I    | Ac |        |       | 0/11 |
|   | Ta    | O  | U  | Ac |       |      |      | A* |        |       | 11 |
|   | Al    | O  | U  |    |       |      | I    | A  |        |       | 11 |
|   | Ti    | O  | U  | In |       |      |      | A* |        |       | 11 |
|   | To    | O  | U  | A  |       |      | Type | Ou*|        |       | 0/11 |
|   | Le, Ri| O  | D  | Ea |       | 9's  |      | MQ*|        |       | 11 |
|   | Mu    | O  | U  |    |       |      |      | Ac*|        |       | 11 |
|   | Ha    | O  | U  | E5 |       |      |      | Ac |        |       | 0/11 |
|   | Di    | O  | U  |    |       |      |      | MQ*|        |       | 0 |
|   | Nn    | O  | U  |    |       |      |      |    |        |       | 11 |
|K3 | Ad, Su| O  | U  |    |       | 9's  |      | Ac |        |       | 11 |
|   | Ry    | O  | U  |    |       |      |      | Ac*|        |       | 11 |
|   | Mu    | 11 | U  | A  |       |      |      | Ac |        |       | 11 |
|   | Ha    | O  |    | I  |       | U, 9's| I   | Ac |        |       | 11 |
|   | Di    | O  | U  | A  |       | 9's  | I    | Ac |        |       | 0/11 |
|   | To    | O  | U  | A  |       | 9's  |      | Ou*|        |       | 11 |
|K4 | Mu, Le, Ri | 11 |   |    |      |      | I    | MQ |        | D (if C̄) | 10/11 |
|   | Di    | O  | U  |    |       |      | I    | MQ |        | D     | 0 |
|K5 | Di    | 11 | U  | A  |       |      |      | Ac |        |       | 11 |
|K6 | Ti    | 11 | U  |    |       |      |      | In*|        |       | 11 |
|   | Mu    | 11 | D  |    |       | 9's  |      | MQ |        | U     | 11 |
|   | Di    | 11 |    |    |       |      | I    | MQ |        | D (if C̄) | 10/11 |
|K7 | Le    | 10 |    |    |       |      |      |    |        |       | 10 |
|   | Ri    | 10 | U  |    |       |      |      |    |        | U     | 0 |
|   | Mu, Di| 10 | D  | MQ |       | U    |      | MQ*|        | D     | 11 |
|K8 | Le    | 10 | D  | Ac |       | U    |      | Ac*|        | D     | 11 |
|   | Ri    | O  | U  | Ac |       | D    |      | Ac*|        | U     | 11 |
|   | Mu    | 11 | D  | Ac |       | U    |      | Ac*|        | D     | 11 |
|   | Di    | 11 | D  | Ac |       | U    |      | Ac*|        | D     | 0 |
|K9 |       | O  | D  | Ou |       | U    | Type | Ou*|        | D     | 0 |

FIG. 17

United States Patent Office 3,265,875
Patented August 9, 1966

3,265,875
ELECTRONIC CALCULATOR
Richard K. Richards, 1821 Allen Ave., Ames, Iowa
Filed Nov. 19, 1962, Ser. No. 238,347
5 Claims. (Cl. 235—160)

This invention pertains to electronic calculating machines, accounting machines, computers, tabulators, and the like. In particular, it pertains to an improved organizational structure of such machines.

Electronic machines for performing computing and accounting functions are now well known to the art and are widely used. Numerous designs and variations have been devised, but in general they fall into two categories. One category, for which the term "computer" is generally used, involves what is known as a stored program for the control of the sequencing of operations. Stored-program computers require a very large number of components and are accordingly very expensive. The other category, for which the machines are variously called "calculators," "accounting machines," or "tabulators," utilize plug boards, pin boards, punched cards, punched tape, or perhaps still other means for controlling the sequencing of operations. Although somewhat less costly than stored-program computers, the machines of this second category have still tended to be considerably more costly than is economical for use in relatively small businesses, branch offices, and other establishments that do not have a really substantial volume of computing to be performed.

In order to reduce the cost of calculating equipment, many designers have adopted the now well-known binary system of numbers whereby, for example, the decimal number 229 would be represented by the binary number 11100101. Although the binary number system is quite satisfactory for some applications, it has obvious serious disadvantages in those applications for which the input data and the output data are in the decimal system customarily used by people, as is the case for substantially all accounting or bookkeeping applications.

Also, the "programming," that is, the setting up of a machine to perform a particular calculating sequence, of currently available equipment tends to be a complex problem generally requiring a substantial course of instruction and in many instances requiring heavy expensive hardware such as plugboards, each with a maze of wires.

Accordingly, it is a major object of this invention to provide a calculating machine that is relatively low in cost and which at the same time utilizes the familiar decimal number system and which is also adaptable to performing calculating sequences of substantial length and complexity, especially as required for accounting applications.

Another object is to provide a calculating machine that is easy to program relative to the complexity of the arithmetic operations that are required to be performed.

Numerous other objects will become apparent in the following description and claims, which together with the drawings, disclose a preferred embodiment of the invention.

The various objectives are achieved through a novel logical structure of the machine, that is a novel arrangement of the "and" circuits, "or" circuits, gates, flip-flops, storage array, and other elements which comprise a calculating machine. An important feature of the logical arrangement is that there are no control circuits specifically assigned to the operations of ADD, MULTIPLY, SHIFT RIGHT, and so on. Instead, there is a set of flop-flops which are used for all of the operations. These produce a set of "state" signals designated K1 through K9 that control the various parts of the machine in a manner to be hereinafter described in detail. In the course of performing an operation, the machine changes from one state to another, and while the machine is in any given state it performs functions that are dependent on the state and on the operation being performed. Another feature of the machine is that there are no physical registers for storing numbers (except a single one-digit register) other than the storage positions in the main storage unit. Instead, certain storage locations in the main storage unit are designated as having register functions, although the physical and electrical characteristics of these registers are identical to the characteristics of all of the other storage locations in the storage unit. These registers are designated the Accumulator, Input Register, Output Register, and Multiplier-Quotient Register. Also, these registers are addressable in the same manner as any of the other storage registers. Still another feature of the machine is that there are no circuits specifically assigned to shifting numbers to the right and left as required in the SHIFT RIGHT and SHIFT LEFT operations and as are required in the course of the MULTIPLICATION and DIVISION operations. Instead, shifting action is gained through the means of an Up-down Counter that controls the selection of the digit position to be actuated in the storage unit.

In the preferred embodiment of the invention a serial digit-by-digit scheme is used for entering the data to the input of the machine and also for transmitting the results to the output device. The internal calculating circuits also function in a serial digit-by-digit manner. However, the individual bits of each decimal digit, represented in the conventional 8-4-2-1 code, are transmitted in parallel in both the input-output circuits and in the calculating circuits.

The input data to the machine can be supplied by any device that supplies one digit at a time. The preferred embodiment employs an IBM-type punched card which is sensed from one end to the other. Also, the output digits can be transmitted to any device that will accept one digit at a time, specifically, for example, a typewriter. For parallel transmission of the digits of a number to and from the machine, storage buffers would ordinarily be used wherein these buffers are capable of accepting digits in one form and transmitting them in the other form as regards to serial or parallel.

Also, in the preferred embodiment, a punched card is used for the sequencing and control of the calculator with 12 holes being sensed simultaneously for the control of each instruction. The 12 holes correspond to the 12 holes in a given column of a standard IBM card, but control information could come from any other source such as two 6-hole paper tape units or even from an electronic storage unit of some sort.

The 12 information bits that are obtained from the simultaneous sensing of the 12 holes form a two-part instruction. One part is called an electronic instruction because it controls electronic circuits that perform the arithmetic operations of ADD, MULTIPLY, SHIFT RIGHT, and so on. The electronic instruction has an operation portion and an address portion not unlike the operation and address portions of conventional stored-program computers. The electronic instruction consumes 4 bits for the operation portion and 4 bits for the address portion. The other part is called the mechanical instruction, and it consumes the remaining 4 of the 12 bits. The mechanical instruction controls such things as the electro-mechanical transmission of a digit to the output mechanism, the advancing of paper in the output mechanism, the change to an alternate source of succeeding instructions, and the printing of special characters and symbols.

A fundamental difference between the electronic and mechanical instructions is that each electronic instruction pertains to entire numbers, which are of 10-digit-plus-sign length in the preferred embodiment, whereas each mechanical instruction pertains only to a single digit or to an operation controlled by a single pulse distributed to a specified circuit. In other words, as the machine proceeds through successive 12-hole columns of the punched program card, the machine at the reading of each 12 holes performs one complete 10-digit-plus-sign arithmetic operation internally and one 1-digit operation or one "one-pulse" operation externally.

Ordinarily, the device supplying the input digits operates in step with the device supplying the program of instructions. That is, for each two-part instruction that is executed by the machine, one digit is entered into the machine from the input device. Inasmuch as the mechanical instruction controls the output of digits, the output mechanism also operates in step with the device supplying the program of instructions in the sense that one digit per step of operation is supplied to the output mechanism. In actual timing, the output mechanism may lag the program mechanism in phase. An exception to this in-step operation can occur when, through a mechanical instruction or otherwise, the input mechanism is caused to be inoperative, in which case the programming device proceeds with operations on data already in the machine. Also, of course, the program may not call for any output functions on many program steps.

In the figures:

FIGURE 3 shows the details of the Storage Unit and also the Storage Output Amplifiers and the major Address Contacts represented by blocks 118, 129, and 112, respectively, in FIGURE 1.

FIGURES 4a and 4b show the circuit and symbol, respectively, for the individual amplifiers used in the Storage Output Amplifiers appearing in FIGURE 3 and represented by block 129 in FIGURE 1.

FIGURE 4c is a chart showing the arrangement of storage positions and registers in the Storage Unit.

Figure 1:
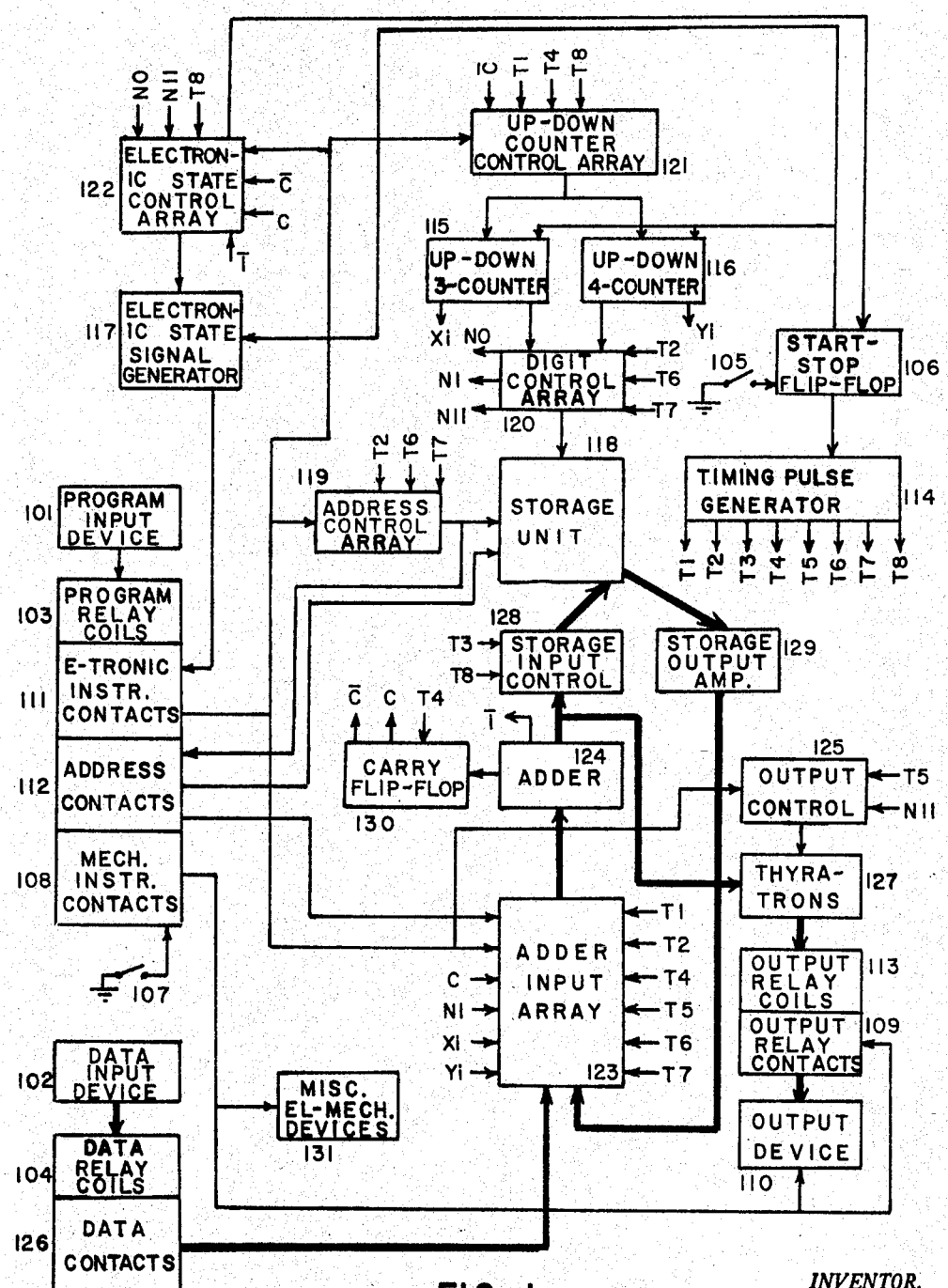
FIGURE 1 shows a block diagram of the calculator of this invention.
Figure 7:
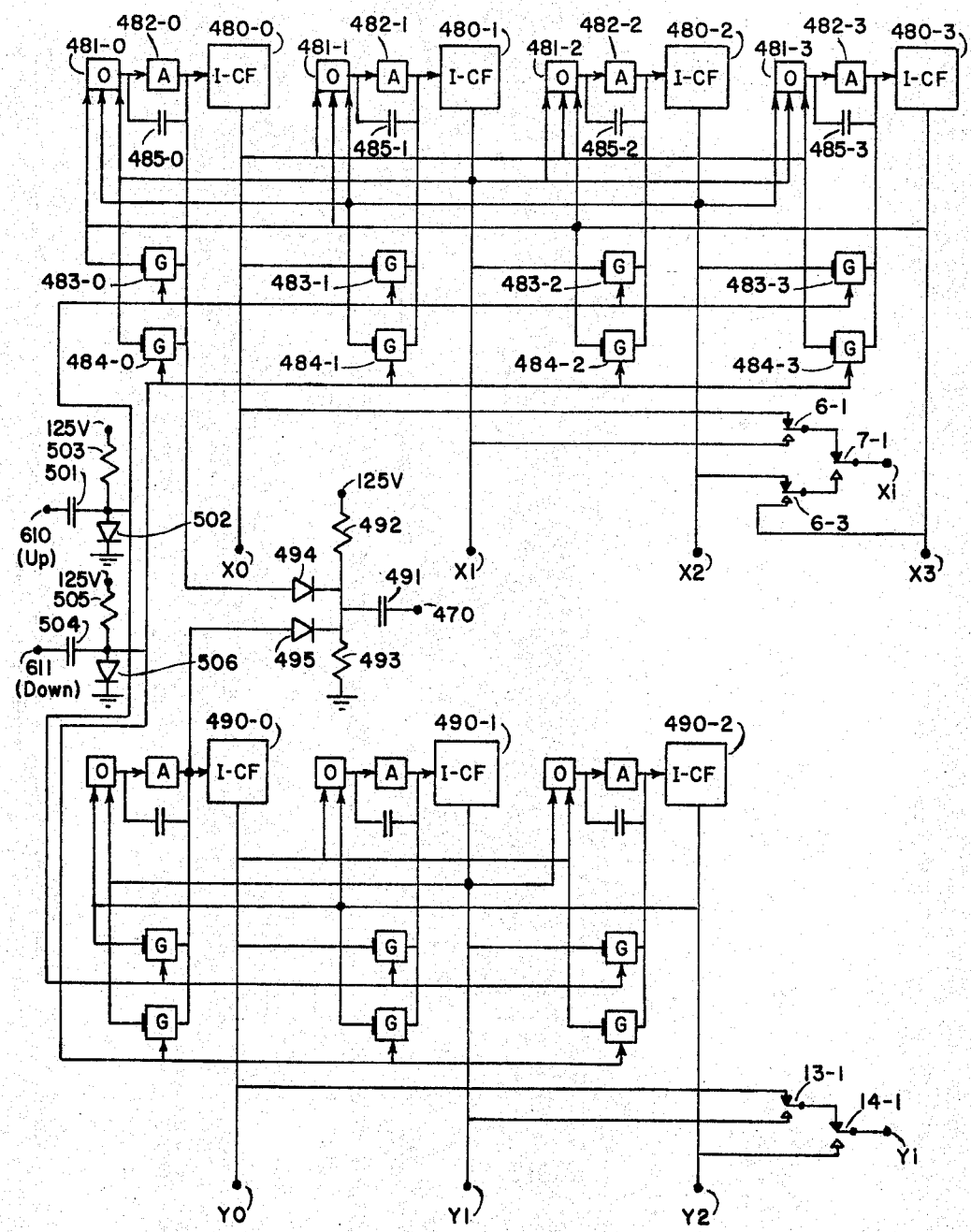

FIGURE 7 shows the details of the Up-down 4-Counter and Up-down 3-Counter represented by blocks 116 and 115, respectively, in FIGURE 1.

Figure 8A:
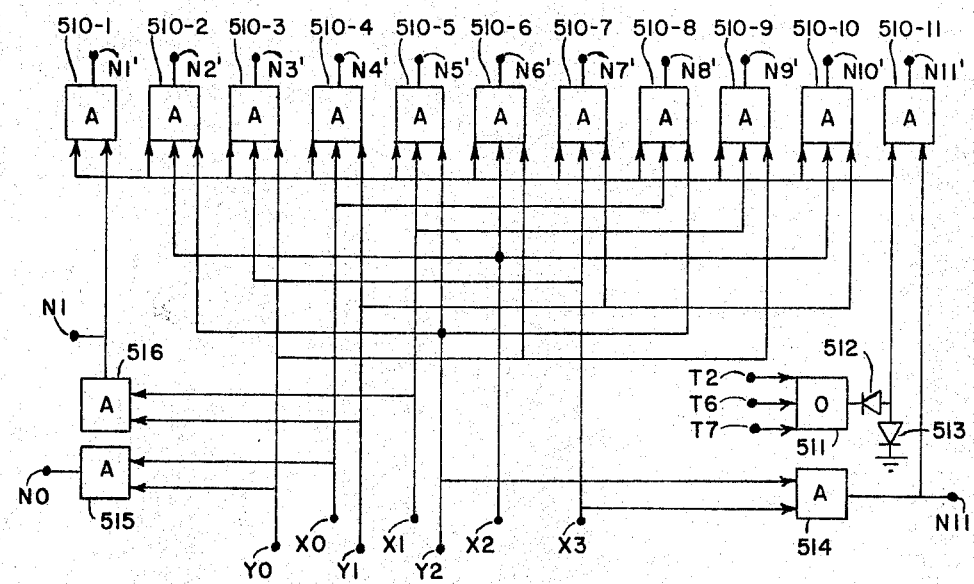

FIGURE 8a shows the details of the Digit Control Array represented by block 120 in FIGURE 1.

Figure 8B:
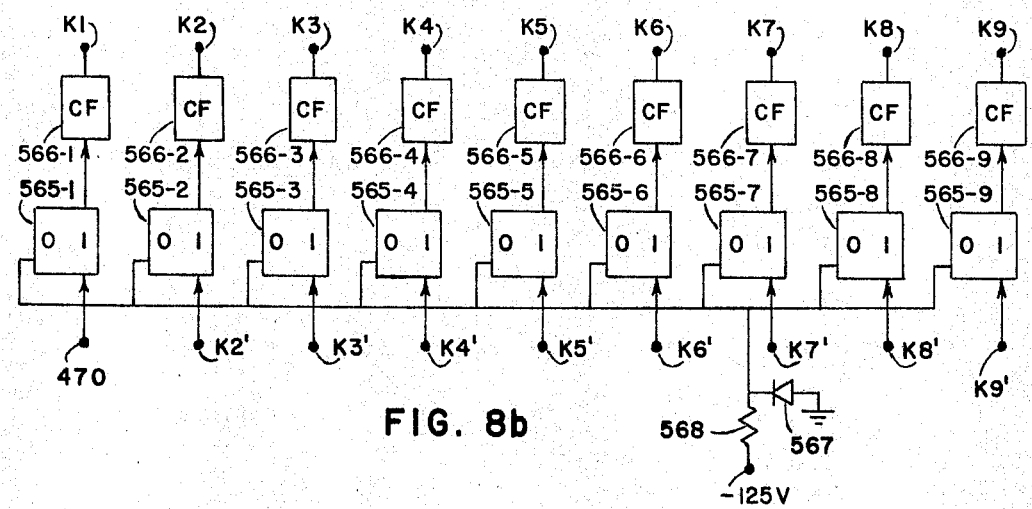

FIGURE 8b shows the details of the Electronic State Signal Generator represented by block 117 in FIGURE 1.

Figure 9:
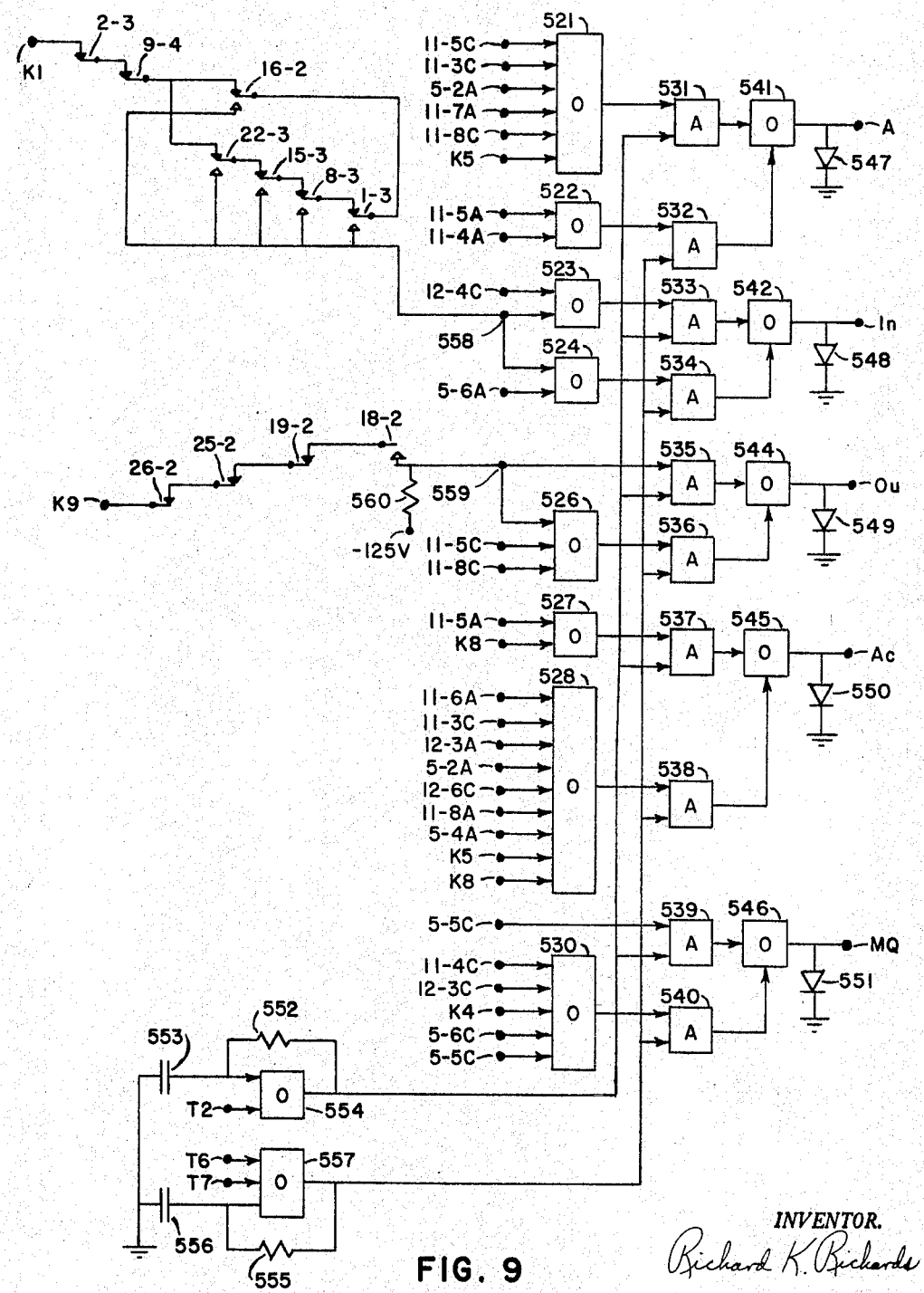

FIGURE 9 shows the details of the Address Control Array represented by block 119 in FIGURE 1.

Figure 10:
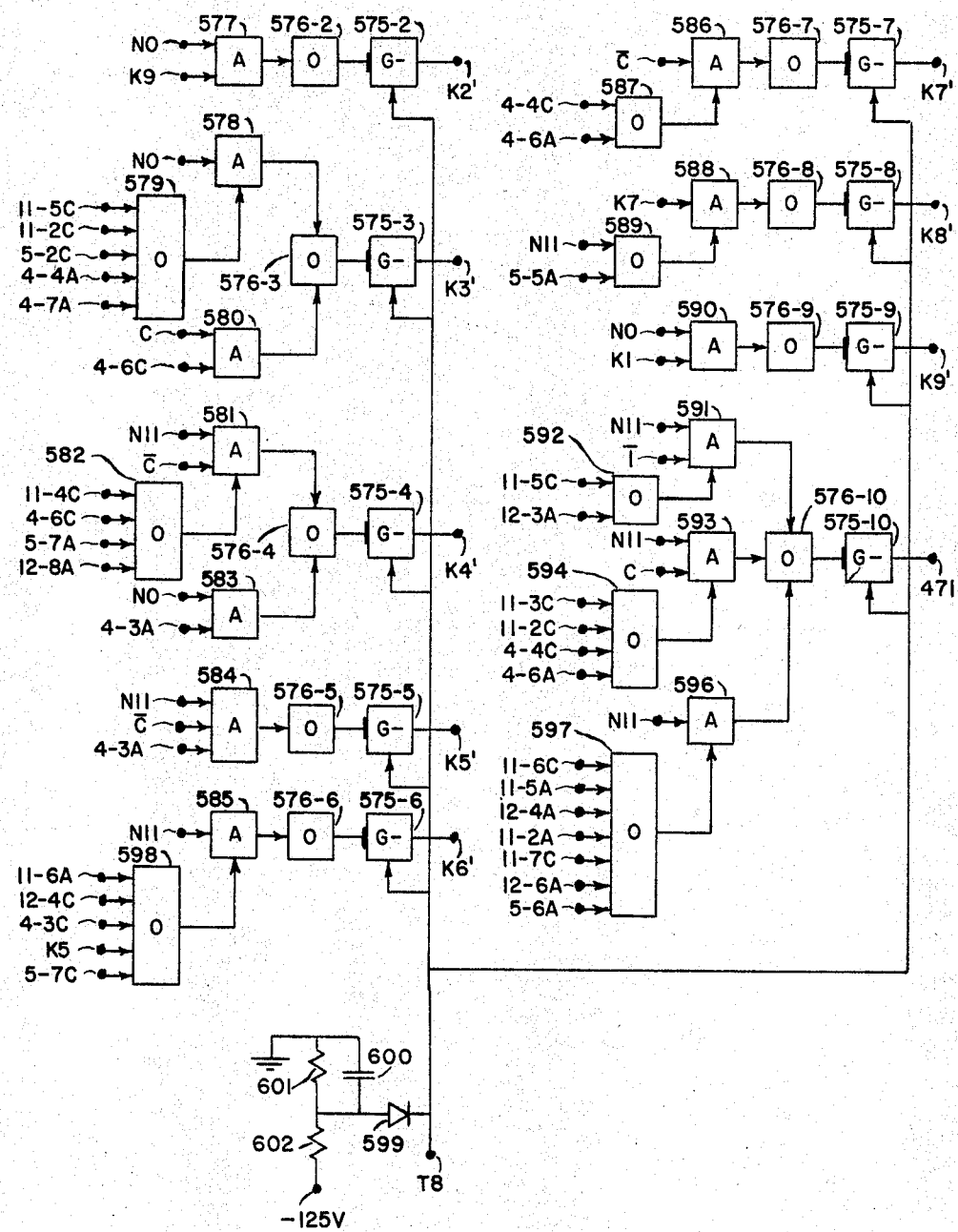

FIGURE 10 shows the details of the Electronic State Control Array represented by block 122 in FIGURE 1.

Figure 11:
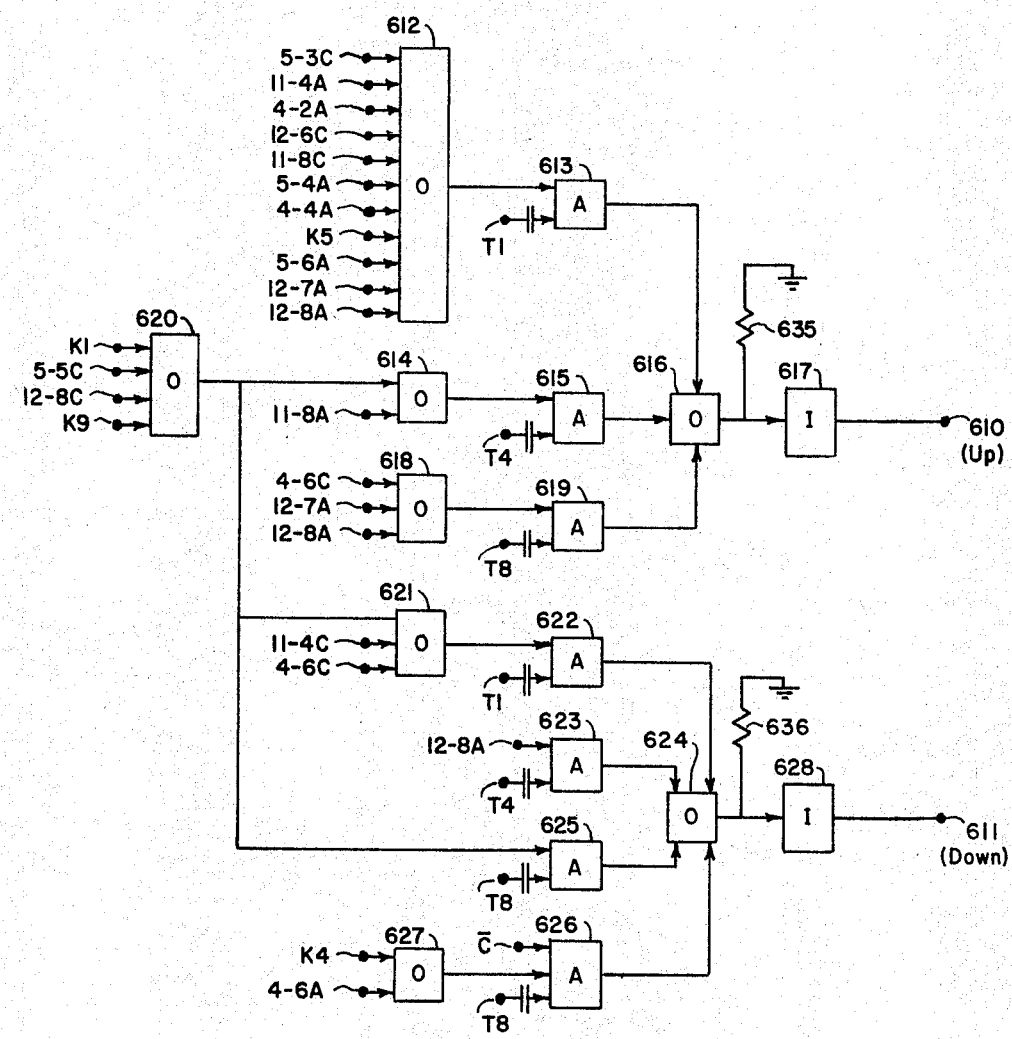

FIGURE 11 shows the details of the Up-down Counter Control Array represented by block 121 in FIGURE 1.

Figure 12A:
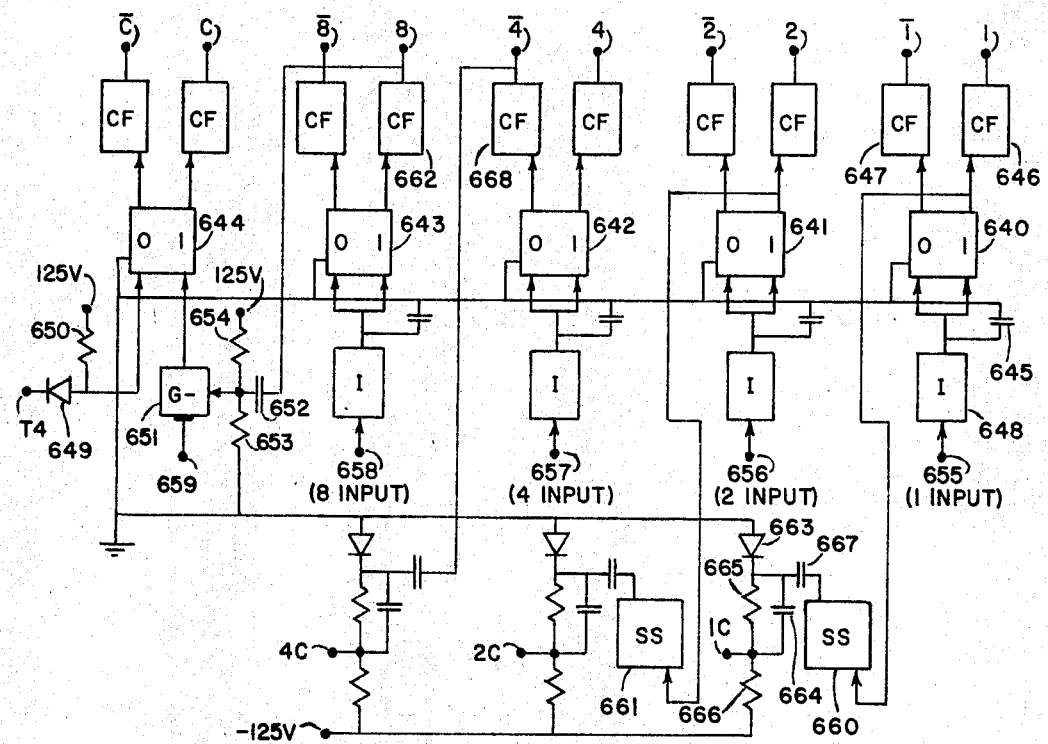

FIGURE 12a shows the details of the Adder and Carry Flip-Flop represented by blocks 124 and 130, respectively, in FIGURE 1.

Figure 12B:
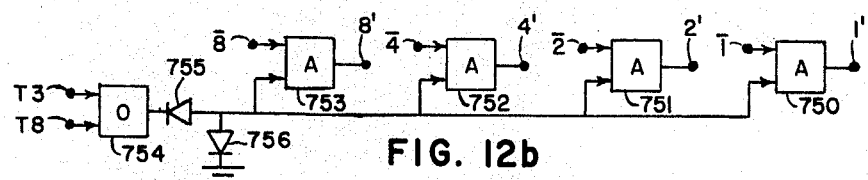

FIGURE 12b shows the details of the Storage Input Control represented by block 128 in FIGURE 1.

Figure 12C:
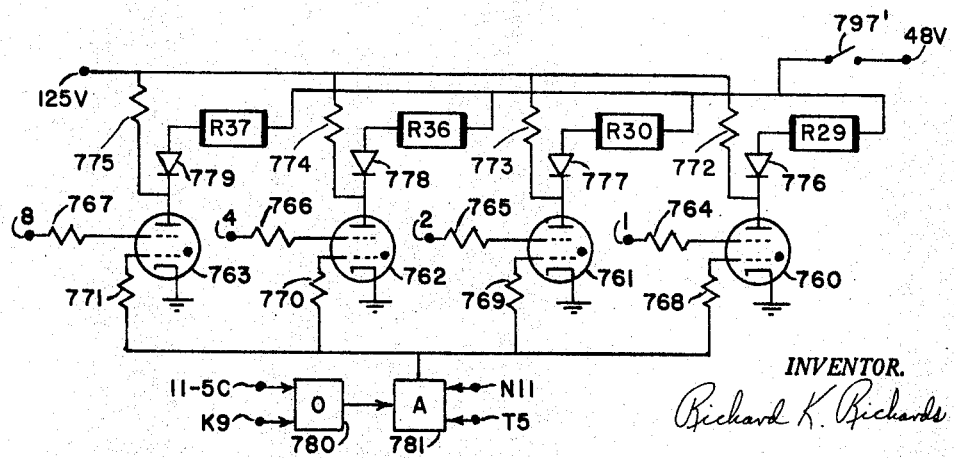

FIGURE 12c shows the details of the Output Control, Thyratrons, and Output Relay Coils represented by blocks 125, 127, and 113, respectively, in FIGURE 1.

Figure 13:
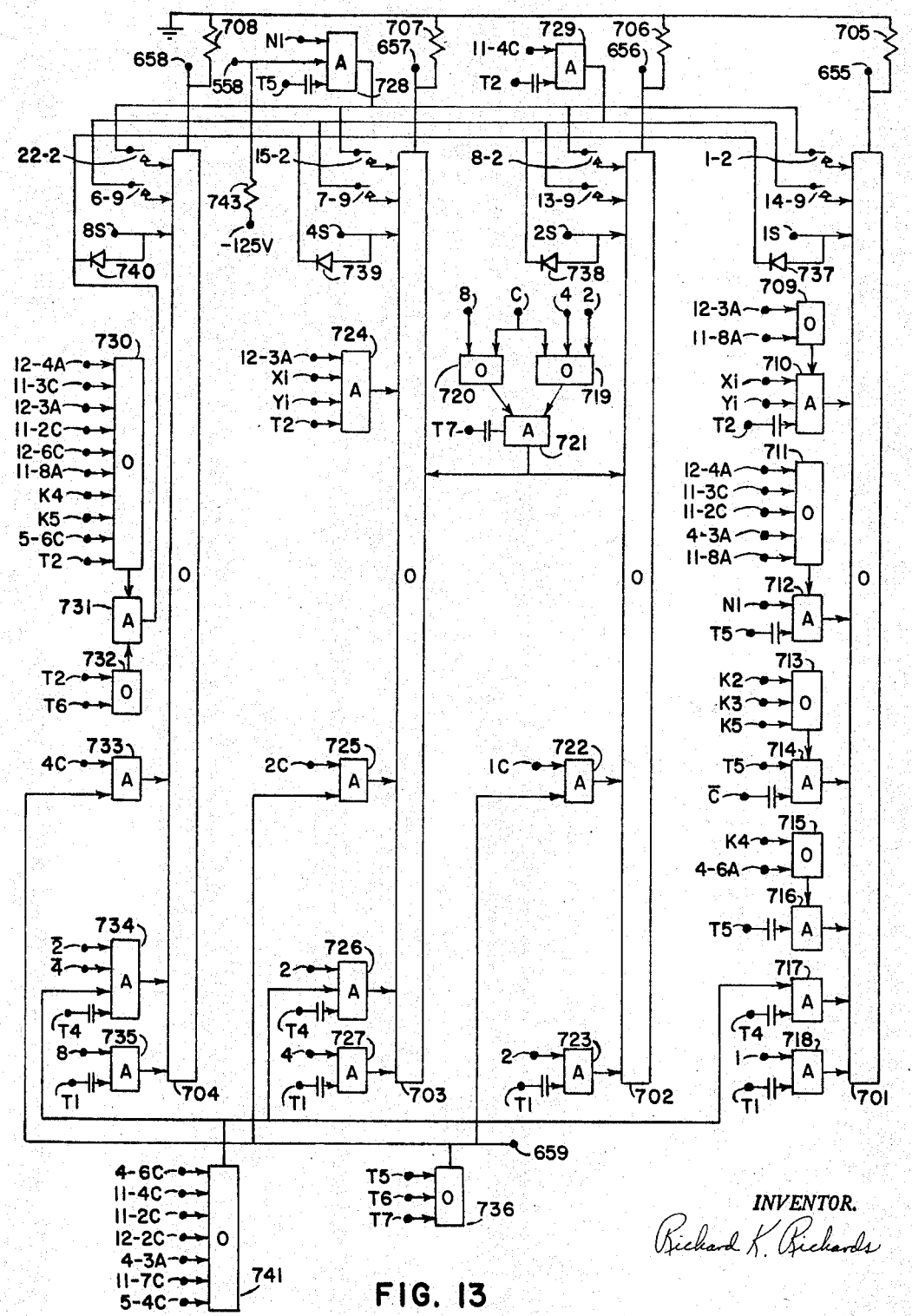

FIGURE 13 shows the details of the Adder Input Array and Data Contacts represented by blocks 123 and 126, respectively, in FIGURE 1. FIGURE 13 also shows certain of the Address Contacts in block 112 in FIGURE 1.

Figure 14:
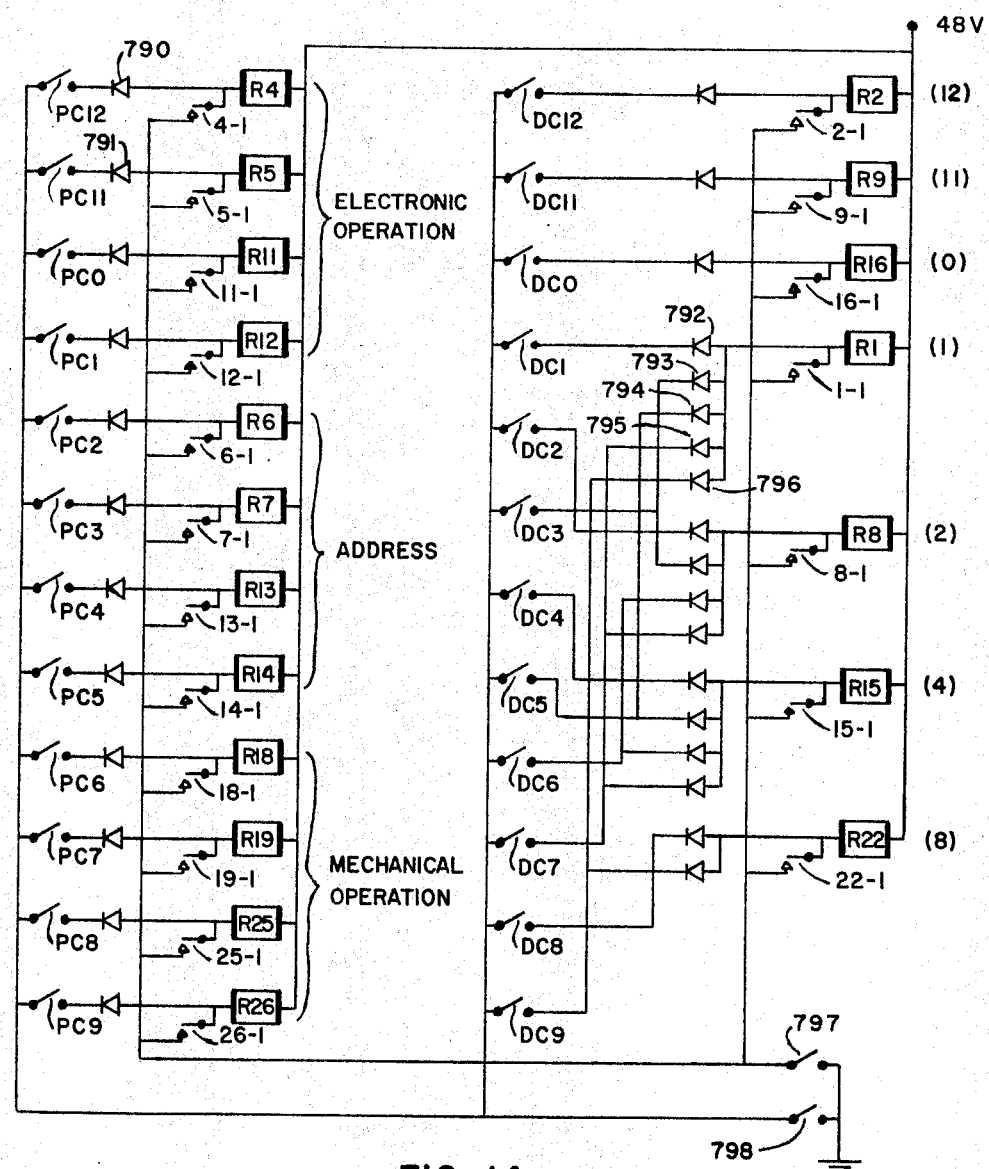

FIGURE 14 shows the details of the Program Relay Coils and Data Relay Coils represented by blocks 103 and 104, respectively, in FIGURE 1. FIGURE 14 also shows switches that might be used for the Program Input Device and Data Input Device represented by blocks 101 and 102, respectively, in FIGURE 1.

Figure 15:
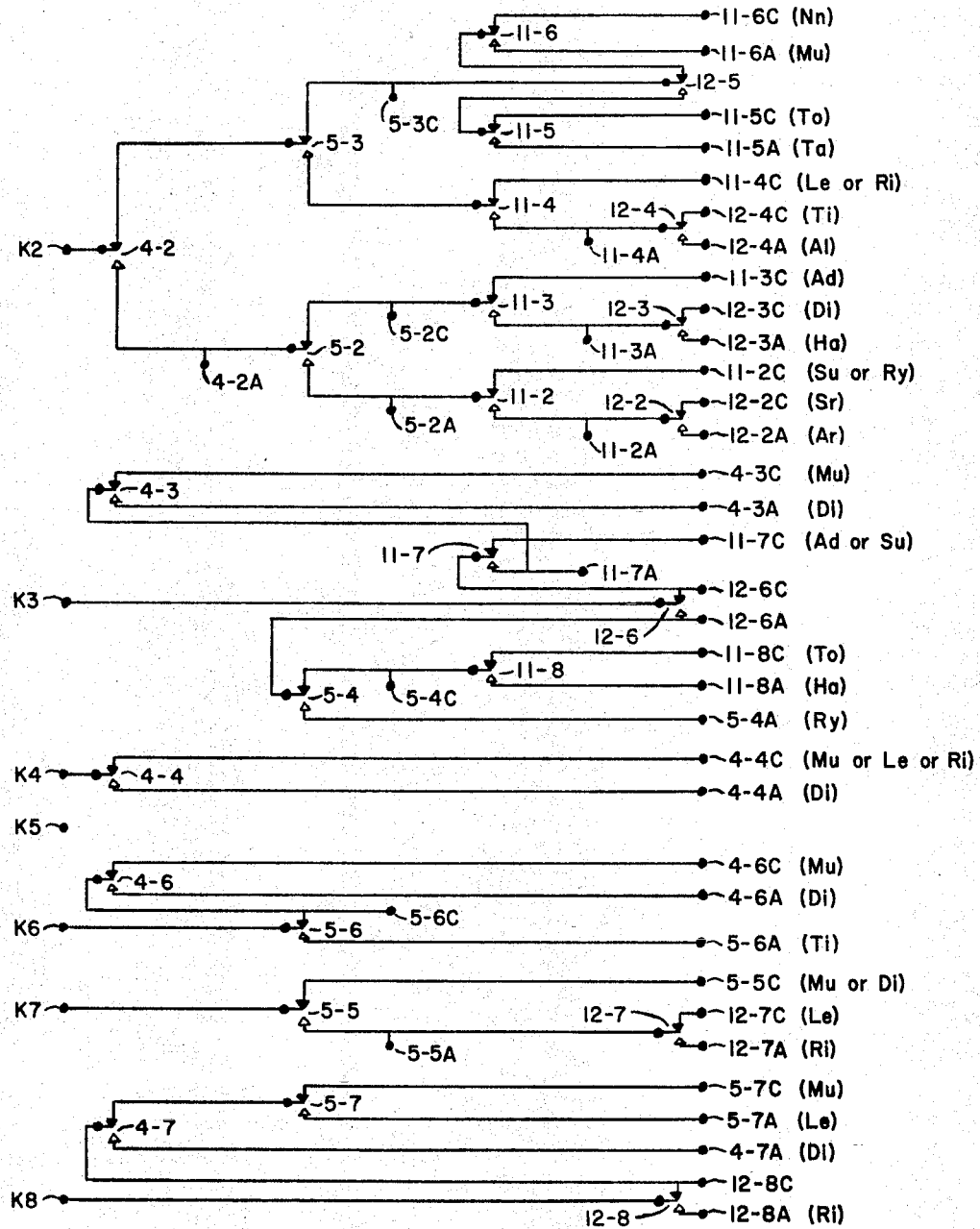

FIGURE 15 shows the details of the Electronic Instruction Contacts represented by block 111 in FIGURE 1.

Figure 16:
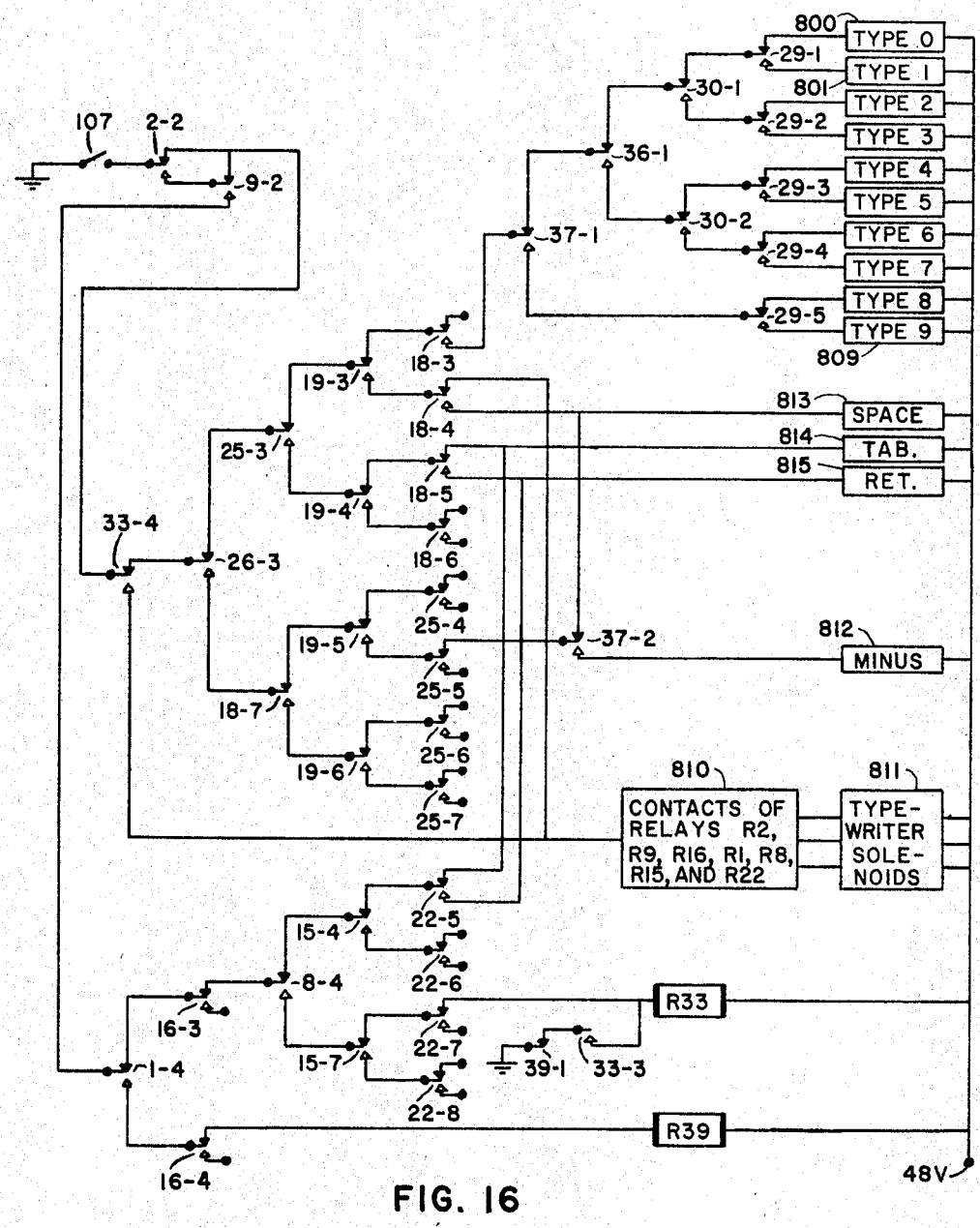

FIGURE 16 shows the details of the Mechanical Instruction Contacts, Output Relay Contacts, Output Device, and Miscellaneous Electromechanical Devices represented by blocks 108, 109, 110, and 131, respectively, in FIGURE 1.

FIGURE 17 shows a table that indicates the functioning of the calculator at the various pulse times for the various electronic states and for each of the various operations.

Figure 18:
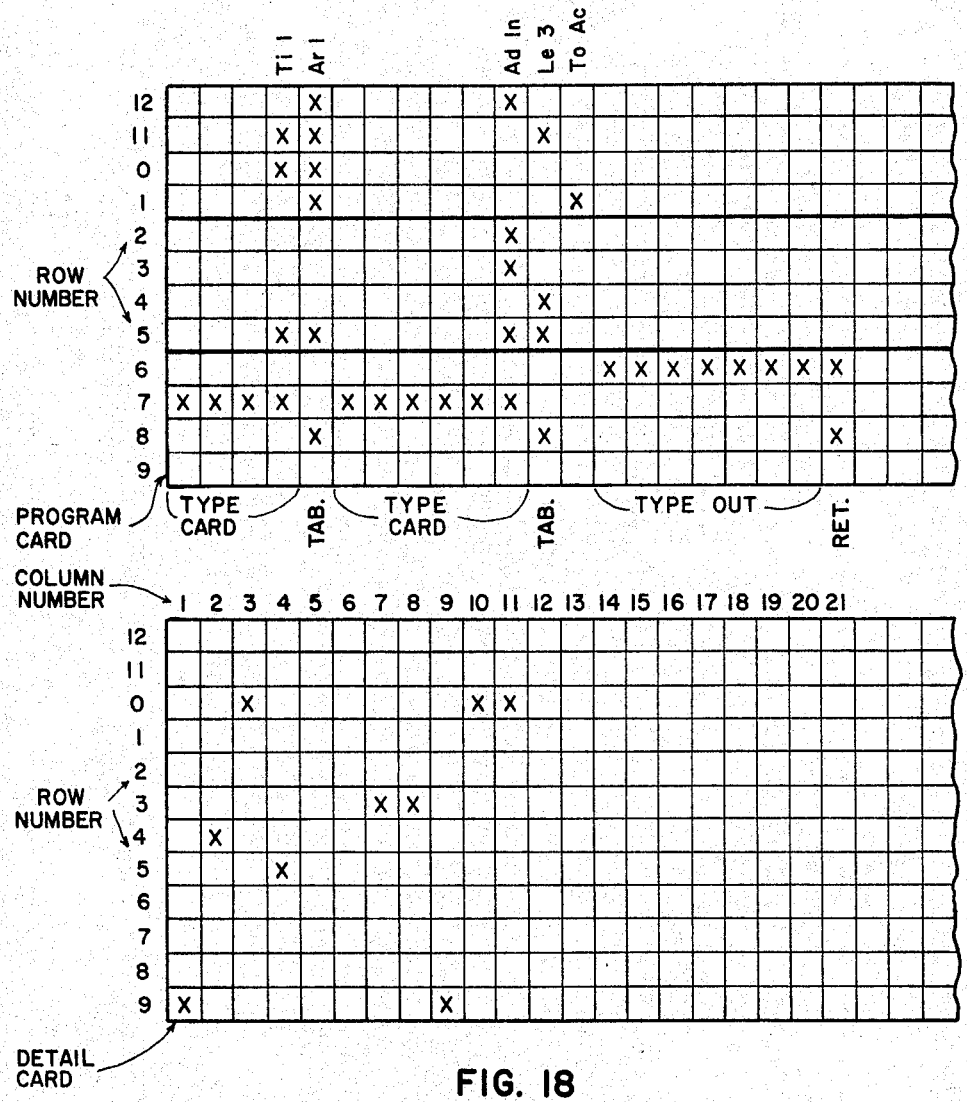

FIGURE 18 shows the position of the punched holes in a program card for an elementary program presented as an example, and it also shows the positions of the punched holes for one detail card used as an example with this program.

In FIGURE 1 a heavy line such as from block 126 to block 123 implies a path for data flow, where the data can be an input digit, a digit which is part of a number undergoing calculation, or an output digit. A relatively thin line such as from block 117 to block 111 implies a path for signals related to the program of instructions or to a control signal used in the actuation of any of the various parts of the calculator. In some instances a line corresponds to a single wire in the calculator, but in other instances a line corresponds to a group of several wires that carry similar signals. In the subsequent description of the calculator, the exact nature of each interconnecting line will be described.

Within the calculator the bits of the data digits are transmitted in parallel over four separate wires. The code used is the 8–4–2–1 code. For transmission from the Data Input Device 102 to the Data Relay Coils 104 and for transmission from the Output Relay Contacts 109 to the Output Device 110 the 1-out-of-10 code is used. Therefore, each heavy line in FIGURE 1 represents either four or ten wires, as the case may be.

To improve the clarity of FIGURE 1, some of the interconnecting control lines are not drawn in for their full lengths. Instead, some of the lines are given a designation, such as N11 for example, and the origin and destination of each such line is indicated by a notation at each end of the omitted segment. When a given control signal is transmitted to two or more units in the calculator, the source and the destinations of the signal are readily distinguished by the arrow heads, which are used in a conventional fashion.

In FIGURE 1 the detailed characteristics of the Program Input Device 101 and the Data Input Device 102 are not pertinent to this invention. It is sufficient that these devices be able to supply signals necessary to actuate the Program Relay Coils 103 and the Data Relay Coils 104, respectively. In the preferred embodiment of this invention an instruction comprises a set of 12 signals where each signal is of "on-off" character, that is, either present or absent. Each of the 12 signals either actuates or does not actuate the corresponding one of the 12 Program Relay Coils to which it is sent. An item of data comprises a set of 4 similar signals which actuate a set of 4 Data Relay Coils. There is also a fifth Data Relay used for the decimal digit, zero. Further, there are two other Data Relays, not pertinent to this invention, that are used for handling alphabetic characters. Ordinarily, all signals for one instruction and all signals for one data digit are sent to their corresponding relays simultaneously. After the relays have assumed their actuated or non-actuated conditions in accordance with the signals, one electronic instruction and one mechanical instruction are executed. The relays are then all restored to their non-actuated condition, and a new set of signals representing the next instruction and the next data digit are trasmitted to the relays. The second electronic instruction and the second mechanical instruction are then executed. This process is repeated until all intended data has been entered into the calculator and all intended instructions have been executed. Although the entry of these signals could be manual insofar as the principles of this invention are concerned (and only manual means are herein described), it is assumed that successive instructions and data digits are transmitted automatically such as by punched card or punched paper tape readers with the presence or absence of holes being used for the representations of the signals. Any of several different commercially available card or tape readers may be used for this purpose.

In FIGURE 1 Switch 105 is connected between ground and the Start-Stop Flip-Flop 106. When 105 is closed a signal is supplied to cause 106 to assume an "on" condition. The signal from 105 to 106 is supplied after the actuation of the Program Relays and Data Relays.

When Start-Stop Flip-Flop 106 is turned "on" a signal from 106 is sent to the Timing Pulse Generator 114 as indicated by a line from 106 to 114. The Timing Pulse Generator 114 then emits a set of signals designated T1 through T8 that are sent to several other units in the calculator. Specifically, T1, T2, T4, T5, T6, and T7 are sent to the Adder Input Array 123; T8 is sent to the Electronic State Control Array 122; T4 is sent to the Carry Flip-Flop 130; T3 and T8 are sent to the Storage Input Control 128; T4 and T8 are sent to the Up-down Counter Control Array 121; T2, T6, and T7 are sent to the Digit Control Array 120; T2, T6, and T7 are sent to the Address Control Array 119; and T5 is sent to the Output Control 125. In FIGURE 1 the convention described previously is used to show the T1 through T8 lines that lead from the Timing Pulse Generator 114 to the other portions of the calculator as described in this paragraph. The generation of the timing pulses continues as long as the Start-Stop Flip-Flop 106 remains in the "on" state.

Also, when the Start-Stop Flip-Flop 106 is turned "on" it generates a signal which is sent to the Up-Down 3-Counter 115, the Up-down 4-Counter 116, and the Electronic State Signal Generator 117 to set these circuits to certain prescribed initial conditions. These connections are indicated in FIGURE 1 by a line from block 106 to blocks 115, 116, and 117.

The storage of data in the calculator is accomplished in the Storage Unit 118 in FIGURE 1. In the preferred embodiment the Storage Unit is a magnetic core array utilizing the well-known coincident-current principle of core selection. The array is capable of storing 16 numbers, each having 10 decimal digits plus sign.

The selection of a particular number position, or "address," in Storage Unit 118 is accomplished by the Address Control Array 119 in FIGURE 1. In some cases this selection is direct as indicated by the line from 119 to 118. In other cases the selection is through the Address Contacts 112 as indicated by a line from 119 to 112 and another line from 112 to 118.

Certain of the Address Contacts 112 are not used for controlling 118 but are instead used in the SHIFT LEFT and SHIFT RIGHT operations to control the number of positions shifted. For these operations the address number is sent to the Adder Input Array 123, as indicated by a line from 112 to 123 in FIGURE 1. These particular contacts are shown in FIGURE 13 along with the Adder Input Array.

The selection of the digit position in Storage Unit 118 is accomplished by the Digit Control Array 120. There are 12 digit positions designated N0 through N11. Digit position N0 is a blank digit position corresponding to nothing in Storage Unit 118. However, the calculator does in some instances perform certain functions not related to storage when the Digit Control Array 120 specifies digit position N0. Digit position N1 corresponds to the units digit, N2 corresponds to the tens digit, N3 corresponds to the hundreds digit, and so on to digit position N10 which corresponds to the billions digit. Digit position N11 corresponds to the sign digit. In addition to controlling the digit position in Storage Unit 118, the Digit Control Array 120 generates three signals, N0, N1, and N11, for use in other parts of the calculator. As indicated by lines in FIGURE 1, N0 is sent from 120 to the Electronic State Control Array 122; N1 is sent to the Adder Input Array 123; and N11 is sent to the Electronic State Control Array 122 and the Output Control 125. A signal is "present" on the N0, N1, or N11 control line when the Up-down Counters are in a state corresponding to one of these digit positions. Only one of the 12 digit positions N0 through N11 is operative at any one time.

In the description of the calculator of this invention, a notation such as N1, for example, may be used to signify a digit position, a signal on a wire that is positive when the corresponding digit position is operative, a wire which carries this signal, or a terminal to which this wire is connected. In each instance the use of the notation will be clear from the text. It is believed that a person skilled in the art will be able to follow the description better with this form of notation than if four different symbols are employed. A similar system of notation is used for other signals in the calculator with the exact meaning being made clear in each case by the text.

The Up-down 3-Counter 115 and the Up-down 4-Counter 116 provide the input signals to the Digit Control Array 120 as indicated in FIGURE 1 by a line from 115 to 120 and a line from 116 to 120. The two counters have three and four stable states, respectively, so that in combination the two counters together have 12 stable states suitable for the selection of the 12 digit positions N0 through N11.

Counters 115 and 116 are actuated by signals from the Up-down Counter Control Array 121 as indicated by a line from 121 to 115 and 116 in FIGURE 1. Array 121 has two output signals, each of which are transmitted to counters 115 and 116. A pulse on one signal transmission line causes each of the two counters to be stepped through a sequence corresponding to "up," that is, in the direction corresponding to higher orders of digits in the digit control array and in storage. Similarly, a pulse on the other signal transmission line causes the counters to be stepped in the opposite sequence, that is, "down." For example, if at a given time array 120 is causing actuation of the N4 digit position, an "up" pulse from Array 121 will cause subsequent actuation to be of the N5 digit position. A "down" pulse from Array 121 would have caused a stepping from N4 to N3. In principle, a single Up-down 12-Counter could be used instead of the 3-Counter and 4-Counter indicated.

As indicated in FIGURE 1, the Up-down 3-Counter 115 also generates a signal designated $Xi$, and the Up-down 4-Counter 116 also generates a signal designated $Yi$. With the convention described previously, the $Xi$ and $Yi$ lines proceed from counters 115 and 116, respectively, to the Adder Input Array 123. Actually, certain of the Address Contacts 112 are used in conjunction with counters 115 and 116 to generate the $Xi$ and $Yi$ signals, and these certain contacts are subsequently shown and described as a part of the counters 115 and 116 (see FIGURE 7). The $Xi$ and $Yi$ signals are used in the HALF ADJUST (round off) operation.

The Electronic State Signal Generator 117 in FIGURE 1 is a multi-stable state device that produces a set of nine "state" signals designated K1 through K9. These nine signals are distributed to other parts of the calculator through the Electronic Instruction Contacts 111. The line from 117 to 111 and the line from 111 to the Electronic State Control Array 122, the Up-down Counter Control Array 121, the Address Control Array 119, the Adder Input Array 123, and the Output Control 125 indicate the distribution of the nine state signals. The state signals arriving at these various portions of the calculator operate in conjunction with the digit position signals, the timing pulses, and other signals to control the functions that take place within the calculator. Actually, signals K1, K5, and K9 of the set of nine signals do not pass through 111 to their destinations because the calculator functions are always the same for these three states, but from the standpoint of a block diagram description of the calculator, these exceptions are not of material consequence. The detailed path of each signal is described later. Only one of the nine signals K1 through K9 is "present" at any given time. If signal K3, for example, is present, the calculator is said to be in the "K3 state," and the functions corresponding to the K3 state for the electronic operation being performed are actuated during the time that the calculator is in this state.

The Electronic State Control Array 122 in FIGURE 1 provides the signals for determining the state in which the Electronic State Signal Generator 117 is to exist at any given time. This relationship is indicated in FIGURE 1 by a line from 122 to 117. The termination of an electronic operation is also under the control of 122. A line from 122 to the Start-Stop Flip-Flop 106 indicates this relationship. When an operation is to be terminated, a pulse on this line causes 106 to be turned "off." The generation of timing pulses by the Timing Pulse Generator 114 then ceases.

As indicated by a heavy line in FIGURE 1, the path for data flow starts at the Data Input Device 102 and proceeds first to the Data Relay Coils 104. The Data Relay Coils determine the settings of the Data Contacts 126, and this relationship is indicated by the fact that blocks 104 and 126 are adjacent to each other. The heavy line from 126 to the Adder Input Array 123 indicates that the data path proceeds from 126 to 123. The heavy lines connection in succession the Adder Input Array 123, the Adder 124, the Storage Input Control 128, the Storage Unit 118, and Storage Output Amplifiers 129, and then the Adder Input Array 123 again indicate the path of data flow within the calculator. In a broad sense, calculations are performed by circulating the digits around the loop comprised of 123, 124, 128, 118, and 129. The data paths to and from Storage Unit 118 are through the inhibit windings and the sense windings, respectively, of that unit, and the heavy lines are therefore drawn to one corner of block 118 to indicate more clearly the distinction between the data path and the control lines for selection of the address position and digit position.

Data digits from the Adder 124 in FIGURE 1 may also pass to the Thyratrons 127 as indicated by the heavy line from 124 to 127. From 127 the digit path is to the Output Relay Coils 113 as indicated by the heavy line from 127 to 113. The Output Relay Coils 113 determine the settings of the Output Relay Contacts 109, and this relationship is indicated by the fact that blocks 113 and 109 are adjacent to each other. From 109 the digit path is to the Output Device 110 as indicated by the heavy line from 109 to 110.

The Output Control 125 controls the operation of the Thyratrons 127 as indicated by a relatively thin line from 125 to 127 in FIGURE 1.

Adder 124 in FIGURE 1 includes four flip-flops for the 8, the 4, the 2, and the 1 bits of each decimal digit. Carry Flip-Flop 130 stores the decimal carry generated by the Adder, and the relationship is indicated in FIGURE 1 by a line from 124 to 130. Carry Flip-Flop 130 generates two output signals on two output lines designated C and $\overline{C}$. A signal is present on the C or $\overline{C}$ line according to whether or not 130 is storing a carry at any given time. The C signal is used as a control signal at the Electronic State Control Array 122 and at the Adder Input Array 123. The $\overline{C}$ signal is used as a control signal at the Electronic State Control Array 122 and at the Up-down Counter Control Array 121. The convention described previously is used in FIGURE 1 to represent the lines carrying these control signals.

In addition to generating signals for the transmission of data digits to 128 and 127, Adder 124 generates a signal designated $\overline{1}$. A signal is present on the $\overline{1}$ line at all times that the flip-flop for storing the $\underline{1}$ bit is "off," that is, when the $\underline{1}$ bit being stored in the adder is 0. The $\overline{1}$ signal is used as an additional control signal in the Electronic State Control Array 122, as indicated by a line from 124 to 122, interpreted according to the convention described previously.

In FIGURE 1 Switch 107 is connected between ground and the Mechanical Instruction Relay Contacts 108. When 107 is closed a connection is made from ground through the contacts 108 to one of a number of electromagnetically operated devices. In general, these devices are such things as the carriage return mechanism, the tabulate mechanism, or special character (such as "$") actuation mechanisms on the typewriter Output Device 110. However, other things, not necessarily related to 110 may be included. A line, which represents several individual wires, is shown from 108 to 110 to indicate the connections. The line from 108 also leads to Miscellaneous Electromechanical Devices 131 to indicate that other functions may be performed. One particular mechanical operation causes the connection through 107 and 108 to be made to the Output Relay Contacts 109. The contacts 109 form a matrix that causes a branching in the connection to the Output Device 110. In this case a connection is made to one of the ten mechanisms that actuate the ten digit keys, 0 through 9, on the typewriter. In other words, the particular mechanical operation in question initiates the flow of an output data digit from 109 to 110. Switch 107 is closed at a time which is after the Output Relay Coils 113 have been actuated, and this time is a certain known duration after the electronic circuits have been started to function by Switch 105.

In FIGURE 1 there is a line from the Program Input Device 101 to the Program Relay Coils 103 to indicate that 101 controls 103. The Program Relay Coils 103 determine the settings of the Electronic Instruction Contacts 111, the Address Contacts 112, and the Mechanical Instruction Contacts 108, and this relationship is indicated by the fact that blocks 103, 111, 112, and 108 are adjacent one to the next.

There are a few circuits involving a relatively small number of components that are not specifically covered by the block diagram in FIGURE 1. For example, there is a circuit for initiating a pulse through the Data Contacts 126 to cause transmission of a digit from 126 to the Adder Input Array 123. This circuit is subsequently shown with the Data Contacts and the Adder Input Array in FIGURE 13. For another example, FIGURE 1 omits several signals representing individual bits and carries from one bit to the next that are transmitted from the Adder 124 back to the Adder Input Array 123. In each case, however, all signals and components are shown and described in connection with the detailed description of the calculator.

Relay and terminal notation

For the designation of relays and relay contacts the following nomenclature will be used throughout the description of this invention. A relay is designated by the letter R followed by a number. For example, R2 means "relay number 2." A specific contact on a relay will be designated by the relay number on which the contact is mounted followed by a hyphen and a number designating the particular contact on the relay. For example, contact 2–3 means "contact number 3 on relay number 2." Ordinarily, the letter R will be omitted for the contacts. Other components may be designated by hyphenated numbers but they can be distinguished from relay contacts by the symbols in the drawings and the by the words used in the text. In no case, however, is the same hyphenated number used for both a relay contact and some other component, except terminals, as described below. In the drawings the designation for a relay is found with the coil of the relay. The contacts associated with a given coil are not necessarily located near the coil in a figure, and in most cases are not even found in the same figure with the coil.

In general, each relay contact as a whole comprises a normally closed contact, a movable contact, and a normally open contact, designated A, B, and C, respectively. These individual contacts of contact 2–3, for example, would be designated 2–3A, 2–3B, and 2–3C, respectively. In the drawings the movable contact B of a contact is shown as a horizontal line with a dot thereon that may be thought of as representing a hinge. The A contact is shown as a small open triangle below the end of the movable contact and close to it, but not touching it. The C contact is shown as a small solid triangle above the end of the moving contact and touching it. The A, B, and C portions of a contact as a whole are not specifically identified in the drawings except by the symbol. Instead only the contact as a whole is identified, such as 2–3, and the positions of the connections to contacts 2–3A, 2–3B, and 2–3C are readily apparent from their symbols. If the A or C contact of a given contact as a whole is not used in the calculator, it may be omitted from the drawing.

Because of the considerable number of components in the calculator, it is necessary to employ several sheets of drawings to show them all. For this reason, a given point in the circuit may appear in two or more different figures. In these instances the circuit point is shown connected to a terminal in each figure in which the circuit point appears. A given terminal is assigned the same designation in each figure in which it appears. However, in the construction of the calculator no actual "terminal" in the ordinary sense of the word may exist for the circuit point in question.

Also, a given circuit point, or terminal, may appear at two or more places in the same figure. The use of separate terminals to show circuit points that are in fact electrically connected together is made only when the line otherwise needed to join the points would detract more from the clarity of the drawing than it would add to the easy understanding of the components portrayed. This practice is commonly employed for connections to voltage supply sources. The terminals in this case are designated by the voltage supplied, such as, for example, 125V, which means 125 volts positive with respect to ground. A negative voltage supply source is indicated by a minus sign in the terminal designation, such as −125V. The phrase "connected to terminal 125V" means a connection to the positive 125-volt voltage supply source whether the terminal appears once or several times in a figure. The practice of showing a given terminal more than once in one figure is used for some of the other circuit points also.

In many instances a terminal is assigned a designation that is the same as the designation for the A, B, or C part of a relay contact as described above. This practice has been found to be helpful for explaining and understanding component relationships and circuit functions. In each case the terminal so designated is actually connected to the specific part of the specific contact corresponding to the designation. For example, terminal 11–5C in FIGURE 10 means that the circuit point in question is connected to the C portion of contact 11–5, subsequently referred to as "contact 11–5C." It happens in the example cited that terminal 11–5C is shown in two places in FIGURE 10 to indicate that the two circuit points are actually connected together and that both are connected to contact 11–5C which appears in another figure.

The storage unit and certain closely associated circuits

Figure 2:
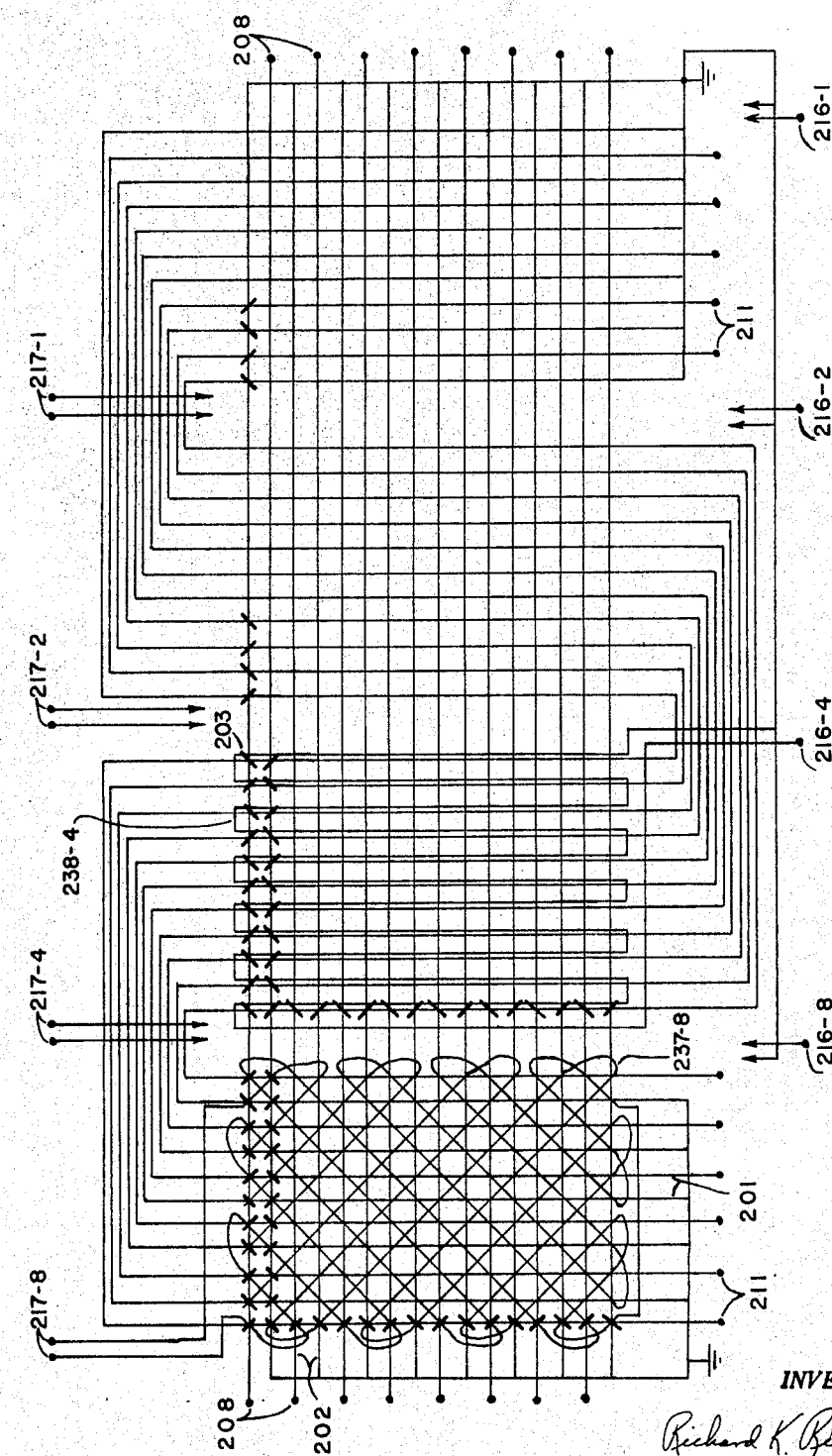
FIGURE 2 shows the magnetic core array that is a part of FIGURE 3.

The magnetic core array which is used for storage in the calculator of this invention is shown in FIGURE 2. It comprises an array of toroidal-shaped magnetic cores, each having a rectangular hysteresis loop. The principles of magnetic core storage are well known to the prior art, but the essential features of such a storage system are set forth herein. For additional details, reference is made to the book, "Digital Computer Components and Circuits," by R. K. Richards and published by the D. Van Nostrand Company in 1957, with particular reference to Chapter 8 and most specifically to FIGURE 8–5 on page 366.

In FIGURE 2, each core, one of which is designated 203, is shown as a short diagonal line, which represents its approximate appearance when viewed from a direction that is perpendicular to its axis. There is a total of 704 cores in the array. The cores are divided into four groups with each group forming a rectangular pattern with 11 cores in the "horizontal" direction and 16 cores in the "vertical" direction. In order to simplify the drawing, not all of the 704 cores are indicated specifically, but enough of them are shown to give a clear indication of the pattern in which they are placed. There is a set of 16 horizontal wires, or "windings," 202. One of these horizontal windings passes through one row of cores in each group, and each row has one horizontal winding passing through it. There is a set of 11 vertical wires, or "windings," 201. One of these vertical windings passes through one column of cores in each group, and each column has one of this set of windings passing through it. In FIGURE 2 the four groups of cores are shown placed in a horizontal line with the result that each vertical winding is not a straight line; instead, each vertical winding loops so that it passes through the cores of successive groups in the "up" and "down" directions alternately. The four groups of cores could be positioned one above the next in four separate planes instead of being positioned in a single plane as shown. Although it is more difficult to draw the cores when they are positioned in more than one plane, a multiplane configuration is actually the usual practice, especially for core arrays much larger than used in this calculator.

The four groups of cores in FIGURE 2 are used for the storage of the 8, the 4, the 2, and the 1 bits, respectively, of the decimal digits. The eleven columns of each group correspond to the ten digits plus sign of each number that is stored. The sixteen rows correspond to the sixteen numbers the storage unit is capable of storing. Accordingly, a given number is stored in four columns of cores with one column being in each group. The four columns are, of course, ones that are linked by a single vertical drive winding. A given decimal digit of the number is stored with one of its four bits in each of the four groups, where a given horizontal winding passes through each of the four corresponding cores.

Each of the four groups of cores has an additional wire called a sense winding passing through all cores of the group. In FIGURE 2 the sense winding corresponding to the 8 bit is designated 237-8, and its ends are connected to a pair of terminals 217-8. The sense winding passes through each core in a direction which is in line with the axis of the core and which is at an angle of approximately 45 degrees with respect to the vertical and horizontal windings. The pairs of terminals 217-4, 217-2, and 217-1 are connected to the sense windings of the groups for storing the 4, the 2, and the 1 bits, respectively. In order to simplify the drawing, these other sense windings are not shown in detail in FIGURE 2, but it should be understood that each sense winding is substantially the same as the one shown.

Also, each of the four groups of cores has still another wire called an inhibit winding passing through all cores of the group. In FIGURE 2 the inhibit winding corresponding to the 4 bit is designated 238-4, and one of its ends is connected to terminal 216-4. The inhibit winding passes through each core in a direction parallel to the direction of the vertical windings. Terminals 216-8, 216-2, and 216-1 are connected to one end of the inhibit windings of the groups for storing the 8, the 2, and the 1 bits, respectively. In order to simplify the drawing, these other inhibit windings are not shown in detail in FIGURE 2, but it should be understood that each inhibit winding is substantially the same as the one shown. The opposite end of each inhibit winding is connected to ground.

In FIGURE 2, adjacent cores in any row or column are mounted with their axes at right angles to each other, that is, the edge of each core appears on the 45-degree diagonal opposite to the diagonal of the cores next to it. This pattern is commonly used in magnetic core storage arrays because the resulting pattern that can be used for the sense windings results in less magnetic coupling between a sense winding and any one vertical or horizontal winding and also because the inhibit windings may be shorter for the reason that, as an inhibit winding passes back and forth across a group of cores, it becomes possible to string the winding through a column of cores for each direction of passing.

One end of each vertical winding 201 and one end of each horizontal winding 202 is connected to ground. The opposite end of each of the eleven vertical windings is connected to one of the eleven terminals 211, and the opposite end of each of the sixteen horizontal windings is connected to one of the sixteen terminals 208. With the cores mounted on opposite diagonals as shown, proper polarity of winding connections is obtained by making the ground connections of adjacent vertical or horizontal windings at opposite sides of the array. Therefore six of the terminals 211 and eight of the terminals 208 appear at the left-hand side of FIGURE 2, and the remaining five of the terminals 211 and the remaining eight of the terminals 208 appear at the right-hand side.

In FIGURE 2 the cores and windings are of such position and polarity that if one terminal 208 and one terminal 211 are made positive, the resulting current in the respective horizontal and vertical windings pass in the same direction through each of the four cores, one in each group, at the intersections of the horizontal and vertical windings. The positions and polarities are also such that if any of the terminals 216-8, 216-4, 216-2, and 216-1 are made positive, the currents through the corresponding inhibit windings will pass through each core in its respective group in the same direction as would currents from the horizontal and vertical windings when the terminals 208 and 211 are positive. However, as will be explained in more detail later, the inhibit windings are inoperative when the drive winding terminals are made positive; instead, the input winding terminals are made positive when the drive winding terminals are negative, and the inhibit winding terminals are made negative when the horizontal and vertical windings are inoperative. The direction of the sense winding through any one core is of no consequence. The voltage induced in a sense winding is of one polarity for a given actuation of some of the cores and is of the opposite polarity for the other cores in the group. A rectifying circuit is used to produce the same polarity of output pulse for all cores.

The storage of a bit of information is accomplished by the direction in which magnetic flux passes around a toroidal shaped magnetic core. Each of the windings 210 and 202 in FIGURE 2 has either no current passing through it or one unit of current passing in one direction or the other. The design parameters of the cores and the magnitude of the unit of current are so chosen that, because of the rectangular nature of the hysteresis loop, one unit of current is not sufficient to cause a reversal of magnetic flux in the core. However, when two units of current are passed in the same direction through a core, one current from a vertical winding and one current from a horizontal winding, the magnetic field generated in the core is of sufficient magnitude to cause the flux in the core to exist in the corresponding direction around the toroid whether or not the flux was already in this direction. Because of the hysteresis loop, the flux remains after the currents have been terminated. A 1 or a 0 can thereby be stored in the core according to the direction of the simultaneous currents in the corresponding vertical and horizontal windings, hereafter called "drive windings."

When entering a digit into the core array for storage, the four bits of the digit are entered simultaneously. This "writing" is accomplished by simultaneously sending a unit of current in one horizontal drive winding and one vertical drive winding. If a given bit of the digit is to be a 1, no current is transmitted through the inhibit winding of the corresponding group. If the bit is to be a 0, a unit of current is sent simultaneously through the inhibit winding of the corresponding group. The direction of current in the inhibit winding is such as to oppose the generation of a magnetic field by currents in the drive windings. The result is that only one "unit" of magnetic field strength is generated in the corresponding storage core at the intersection of the horizontal drive winding, vertical drive winding and inhibit winding, and there is therefore no flux change.

When writing a digit it is assumed that at the beginning of the process each of the four cores involved had been previously set to the flux state representing 0. The "reading" process, to be described, leaves the cores in the 0 state. Therefore, in the operation of the storage unit, the reading function occurs before the writing function on any given cycle, although from the standpoint of the purpose of the unit, it might seem more logical to write before reading.

For sensing, or "reading," the value of a stored decimal digit, all four bits are similarly sensed simultaneously. Reading is accomplished by sending one unit of current in one horizontal drive winding and one vertical drive winding simultaneously, but in the direction opposite to that for writing. Four cores, one in each group, at the intersections of the vertical and horizontal drive windings are actuated. If a given core orginally contained a 0, there will be a relatively small change in the flux in that core. On the other hand, if a given core contained a 1, the direction of flux in the core will be reversed, and there will be a relatively large change in flux in the core. A relatively small or large, respectively, voltage pulse is thereby induced in the corresponding sense winding which passes through the core. The small voltage which was mentioned for a stored 0 results from the fact that the hysteresis loops of the cores are not perfectly rectangular.

In FIGURE 3, the magnetic core array 230 is shown as a block with terminals that are the same as the terminals in FIGURE 2. One of the terminals 211 is connected through resistor 205 to one end of winding 209 on pulse transformer core 210. The opposite end of winding 209 is connected to ground. One end of winding 220, also on pulse transformer core 210, is connected to the anode of a vacuum tube VN. The other end of winding 220 is connected to terminal 125V. The grid of VN is connected to terminal N11'. There is a similar circuit between each of the other terminals 211 and each of the ten terminals N1' through N10'. The cathodes of all of the tubes in the circuits just described are connected together and connected to the cathode of diode D2 and to one end of resistor 233. The anode of diode D2 is connected to ground. Pulse transformer core 210 has a third winding 221, and this winding and the corresponding windings on the cores in all of the other circuits just mentioned are connected in series. One end of this series connection is connected to terminal —125V and the other end is connected to the other end of resistor 233 and to one end of resistor 234, the opposite end of which is connected to ground.

Similarly, one of the terminals 208 is connected through resistor 204 to one end of winding 206 on pulse transformer core 207. The other end of winding 206 is connected to ground. One end of winding 219, also on pulse transformer core 207, is connected to relay contact 14-6C, and the other end of winding 219 is connected to terminal 125V. There is a similar circuit between each of the other terminals 208 and one of the contacts, 14-6A, 14-5C, 14-5A, 14-4C, 14-4A, 14-3C, 14-3A, 7-6C, 7-6A, 7-5C, 7-5A, 7-4C, 7-4A, 7-3C, and 7-3A. Pulse tranformer core 207 has a third winding 218, and this winding and the corresponding windings on the cores in all of the other circuits just mentioned are connected in series. One end of this series connection is connected to terminal —125V, and the other end is connected to one end of resistor 232 and to one end of resistor 231. The other end of resistor 232 is connected to ground. The other end of resistor 231 si connected to the cathodes of tubes VA, VI*n*, VO*u*, VA*c*, and VMQ and to the cathode of diode D1. The anode of diode D1 is connected to ground.

Inasmuch as the rows and columns of storage cores in array 230 have susbtantially identical electrical characteristics, any one of the the terminals 211 may be connected through a circuit such as described to any one of the terminals N1' through N11'. Also, any one of the terminals 208 may be similarly associated with any one of the contacts listed.

FIGURE 3 also shows the following contact connections: 6-2C to 7-2B, 6-2A to 14-2B, 7-2C to 13-5B, 7-2A to 13-4B, 14-2C to 13-3B, 14-2A to 13-2B, 13-5C to 14-6B, 13-5A to 14-5A, 13-4C to 14-4B, 13-4A to 14-3B, 13-3C to 7-6B, 13-3A to 7-5B, 13-2C to 7-4B, and 13-2A to 7-3B. Contacts 6-2B, 7-4A, 7-5A, 14-6C, and 7-3A are connected to the anodes of vacuum tubes VA, VI*n*, VO*u*, VA*c*, and VMQ, respectively. The grids of these tubes are connected to terminals A, I*n*, O*u*, A*c*, and MQ, respectively.

Also in FIGURE 3 terminal 216-8 is shown connected through resistor 213-8 to one end of winding 214-8 on pulse transformer core 222-8. The other end of winding 214-8 is connected to ground. One end of winding 223-8, also on core 222-8, is connceted to the anode of vacuum tube V8, and the other end of winding 223-8 is connected to terminal 125V. The cathode of tube V8 is connected to the cathode of diode D3-8, the anode of which is connected to ground, and the cathode of tube V8 is also connected to one end of resistor 235-8, the other end of which is connected to one end of winding 215-8 on core 222-8. The other end of winding 215-8 is connected to terminal —125V. The grid of tube V8 is connected to terminal 8'. Similar circuits interconnect terminals 216-4, 216-2, and 216-1 to terminals 4', 2', and 1', respectively.

Also in FIGURE 3 terminal pair 217-8 is shown connected to the input terminals of amplifier 236-8, the output terminal of which is connected to terminal 8S. Terminal pairs 217-4, 217-2, and 217-1 are similarly connected through amplifiers to terminals 4S, 2S, and 1S, respectively.

Terminals N1' through N11' are also found in FIGURE 8*a*. Terminals A, I*n*, O*u*, A*c*, and MQ are also found in FIGURE 9. Terminals 8', 4', 2', and 1' are also found in FIGURE 12*b*. Terminals 8S, 4S, 2S, and 1S are also found in FIGURE 13.

All of the pulse transformer cores in FIGURE 3 have rectangular hysteresis loops as do the storage cores in magnetic core array 230. However, the pulse transformer cores would ordinarily be much larger physically than the storage cores and would be made of thin metallic strips wound on a bobbin rather than made of a molded ferrite material. A current pulse in one of the vertical drive windings in magnetic core array 230 is generated by the action of a flux change in one of the pulse transformer cores such as core 210. Winding 221 is a bias winding. Current flows from ground through diode D2, through resistor 233, through winding 221, and through the corresponding windings on the other cores associated with the vertical drive windings to terminal —125V. The purpose and action of resistor 234 may be neglected for the moment. A dot is placed near one of each winding on pulse transformer core 210. If current enters a winding at the end near which a dot is placed, the magnetic field from this current is said to tend to set the core to the "on" state. The magnetic field from a current entering at the no-dot end is said to tend to set the core to the "off" state. In FIGURE 3 the dot for winding 221 is placed so that the current through the bias winding enters the no-dot terminal to indicate that the bias current tends to hold the core "off."

In FIGURE 3, if tube VN is caused to become conducting, as will be the case when the potential at terminal N11' is changed from its normally negative value to ground potential, a current will flow from terminal 125V through winding 220 and through tube VN to resistor 233 to become the same current that flows through the bias windings. This current enters the dot terminal of winding 220 to indicate that this current tends to turn the core "on." Because of the relatively low impedance of winding 220 and the anode-to-cathode path in tube VN, a relatively large current would flow through the circuit except for the fact that when the current flows through resistor 233 the voltage drop across this resistor makes the potential at the cathode more positive than ground. The potential at terminal N11', which is connected to the grid of tube VN, is not allowed to become more positive than ground as a result of the action of the circuit, described later, which supplies the signal to terminal N11'. Therefore, any positive excursion of the potential at the cathode of tube VN tends to cause tube VN to become cut off. The result is that the potential at the cathode of tube VN becomes only slightly positive with respect to ground with the amount being in the order of one volt in practical designs. This amount of potential change is small relative to the 125-volt potential difference that exists between ground and the —125V terminal, and there is consequently little change in the current through resistor 233. Because the cathode of diode D2 is now more positive than its anode, diode D2 presents a high resistance to current flow from the cathode of tube VN to ground. The net result is that the current through winding 220 and tube VN is equal to the current through winding 221. However, the current through winding 221 now comes from tube VN rather than from diode D2.

In FIGURE 3 winding 220 does, however, have twice as many turns as winding 221 so that the result of causing VN to become conducting is to cause a reversal of the net magnetic field in the core 210, and this core is turned "on." When core 210 is turned "on" a pulse of voltage is inducted in winding 209, and this pulse of voltage causes a pulse of current to flow through resistor 205 to one of the terminals 211 and through the corresponding vertical drive winding in the magnetic core array 230 to ground. As indicated by the dot notation near the end of winding 209 that is connected to resistor 205, the polarity of this pulse is such as to cause terminal 211 to become positive as this time. Of course, inasmuch as the drive winding through the magnetic core array 230 has very little resistance, the magnitude of the voltage pulse at terminal 211 is very small. When the potential at terminal N11' is again made negative so that tube VN becomes cut off again, the bias current in winding 221 causes core 210 to be turned "off." At this time another pulse, but of opposite polarity is sent to the vertical drive winding in the magnetic core array 230.

The electrical design parameters chosen for core 210 and its windings and associated components are such that an approximately constant current is supplied to the vertical drive winding in magnetic core array 230 during the time that the flux in core 210 is changing from one direction to the other. As explained above, the current through winding 220 is equal to the current in winding 221, and this current is substantially contant and is determined according to Ohm's law by driving the voltage across resistor 233 by the resistance of 233. The resistance of the bias windings and the forward resistance of diode D2 are small and may generally be neglected. This constant current in windings 220 and 221 would not by itself produce a constant induced current in winding 209 as the core is switched from one state to the other. However, as is well known, the current in a secondary winding of a transformer cannot be greater than the current in the primary multiplied by a number equal to the ratio of the number of turns in the primary to the number of turns in the secondary. Therefore, if the resistance in the circuit of the secondary winding is made low enough, the current will be substantially equal to this maximum value, but no greater. Because the secondary current is substantially equal to the maximum value in this case and because the primary current is constant, the secondary current will be constant also.

The duration of the constant-current pulse in the secondary winding will be equal to the time required for the flux to complete its reversal in the core. This time will be influenced by the current in the secondary winding as well as by the current in the primary winding. As explained, the current in the secondary winding 209 in FIGURE 3 flows out of the dot terminal when the core is switched to the "on" state. Current flow in this direction opposes the current in the primary winding 220 in generating a magnetic field to create the switching. It is for this reason that the core does not switch rapidly even though the parameters of the primary winding might be such as to cause rapid switching in the absence of current in the secondary winding. By making the resistance in the circuit in the secondary winding sufficiently low and by using a large "step-down" turns ratio on the pulse transformer, a current that is a substantial fraction of an ampere and that continues for several microseconds can be generated with ordinary vacuum tubes. A current pulse of this approximate amplitude and duration is needed in the vertical and horizontal drive windings for the magnetic storage cores. A total resistance for the drive winding, resistor 205, and secondary winding 209 in the range of 2 to 4 ohms has been found to be satisfactory, although the use of even lower resistance is possible. With a low resistance such as this, a large current gain can be obtained in the pulse transformer without causing the required voltage at the primary windings to be excessive.

When core 210 in FIGURE 3 changes state, a voltage is induced in the other windings as well as winding 209. In particular, when the core is switched from "off" to "on" the voltage induced in winding 221 is of such polarity that it adds to the voltage supplied at terminal −125V. Accordingly, a somewhat larger current flows at this time through winding 221, and also the current through winding 220 is correspondingly larger than it would be in the absence of the induced voltage in winding 221. Also, when the core is switched from "on" to "on" the voltage induced in winding 221 is of such polarity that it subtracts from the voltage supplied at terminal −125V. Because of the low resistance in the secondary circuit, the voltage appearing there is very low. Then because of the turns ratio of the pulse transformer, the voltage appearing across winding 221 is several times as large, but is still small compared with 125 volts. This voltage does not alter the mechanism of operation of the pulse circuit, but some imbalance in the positive and negative pulses to the magnetic core array would occur. To correct this imbalance, resistor 234 is added to the circuit. The resistance of resistor 234 is much larger than the resistance of resistor 233, but resistor 234 allows enough additional current to flow through winding 221 that does not flow through winding 220 that the amplitude and duration of the positive and negative current pulses to the magnetic core array 230 are equal.

When the potential at any one of the terminals N1' through N10' is brought up to ground potential from its normally negative value, a pulse of current is generated in one of the other vertical drive lines by a similar process. Then when the terminal is again made negative, a current pulse of opposite polarity is generated in that drive line. In the operation of the calculator only one of the vertical drive line circuits is actuated at any one time.

In FIGURE 3 the operation of the circuits connected to the terminals 208 for supplying pulses of current to the horizontal drive lines is substantially the same as for the vertical drive lines. The only difference is in the connections to the tubes. If tube VA is made conducting, the particular horizontal drive line that receives a pulse is determined by the settings of relays R6, R7, R13, and R14, the Address Relays. With the contact connections that are shown in FIGURE 3 the anode of tube VA can be connected to any one of the sixteen horizontal drive line circuits by using a suitable address in an electronic operation. Each of the sixteen possible addresses corresponds to one of the sixteen possible combinations of settings of the four relays R6, R7, R13, and R14. Different and more straightforward contact connections can be devised, but the particular connections shown in FIGURE 3 distribute the contacts among the four relays as evenly as possible, and therefore relays may be used that have a greater degree of standardization with regard to number of contacts.

If tube VI$n$ is made conductive, the horizontal drive line that receives pulses is the one which would be involved with tube VA with relays R6, R7, and R14, but not R13, actuated. For tube VO$u$ the horizontal drive line that receives pulses is the one which would be involved with tube VA with relays R6, R7, and R13, but not R14, actuated. For tube VA$c$ the horizontal drive line that receives pulses is the one which would be involved with tube VA with none of the relays R6, R7, R13, and R14 actuated. For tube VMQ the horizontal drive line that receives pulses is the one which would be involved with tube VA with all four of the relays R6, R7, R13, and R14 actuated. Of course, when a relay is not actuated, there is a closed circuit between the B and C contacts of a contact as a whole, and when it is actuated, there is a closed circuit between the B and A contacts.

In FIGURE 3 the operation of the circuits connected to terminals 216–8, 216–4, 216–2, and 216–1 for supplying pulses of current to the inhibit windings is substantially the same as for the vertical drive windings. A minor difference is that inasmuch as current may be supplied to two or more inhibit windings simultaneously, where only one vertical and one horizontal drive winding is actuated at a given time, separate circuits are used for the bias windings such as winding 215–8. Also, because the inhibit winding pulse that is generated at the time the pulse transformer cores are switched "off" is not used, and because the pulse that occurs at this time is slightly smaller than the pulse that occurs when the cores are switched "on," there is no need for compensating resistors (corresponding to resistor 234) in the inhibit winding drive circuits.

In FIGURE 3 the pulses generated in the sense windings at a time when the storage cores undergo a flux reversal appear at terminals 217–8, 217–4, 217–2, and 217–1 and are amplified by amplifiers 236–8, 236–4, 236–2, and 236–1. Therefore the pulses appearing at terminals 8S, 4S, 2S, and 1S serve to represent the digit that had been stored at a given digit position of a given address at the time this digit position is sensed. Pulses appear at terminals 8S, 4S, 2S, and 1S when a digit is entered into the storage array. However, pulses appearing at this time are not utilized in the calculator and are blocked from entering the Adder by circuits, described later, in the Adder Input Array.

In FIGURE 3 the overall operation of the Storage Unit is as follows. All tubes are normally held in the cut off condition by appropriately negative signals applied to the terminals connected to the grids. To sense a digit, one of the terminals of the set N1' through N11' and one of the terminals in the set A, In, Ou, Ac and MQ are brought up to ground potential. Pulses of current are thereby sent simultaneously through one vertical and one horizontal drive winding to set to 0 the storage cores at the corresponding digit position of the corresponding address. Pulses are generated in any of these cores that were initially in the 1 state, and these pulses represent the digit stored. Then to write a digit, a negative potential is again applied to the terminals that were at ground potential during the reading, and at the same time certain of the terminals 8', 4', 2', and 1' are brought up to ground potential. At this time current pulses flow in through the vertical and horizontal drive windings in a direction that tends to cause the storage cores of the corresponding digit position of the corresponding address to be set to 1. In those groups of cores where no inhibit winding pulse is received, the corresponding storage cores are set to 1, but in the other groups, the storage cores remain in the 0 state. Inasmuch as a relatively positive signal in the calculator ordinarily represents a 1, the signals applied at terminals 8', 4', 2', and 1' represent the inverse of the bits of a decimal digit. For example, if the decimal digit zero is to be stored, all four of the signals applied to terminals 8', 4', 2', and 1' are positive. Any of the terminals 8', 4', 2', and 1' that may have been brought up to ground potential during the write operation are returned to a negative potential, and before another read operation is commenced these terminals are held at a negative potential for a time that is sufficiently long to allow the pulse transformer cores in the inhibit circuits to be returned to the "off" condition.

The storage unit of FIGURE 3 comes into play twice during each electronic cycle of operation of the calculator. The digit position and address which is actuated by the writing process is always the same digit position and address actuated during the preceding reading process. However, the second time in an electronic cycle that the storage unit is brought into play for the reading and writing of a digit, both the digit position and the address may be, and usually are, different from the ones involved in the first part of the cycle. Within an electronic cycle, the change in address is made only through a change in the selection of the terminals A, In, Ou, Ac, and MQ. The status of relays R6, R7, R13, and R14 is not changed within an electronic cycle. The digit which is written at the time of a write process may be the same digit or a different digit from the one that was sensed during the previous read process. In the operation of the calculator, it happens that the storage unit is used in such a manner that during the first read and write process in each electronic cycle the digit written is always the same as the digit that was sensed, but during the second read and write process the digit written is generally different from the one that was sensed.

The circuit of each of the four amplifiers 236–1, 236–2, 236–4, and 236–8 in FIGURE 3 is shown in FIGURE 4a. The two input terminals 301 and 302 are connected to an input winding 303 of a pulse transformer. The ends of the secondary winding 304 are connected to the anodes of diodes 305 and 306, respectively, and the center tap on 304 is connected to a source of negative potential which is provided at the junction of resistors 307 and 308, the opposite ends of which are connected to ground and to terminal −125V, respectively. The resistance of 307 is very much less than the resistance of 308 so that the magnitude of the negative potential at their junction will be only a fraction of a volt. Capacitor 309 is connected across resistor 307 to provide a relatively stable potential during the time that pulses are transmitted through the pulse transformer. The cathodes of diodes 305 and 306 are connected together and to the left-hand grid 319b of a twin-triode vacuum tube. Grid 319b is also connected through resistor 310 to ground. The left-hand cathode 319c of the twin-triode tube is connected through the parallel connection of resistor 312 and capacitor 311 to ground. The left-hand anode 319a of the twin-triode tube is connected through resistor 318 to terminal 125V, and 319a is also connected through capacitor 315 to the right-hand grid 319e of the twin-triode tube. Grid 319e is also connected through resistor 316 to terminal 125V. The right-hand cathode 319f of the twin-triode tube is connected through the parallel connection of resistor 313 and capacitor 314 to terminal −125V. The right-hand anode 319d of the twin-triode tube is connected to output terminal 321 and connected through resistor 317 to terminal 125V.

The operation of the amplifier circuit in FIGURE 4a is conventional and is well known to the prior art. The pulse transformer comprising windings 303 and 304 has a large step-up turns ratio to produce a voltage pulse of substantial magnitude from the relatively small pulse that is generated in the sense windings of the storage cores. Inasmuch as the voltage pulse induced in the sense winding may have either polarity depending on which way the sense winding happens to pass through the particular storage core being sensed, a rectifier network of diodes 305 and 306 is used to generate a pulse that is positive at grid 319b regardless of the polarity of the pulse applied at input terminals 301 and 302 by the sense winding which may be connected to these terminals. In the absence of pulses being amplified, grid 319b is held at substantially ground potential because of the connection through resistor 310 to ground. With the grid at ground potential, a current flows from terminal 125V through resistor 318 to anode 319a and then to cathode 319c and through resistor 312 to ground. The resulting voltage drop across resistor 312 causes cathode 319c to be maintained at a potential somewhat positive with respect to ground, and thereby with respect to grid 319b also, so that current that might otherwise flow in the grid circuit is negligible. The potential of the anodes of diodes 305 and 306 is, in the absence of pulses being amplified, held slightly negative with respect to ground and thereby with respect to the cathodes of these diodes. This negative potential is the result of the connections through the secondary winding 304 to the negative potential at the junction of resistors 307 and 308. With the arrangement described, small pulses, such as the extraneous pulses occurring when a 0 is sensed, appearing in the secondary 304 do not cause the diodes to become conducting and therefore do not raise the potential at grid 319b. On the other hand, when a relatively large pulse, such as occurs when a 1 is sensed, appears at the secondary 304, one of the ends of 304 will become positive. One of the diodes 305 and 306 will become conducting, and the positive pulse is transmitted to grid 319b. Which of the diodes 305 or 306 that becomes conducting depends on the polarity of the input pulse. A positive pulse at grid 319b causes a temporary increase in the current flow from anode 319a to cathode 319c and through resistor 318. This increase in current causes a negative pulse to appear at anode 319a, and this negative pulse is transmitted through capacitor 315 to grid 319e. Although grid 319e is connected through resistor 316 to terminal 125V, the potential of this grid is only slightly more positive than the potential of cathode 319f because the resistance of 316 is chosen to have a very high value especially in comparison with the resistance that appears from grid 319e to cathode 319f with the grid slightly positive with respect to the cathode. The path from anode 319d to cathode 319f is nevertheless rendered conductive so that a current flows from terminal 125V through resistor 317, from anode 319d to cathode 319f, and through resistor 313 to terminal −125V. The relative resistances of 317 and 313 are chosen with respect to each other and with respect to the effective anode-to-cathode resistance to produce, in the absence of a pulse being amplified, a potential of about −30 volts at anode 319d. A negative pulse applied at grid 319e causes a temporary reduction in the amount of current flowing to anode 319d and it thereby causes a positive pulse to appear at anode 319d and at the output terminal 321. Capacitors 311 and 314 tend to hold constant the potentials at the respective cathodes to which they are connected. In the absence of these capacitors, the cathode potentials would tend to vary in phase with their respective grid potentials and thereby produce a negative feedback action, which is not wanted in this amplifier. The amplifier is so designed that the amplitude of the positive output pulse is sufficiently great to carry the potential of the output terminal from its initial negative value to ground potential or more positive. The design procedure is principally a matter of selecting a suitably large step-up turns ratio for the input transformer and selecting a tube with a suitably large amplification factor.

FIGURE 4b shows the symbol for the circuit in FIGURE 4a. The symbol comprises a square with the notation "AMP." therein. The two terminals at the bottom of the square correspond to input terminals 301 and 302 in FIGURE 4a. The terminal at the top of the square corresponds to terminal 321.

FIGURE 4c shows the layout of the storage unit with regard to the data stored therein. Each small square represents the storage of one decimal digit in the 8-4-2-1 code. There are sixteen horizontal rows of squares, each row representing the storage of one ten-digit decimal number plus the sign of that number. The sign is actually stored as an eleventh digit with 0 representing a positive quantity for the remaining digits of the number and with 9 representing a negative quantity. Negative numbers are stored in the 9's complement system. That is, for example, the negative number −600 would be stored as 99999999399, with the first 9 being the indication of a negative number. The various digits of a number are designated by the notation N1 through N11 as indicated along the top of FIGURE 4c. N1 corresponds to the units digit, N2 the tens digit, N3 the hundreds digit, and so on to N10 which corresponds to the billions digit. N11 corresponds to the sign.

The sixteen rows of squares are each given an address designation from 0 through 15 as indicated along the right-hand edge of FIGURE 4c. Four of these address positions have special functions in the calculator. Address 0 is the Accumulator, abbreviated Ac. As the name implies, the Accumulator is used for the accumulation of sums in the course of calculations, and it has other related functions. Address 13 is the Input Register, abbreviated In. Numbers are entered into the Input Register from the input device. The decimal digits are entered one at a time, high order first. The particular position into which the digits are entered is the N1 position of address 13 as indicated by the square designated "IN" in FIGURE 4c. When a digit is entered, all other digits in this register are shifted to the left one position. Address 14 is the Output Register, abbreviated Ou. Numbers to be transmitted to the output device are obtained from the Output Register, and are transmitted one digit at a time, high order first. The particular digit that is sent to the output device at any given time is the digit in the N10 position as indicated by the square designated "OUT" in FIGURE 4c. When a digit is sent to the output device, all other digits in the Output Register are shifted to the left one position. Address 15 is the Multiplier-Quotient Register, abbreviated MQ. The Multiplier-Quotient Register stores the multiplier during a MULTIPLY operation. In a DIVIDE operation the quotient is built up in this register. The N11 position of the Multiplier-Quotient Register is used as a cycle counter to count the number of digits in the multiplier that have been used in the course of a MULTIPLY operation and to count the number of quotient digits that have been generated in the course of a DIVIDE operation. The N11 position of the Multiplier-Quotient Register is also used as a cycle counter to count the number of positions shifted in a SHIFT LEFT or a SHIFT RIGHT operation. The digit position that is used for a cycle counter is designated by the word "COUNTER" in FIGURE 4c.

*Basic logical circuits*

The basic logical circuits which are used in the calculator of this invention are all known to the prior art and include a flip-flop, a diode "and" circuit, a diode "or" circuit, a single-shot (sometimes called a monostable circuit), a cathode follower, an inverter, and a diode gate. These basic circuits and the symbols that are used for indicating them are described in this section of the specifications. A number of special circuits will be described in subsequent sections when describing the drawings in which they are used.

Figures 5A, 5B:
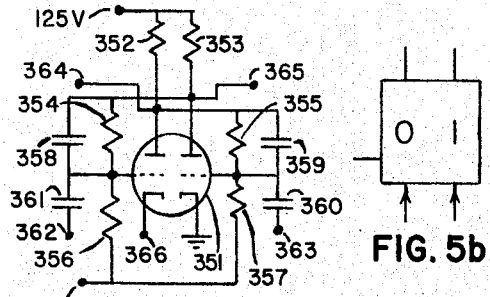
FIGURES 5a and 5b show the circuit and symbol, respectively, for the flip-flop used in this invention.

FIGURE 5a shows a flip-flop circuit comprising a twin-triode tube 351, the right-hand cathode of which is connected to ground. The left-hand cathode is connected to terminal 366, which in some applications of the flip-flop is connected directly to ground also, but in other application it is connected through other circuits to be described later. However, for purposes of explanation of the flip-flop, it may be assumed that terminal 366 is held at ground potential. The left-hand and right-hand anodes of tube 351 are connected through resistors 352 and 353, respectively, to terminal 125V. The left-hand grid is connected through the parallel combination of resistor 354 and capacitor 358 to the right-hand anode, through resistor 356 to terminal −125V, and through capacitor 361 to input terminal 362. Similarly, the right-hand grid of tube 351 is connected through the parallel combination of resistor 355 and capacitor 359 to the left-hand anode, through resistor 357 to terminal −125V, and through capacitor 360 to input terminal 363. The left-hand and right-hand anodes are connected to output terminals 364 and 365, respectively.

The values of the various resistances in FIGURE 5a are so chosen that when the right-hand portion, for example, of the twin triode is conducting, the relatively negative potential occurring at the right-hand anode causes a sufficiently negative potential to exist at the left-hand grid to hold the left-hand portion of the tube cut off. The relatively positive potential thereby occurring at the left-hand anode causes the potential at the right-hand gird to be pulled in the positive direction to maintain the conducting condition of the right-hand portion of the tube. The flip-flop circuit will maintain itself in this stable state indefinitely. Similarly, if the left-hand portion of the tube is initially conducting, the right-hand portion will be cut off, and the circuit will maintain itself in this alternate stable state indefinitely.

If the flip-flop circuit in FIGURE 5a is initially in the state with the right-hand portion conducting, and if a negative pulse of sufficient magnitude is applied at input terminal 363, the right-hand portion will become cut off, and the left-hand portion will become conducting. The circuit will then remain in this alternate stable state. Similarly, if the circuit is initially in the alternate stable state, and if a negative pulse of sufficient amplitude is applied at input terminal 362, the left-hand portion will become cut-off, and the right-hand portion will become conducting, and the circuit will again exist in the original stable state. Capacitors 358 and 359 serve to increase the speed of action of the flip-flop by causing a change in potential at one anode to be coupled more effectively to the grid of the opposite portion of the twin-triode.

In FIGURE 5a, if a negative pulse of sufficient amplitude is applied to input terminals 362 and 363 simultaneously, the flip-flop will change to the opposite stable state regardless of which stable state it was in initially. Assume that the flip-flop is initially in the state with the right-hand portion conducting. The negative pulse at terminal 363 will cause the right-hand portion to become cut off. The negative pulse at terminal 362 will tend to cause the left-hand portion to become held even more strongly in the cut-off condition. However, the values of the various capacitances and the amplitude and duration of the input pulse are so chosen that the positive pulse, which occurs at the right-hand anode when the right-hand portion becomes cut off and which is coupled through capacitor 358 to the left-hand grid, overrides the input pulse and causes the left-hand portion to become conducting. An analogous action is obtained when the left-hand portion is initially conducting and a negative input pulse is applied to both input terminals simultaneously. In other words, when a pulse is applied to both input terminals simultaneously, the circuit changes to the opposite stable state from the state it was in initially.

The symbol used to designate a flip-flop is shown in FIGURE 5b. The symbol comprises a square containing the notation of 0 on the left-hand side and of 1 on the right-hand side. The output terminals are represented by two vertical lines, one from each side of the top of the square. When the right-hand portion of the flip-flop is conducting, the flip-flop is said to store a 0. In this condition, the output potential on the 0 or left side of the flip-flop is relatively positive, and the output potential on the 1 or right side is relatively negative. The two input terminals are designated by vertical lines terminated in arrow heads pointing towards and adjacent to the bottom edge of the square. A negative pulse at the left input terminals causes the flip-flop to store a 0 where or not it initially stored a 0. Analogous conditions prevail for the storing of a 1 and for the setting of the flip-flop to 1. The horizontal line leading to the lower portion of the left-hand side of the square designates the left-hand cathode.

Figures 5C, 5D:
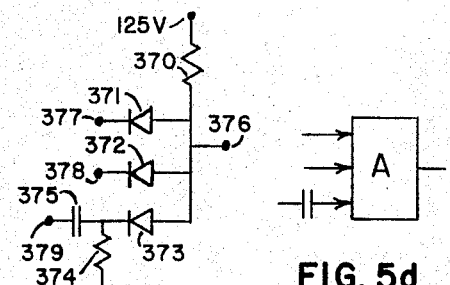
FIGURES 5c and 5d show the circuit and symbol, respectively, for the diode "and" circuit used in this invention.

FIGURE 5c shows a diode "and" circuit comprising three diodes 371, 372, and 373 with a common anode connection that is connected to output terminal 376 and is also connected through resistor 370 to terminal 125V.

The cathodes of diodes 371 and 372 are connected to input terminals 377 and 378, respectively. The cathode of diode 373 is connected through capacitor 375 to input terminal 379 and through resistor 374 to terminal 125V. The relative resistances of 370 and 374 are so chosen that in the absence of input signals, the potential at the output terminal is about 25 volts negative as a result of current flowing from terminal 125V through resistor 370, the low resistance direction of diode 373, and resistor 374 to terminal —125V. If positive input signals are applied to either one or both of input terminals 377 and 378, the potential of the output terminal 376 will not rise because one or the other of diodes 371 and 372, or both as the case may be, will appear in the high resistance condition and will not cause any significant effect on the current just mentioned. However, if at the same time a positive pulse (or a positive-going signal) is applied at input terminal 379, this positive pulse will be coupled through capacitor 375 to the junction of resistor 374 and diode 373 and will cause the potential at this junction to rise, provided the rate of rise of potential at the input terminal is sufficiently fast. The diminished current through resistor 370 will then cause the output potential at terminal 376 to rise accordingly. In other words the output potential rises only when the input potential at terminal 377 is positive "and" when the input potential at terminal 378 is positive "and" when a positive-going input signal is applied at terminal 379.

The symbol in FIGURE 5d is used for the diode "and" circuit. It comprises a rectangle with the letter A contained therein. A number of lines terminating in arrow heads lead to the periphery of the rectangle to signify input lines. A line leading from the periphery, but without an arrow head, signifies the output terminal. The positions of the various input lines and the output line about the periphery are immaterial. One of the input lines has the symbol for a capacitor in series with it, and this particular input line corresponds to the capacitor-input terminal 379 in FIGURE 5c. Actually, an "and" circuit may have any number of input lines leading to it, but only one may be of the capacitor-input type. If there were two capacitor-input lines, each having a capacitor and a resistor corresponding to 375 and 374, respectively, the potential at the output terminal 376 would become excessively negative in the absence of input pulses. With the circuit shown, this situation cannot be corrected conveniently by choosing a higher value of resistance for 374 because then an input pulse at only one of the capacitor input lines would tend to cause a small and unwanted positive excursion of the output potential. On the other hand, it is permissible to have none of the input lines of the capacitor type. In this case none of the input lines in FIGURE 5d will be shown with capacitors. Also, in this case the output potential will be substantially equal to the most negative of the input potentials. That is, the output potential will be relatively positive only when all of the input potentials are relatively positive. Whether or not there is a capacitor input to any given diode "and" circuit, it is, of course, implied that the number of diodes in the "and" circuit is equal to the number of input lines with one diode functioning for each input in the manner explained for FIGURE 5c. In subsequent descriptions the two types of "and" circuit input lines will be referred to as "pulse inputs" or "direct inputs" according to whether there is or is not a capacitor in the input line.

Figures 5E, 5F:
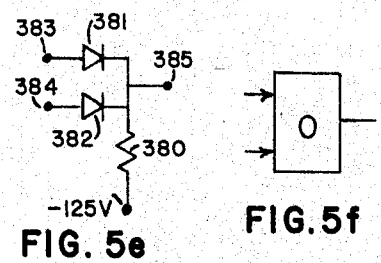
FIGURES 5e and 5f show the circuit and symbol, respectively, for the diode "or" circuit used in this invention.

The diode "or" circuit in FIGURE 5e comprises two diodes 381 and 382 with a common cathode connection that is connected to output terminal 385 and is also connected through resistor 380 to terminal —125V. The anodes of the diodes are connected to input terminals 383 and 384, respectively. With this circuit the potential of the output terminal is substantially equal to the more positive input terminal. For example, assume that the potential at input terminal 383 is some value that is more positive than −125 volts and that the potential at input terminal 384 is less positive than the potential of terminal 383. Under these conditions a current will flow from input terminal 383 through diode 381 and resistor 380 to terminal −125V. Because of the low resistance of diode 381 to current flow in this direction, the potential at output terminal 385 will be substantially equal to the potential of terminal 383. The potential at input terminal 384 will have substantially no effect on the circuit because the anode of diode 382 will be less positive than the cathode of this diode, and the diode will therefore appear as a high resistance. A similar situation prevails when the potential at input terminal 384 is the more positive. In other words, the output potential becomes relatively positive when the potential at input terminal 383 "or" the potential at input terminal 384 becomes relatively positive.

The symbol for the diode "or" circuit in FIGURE 5f comprises a rectangle with the letter O contained therein. The input terminals are signified by lines terminating in arrow heads at the periphery of the rectangle. A line leading from the periphery, but without an arrow head, signifies the output terminal. An "or" circuit may have any number of input lines leading to it, with it being assumed, of course, that there is one diode for each input line. In some cases an "or" circuit with only one input line may be used. The purpose in these instances is not to provide an "or" function, but it is to provide a more standardized circuit design when there are similar combinations of "and" and "or" circuits elsewhere in the calculator.

Figures 5G, 5H:
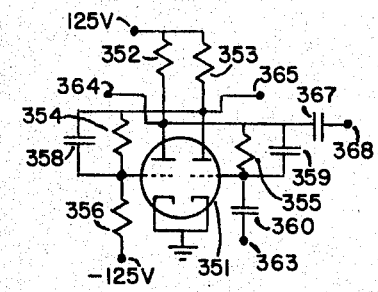
FIGURES 5g and 5h show the circuit and symbol, respectively, for the single-shot used in this invention.

The single-shot circuit used in the calculator of this invention is shown in FIGURE 5g. It is the same as the flip-flop in FIGURE 5a with the following exceptions: the left-hand input capacitor 361 and terminal 362 are omitted, the resistor 357 connecting the right-hand grid and terminal −125V is omitted, both cathodes are connected directly to ground, and a capacitor 367 has been added which connects the left-hand anode to an added input terminal 368. Because of the omission of the connection between the right-hand grid and the negative bias potential, the single-shot has only one stable state, and that is with the right-hand portion of the tube conducting. As with the flip-flop, a negative pulse applied at input terminal 363 will cause the right-hand portion of tube 351 to become cut off. The positive pulse thereby generated at the right-hand anode will be applied to the left-hand grid to cause the left-hand portion of the tube to become conducting. The negative pulse thereby generated at the left-hand anode will be applied through capacitor 359 and resistor 355 to the right-hand grid to drive the right-hand portion of the tube further into the cut-off condition. However, the right-hand portion will not remain cut off because current from the left-hand anode, which, although of less positive potential than before, is still positive with respect to ground, will cause the potential of the right-hand grid to become less negative. As the potential of the right-hand grid changes in the positive direction, it will eventually reach a value that will allow conduction to take place in the right-hand portion of the tube. The duration of the time in which the single-shot will remain in the condition with the right-hand portion cut off will be dependent on several design parameters, but principally on the resistance of 355 and the capacitance of 359. When the right-hand portion becomes conducting, the opposite chain of events will occur, and the circuit will revert to its initial stable state. A negative pulse applied at input terminal 368 has the same effect as a negative pulse on input terminal 363 although the coupling path between terminal 368 and the right-hand grid is now through capacitors 367 and 359 in series. Because of the more direct loading of the left-hand anode circuit on the input pulse, a larger amplitude pulse is required on terminal 368 to initiate the action. In instances where one single-shot is actuated directly from the output of another single-shot, it is found that this alternative input circuit is desirable because a large amplitude actuation signal is available and it is found that reliable operation is obtained over a wider range of circuit parameters, and the circuit is less likely to be actuated by extraneous excursions of the output potential of the actuating single-shot.

The symbol for the single-shot is shown in FIGURE 5h, and it comprises a square containing the letters SS. The two output lines are signified by vertical lines at the top of the square. The right-hand output line is normally relatively negative and becomes positive when the single-shot is actuated, and its potential returns to its initial relatively negative value at the termination of the single-shot action. The left-hand output potential is relatively positive when the single-shot is in the quiescent condition, but becomes relatively negative when the single-shot is actuated. The input terminal corresponding to terminal 363 is signified by a vertical line terminating in an arrow head on the right-hand portion of the bottom of the square. The alternate input line is signified by a horizontal line terminated in an arrow head on the upper portion of the right-hand side of the square. In subsequent drawings, one or the other of the input lines and one or the other of the output lines may be omitted if not used in the particular application in question.

Figures 5I, 5J:
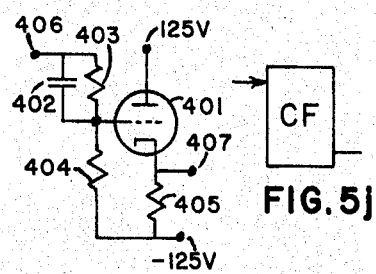
FIGURES 5i and 5j show the circuit and symbol, respectively, for the cathode follower used in this invention.

FIGURE 5i shows the cathode follower circuit. This circuit comprises a triode tube 401 with its anode connected to terminal 125V. The cathode of the tube is connected to output terminal 407 and through resistor 405 to terminal −125 V. The grid of the tube is connected through the parallel combination of resistor 402 and capacitor 403 to input terminal 406, and it is also connected through resistor 404 to terminal −125V. Resistors 402 and 404 act as a voltage divider to lower the potential level of the signal applied at terminal 406. In each application of the cathode follower, the input signal is derived from the anode circuit of a flip-flop or a single-shot. A current flows from terminal 125V through the tube and through resistor 405 to terminal −125 V. The amount of this current is limited by the fact that an excessively large current would create a voltage across resistor 405 of such magnitude that the potential of the cathode would be substantially more positive than the grid thereby causing a cut-off action by the tube. The amount of current through the tube and therefore the output potential at terminal 407 is thus controlled by the grid potential. The voltage gain of the cathode follower is slightly less than one, but the current gain is quite large because the cathode is slightly more positive than the grid so that the grid draws very little current from the input circuit. The voltage divider comprised of resistors 402 and 403 does, however, load the input circuit somewhat. Capacitor 403 serves to increase the speed of operation of the circuit by coupling changes in input potential directly to the grid so that stray capacitances can be charged more directly and rapidly than would be the case if the charging currents were limited to that available through resistors 402 and 404. The relative resistances of 402 and 404 are so chosen that with the voltage swings available at the input terminal, the potential at the output terminal 407 swings between approximately 25 volts negative with respect to ground and 15 volts positive with respect to ground. Specifically, when the output potential is negative, its magnitude should be sufficiently great to cause cut-off when the potential is applied to the grid circuit of some other tube. In general, a negative potential of 10 volts is sufficient for this purpose.

The symbol for the cathode follower is shown in FIGURE 5j. The symbol comprises a rectangle with the letters CF contained therein. The input and output terminals are designated by lines leading to the rectangle with the input terminal distinguished by an arrow head pointing towards and adjacent to the rectangle. The positions of the lines about the periphery of the rectangle are immaterial.

Figures 5K, 5L, 5M:
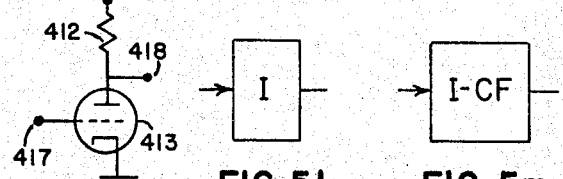
FIGURES 5k and 5l show the circuit and symbol, respectively, for the inverter used in this invention.
FIGURE 5m shows the symbol used for the combination of an inverter and a cathode follower.

The circuit in FIGURE 5k is an inverter. The inverter comprises a triode tube 413 with the anode connected to an output terminal 418 and connected through resistor 412 to terminal 125V. The grid of the tube is connected to input terminal 417, and the cathode is connected to ground. When the potential applied at input terminal 417 is sufficiently negative, the tube is cut off, and the anode potential rises to a relatively positive value. When the input potential is at ground potential or slightly more positive, the tube conducts current, and because of the voltage drop in resistor 412, the anode assumes a relatively negative potential, although the anode is still positive with respect to ground. The name "inverter" is derived from the fact that the relative polarity of the output signal is inverted with respect to the relative polarity of the input signal at any given time.

The symbol used for the inverter is shown in FIGURE 5l. The symbol comprises a rectangle with the letter I contained therein. The input and output terminals are designated by lines leading to and from the rectangle with the input line distinguished by an arrow head pointing towards and adjacent to the rectangle. The positions of the lines about the periphery of the rectangle are immaterial.

FIGURE 5m shows the symbol for the inverter circuit as in FIGURE 5k in combination with the cathode follower circuit as in FIGURE 5i. It is assumed that the output terminal of the inverter is connected to the input terminal of the cathode follower. The symbol comprises a square with the notation I–CF contained therein. The same conventions are used with regard to the designation of input and output terminals for the resulting combination. This combination is used in the Up-down Counters.

Figures 5N, 5O, 5P:
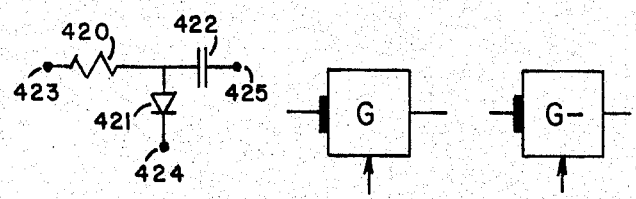
FIGURES 5n and 5o show the circuit and symbol, respectively, for the diode gate used in this invention.
FIGURE 5p shows the symbol used for the gate circuit when the capacitor of the gate is located in the circuit to which the gate is connected.

The diode gate circuit in FIGURE 5n comprises a resistor 420 with one of its ends connected to one plate of a capacitor 422, and this common junction is also connected to the anode of a diode 421. The opposite elements of each of these three components are connected to terminals 423, 425, and 424, respectively.

In the operation of the diode gate of FIGURE 5n, an input gating potential is applied at terminal 423, and an input pulse to be gated is applied to input terminal 424. If the quiescent potentials of the two input potentials are substantially the same, then any negative excursion of the potential at terminal 424 will cause diode 421 to exist in the low resistance condition, and this negative excursion will be coupled through capacitor 422 to output terminal 425. When the potential at terminal 424 is restored to its initial value, current from terminal 423 through resistor 420 will restore the potential at the common junction to its initial value. The rate of rise in potential at the common junction will be relatively slow, with the rate being principally a function of the resistance of 420 and the capacitance of 422. Accordingly, the positive-going portion of any pulse applied at terminal 424 will be poorly transmitted to terminal 425. However, a fast response is required only for negative-going potentials in the applications in which the gate is used. The requirement on the positive-going portion is limited to the need for having the gate in a condition to transmit another negative-going pulse on a later cycle of operation.

If the input potential applied at terminal 423 is sufficiently negative with respect to the quiescent potential at terminal 424, diode 421 will exist in the high resistance condition, so that a negative-going excursion of the potential at 424 will not affect the potential at the common junction, and no pulse will be transmitted to output terminal 425. Of course, for the gate to be closed in this manner, the extent of the negative excursion of potential at terminal 424 must not be so great that the potential at this terminal becomes more negative than the potential at terminal 423.

The symbol for the diode gate circuit comprises a square with the letter G contained therein as shown in FIGURE 5o. The input terminal corresponding to the gating terminal 423 is designated by a line leading to the square and terminated by a small solid rectangle at the periphery of the square. The pulse input terminal corresponding to terminal 424 is designated by a line terminated by an arrow head pointing to the square at the periphery of the square. The output terminal corresponding to terminal 425 is designated by a line leading away from the square with no other identifying marks. The positions of the various terminals around the periphery of the square are immaterial.

In some instances the capacitor corresponding to 422 of FIGURE 5n will be in some other circuit, such as the input circuit of a flip-flop to which the diode gate circuit is connected. In such instances the gate is designated in the same way except that the G is followed by a minus sign, such as G—, in the notation as indicated in FIGURE 5p. The actual circuit is not changed, except that it may be assumed that the capacitor within the symbol has been omitted (replaced by a closed circuit) and that the capacitor is in series with the line to which the diode gate output is connected.

*Timing Pulse Generator and Start-Stop Flip-Flop*

Figure 6A:
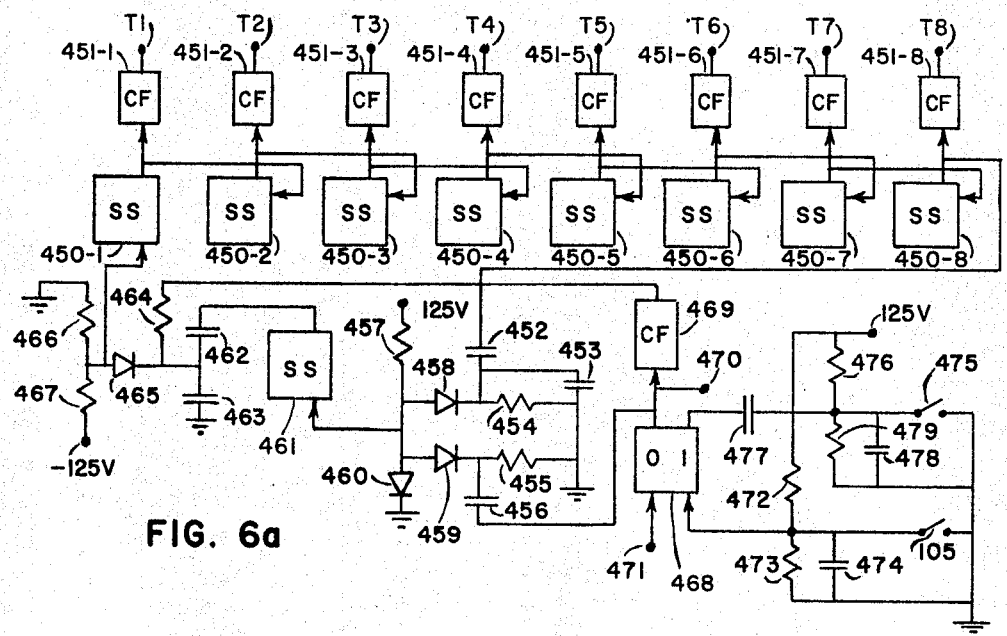
FIGURE 6a shows the details of the Start-Stop Flip-Flop and the Timing Pulse Generator represented by blocks 106 and 114, respectively, in FIGURE 1.

The Timing Pulse Generator and Start-Stop Flip-Flop (blocks 114 and 106, respectively, in FIGURE 1) are shown in detail in FIGURE 6a. Eight single-shots 450–1 through 450–8 are shown connected in tandem with the output of each connected to the alternate input of the next one in succession. Also, the output of each of these eight single-shots is connected to the input of one of a set of eight cathode followers 451–1 through 451–8, respectively. The outputs of 451–1 through 451–8 are connected to terminals T1 through T8, respectively. Terminals T1 through T8 carry control signals or "timing pulses," likewise designated T1 through T8, respectively.

The output of single-shot 450–8 is connected to one plate of capacitor 452, the opposite plate of which is connected to one plate of capacitor 453. The junction of 452 and 453 is connected to the cathode of diode 458 and to one end of resistor 454. The 0-output of the Start-Stop Flip-Flop 468 is connected to one plate of a capacitor 456. The opposite plate of 456 is connected to the cathode of diode 459 and to one end of resistor 455. The anodes of diodes 458 and 459 are connected together and to the anode of diode 460, to one end of resistor 457, and to the input terminal of single-shot 461. The opposite elements of 453, 454, 455, and 460 are connected to ground. The opposite end of resistor 457 is connected to terminal 125V. The output terminal of single-shot 461 is connected to one plate of capacitor 462, the opposite plate of which is connected to one plate of capacitor 463. The junction of 462 and 463 is connected to one end of resistor 464 and to the cathode of diode 465. The opposite end of 464 is connected to the output terminal of cathode follower 469, the input terminal of which is connected to the 0-output of flip-flop 468. The anode of diode 465 is connected to one end of resistor 466, one end of resistor 467, and the input terminal of single-shot 450–1. The opposite elements of 463 and 466 are connected to ground. The opposite end of 467 is connected to terminal —125V. The 0-output of flip-flop 468 is also connected to a terminal 470, which is used for transmitting a signal to the Up-down Counters to set those counters to the state representing N0 and to the Electronic State Signal Generator for setting it to the K1 state. Terminal 471 carries the "Stop" signal and is connected to the 0-input of flip-flop 468. Switch 105, resistor 473, and capacitor 474 are connected in parallel with one terminal connected to ground and the other terminal connected to the 1-input of flip-flop 468 and connected through resistor 472 to terminal 125V. Switch 475, resistor 479, and capacitor 478 are connected in parallel with one terminal connected to ground and the other terminal connected through capacitor 477 to the 1-output of flip-flop 468 and connected through resistor 476 to terminal 125V.

In FIGURE 6a, switch 475 is used to insure that the Start-Stop Flip-Flop 468 is in the 0 state after the calculator has been turned on and after the tubes have reached their operating temperature, but before any calculation takes place. When switch 475 is open, the potential at the junction of resistors 476 and 479 is at some positive value. Then, when switch 475 is closed, the potential at this junction is suddenly dropped to ground potential. This negative-going pulse is coupled through capacitor 477 to the right-hand anode of flip-flop 468, and it causes the potential at that point to be driven in the negative direction. This action causes the flip-flop to be set to the 0 state whether or not it was already in the 0 state. The mechanism of setting the flip-flop is substantially the same as though a negative pulse had been applied at the left-hand grid inasmuch as the left-hand grid and the right-hand anode of the flip-flop are internally coupled by a capacitor. Although a larger amplitude pulse is required for setting the flip-flop when applying a pulse at the anode in comparison with applying a pulse at the grid, the circuit shown can be readily designed to supply a pulse of the required amplitude, and the grid input is thereby available for actuation from another source. Capacitor 478 is of sufficiently high capacitance to cause the potential at the junction of resistors 476 and 479 to rise to its initial value relatively slowly when switch 475 is subsequently opened. Therefore, when switch 475 is opened the potential at the junction of resistors 476 and 479 will not rise sufficiently fast to create a positive pulse that is capable of returning flip-flop 468 to the "on" or 1 state. Also, inasmuch as the wire connecting switch 475 and capacitor 477 may have appreciable length and may be in close proximity to other pulse-carrying wires, capacitor 478 serves to filter out any stray pulses that may be coupled to this wire.

For purposes of this invention, switch 475 in FIGURE 6a may be a manually operated switch, although actually it is intended that it be a contact operated by the card reading device or other input device.

Flip-flop 468 may also be set to the 0 state by a negative pulse applied at terminal 471. In the operation of the calculator, a negative pulse is applied at terminal 471 when an electronic operation is completed. The generation of this pulse is described in detail later.

Switch 105 in FIGURE 6a causes the Start-Stop Flip-Flop 468 to be set to the 1 state. When switch 105 is open, the potential at the junction of resistors 472 and 473 is at some positive value. Then, when switch 105 is closed, the potential at this junction suddenly drops to ground potential. This negative-going pulse applied at the 1 input of flip-flop 468 causes the flip-flop to be set to the 1 state. Capacitor 474 prevents the potential at the junction of 472 and 473 from rising excessively rapidly when switch 105 is opened again so that flip-flop 468 will not be set to the 0 state at this time. Also, if there should be some contact bounce in switch 105, the potential rise at the junction of resistors 472 and 473 will be sufficiently slow that subsequent closures resulting from the bouncing will not cause a second actuation of flip-flop 468 in the event that a 0-setting signal arrives at terminal 471 during the time that switch 105 is bouncing. Capacitor 474 also serves to filter out stray pulses that may be coupled to the wire interconnecting switch 105 and flip-flop 468.

Switch 105 in FIGURE 6a is closed after the relays (see blocks 103 and 104 in FIGURE 1) representing an instruction of the program and a digit of data have been actuated. At the time switch 105 is closed, flip-flop 468 will always have been previously set to the 0 state either by the closing of switch 475 or by a signal on terminal 471. For purposes of this invention, switch 105 may be assumed to be manually operated at the time indicated above, that is, when the calculator is prepared to execute an instruction, although actually it is intended that switch 105 be a contact operated by the card reading device or other input device.

Prior to the time that switch 105 is closed and during the time that flip-flop 468 is in the 0 state, the relatively positive signal then existing at the 0-output terminal of flip-flop 468 is passed through a cathode follower 469, in the manner described for cathode followers, and through resistor 464 to the cathode of diode 465. The cathode of 465 is then at a positive potential. The anode of diode 465 is held at a negative potential through the action of resistors 466 and 467. The diode is therefore in the high-resistance condition so that negative pulses arriving at the cathode of diode 465 from capacitor 462 are prevented from passing through the diode.

When flip-flop 468 is changed to the 1 state as a result of the closing switch 105, a negative-going signal is generated at the 0-output of the flip-flop. This negative-going signal is coupled through capacitor 456 to the cathode of diode 459. Both the cathode and the anode of diode 459 are normally at ground potential because of the connections to ground through resistor 455 and diode 460. The negative pulse at the cathode of diode 459 is therefore transmitted through diode 459 to the input of single-shot 461 to actuate that device. The potentials of the anode and cathode of diode 459 are restored to their initial values by currents through resistors 455 and 457. A positive-going pulse from the 0-output of flip-flop 468 is subsequently generated when the flip-flop is returned to the 0 state, but this pulse does not pass through diode 459 because a positive pulse causes the cathode potential to become more positive than the anode so that the diode exists in the high-resistance condition.

Also, when flip-flop 468 in FIGURE 6a is changed to the 1 state, the potential at the output of cathode follower 469 becomes negative. This negative potential is applied through resistor 464 to the cathode of diode 465. The resistance values of resistors 466 and 467 are so chosen that when the circuit is in this condition the cathode and anode potentials of diode 465 are approximately equal. Negative pulses at the cathode of diode 465 will then be transmitted through this diode. The resistance of resistor 464 is chosen to be sufficiently low in relationship to the capacitances in the circuit to allow the potential at the cathode of diode 465 to approximate the negative potential supplied by cathode follower 469 quite closely before any negative-going signals are applied as described in the next paragraph.

When single-shot 461 in FIGURE 6a is actuated as previously described the output line becomes relatively positive for a period of time and then returns to its initial relatively negative (although still positive with respect to ground) value as explained in the description of the single-shot circuit. The signal on the output line from single-shot 461 is designated T0. T0 is coupled through capacitor 462 to the cathode of diode 465. The positive-going portion of T0 does not cause a pulse to be transmitted through diode 465 because the cathode is rendered more positive than the anode so that the diode exists in the high-resistance condition. However, when T0 returns to its initial relatively negative potential as the single-shot returns to its original state of equilibrium this negative-going portion of T0 is transmitted through capacitor 462 and and diode 465 to the input line of single-shot 450–1 to actuate that device. Capacitor 463 in combination with capacitor 462 acts as a voltage divider to provide a better match for the amplitude of the voltage swing of T0 to the voltage swing of the potential at the cathode of diode 465 as provided by cathode follower 469 through resistor 464.

When single-shot 450–1 is actuated, its output potential becomes relatively positive for a period of time and then returns to its initial value. This output potential is applied to the alternate input line of single-shot 450–2. The positive-going portion of the output signal from 450-1 has a slight effect on 450-2 because the internal capacitive coupling between the alternate input line and the right-hand grid of 450-2 allows this grid to be driven temporarily further positive. Therefore, a small negative output pulse appears at the output terminal of single-shot 450-2. This unwanted pulse is held to a very low amplitude, however, because the low resistance in the left-hand anode circuit in the single-shot creates a heavy load at this point in the circuit and because the grid of the right-hand portion of the single-shot is already slightly positive so that a very large amplitude positive signal would be required to cause any significant further increase in the current through the right-hand portion. However, at a later time when the output signal from 450-1 is negative-going, this signal causes single-shot 450-2 to be actuated. The output potential of 450-2 then, in turn, becomes relatively positive for a period of time and subsequently returns to its initial value. The output signal from 450-2 actuates single-shot 450-3 in an analogous manner, that is, the positive-going portion of the signal from 450-2 has a negligible effect, but at a later time the negative-going portion causes single-shot 450-3 to operate. This action is transmitted through single-shots 450-1 to 450-8 in succession. When single-shot 450-8 is actuated, the positive-going output signal applied through capacitor 452 to the cathode of diode 458 is not transmitted through the diode. The reason is that initially both the cathode and anode of the diode are at ground potential as a result of the connections to ground through resistor 454 and diode 460. A positive pulse at the cathode of diode 458 then only causes the diode to appear in the high-resistance condition. However, current through resistor 454 causes the potential of diode 458 to be returned to ground potential before the output signal from 450-8 becomes negative-going. Then, when the signal becomes negative-going, the cathode of diode 458 is driven negative with respect to ground, and this negative pulse is transmitted through diode 458 to the input line of single-shot 461 to actuate that device as before. Capacitor 453 in combination with capacitor 452 serves as a voltage divider to reduce the amplitude of pulses applied at the cathode of diode 458. A reduction in amplitude is desirable because the signal from 450-8 is of larger amplitude than necessary and because extraneous pulses appearing on the line from 450-8 might otherwise pass through diode 458 in sufficient amplitude to actuate single-shot 461. Signal T0 is again transmitted to single-shot 450-1, and the sequence of events is repeated. The process continues repeatedly as long as flip-flop 468 remains in the 1 state.

If at some time a negative pulse at terminal 471 in FIGURE 6a causes flip-flop 468 to be returned to the 0 state, the potential at the cathode of diode 465 will be returned to a positive value. Then, pulses cannot be transmitted through this diode to single-shot 450-1. The cycling of pulses around the loop comprised of single-shots 461 and 450-1 through 450-8 will thereby be terminated. A single passing of a pulse along the chain of single-shots 450-1 through 450-8 constitutes one "cycle." The output signals from these single-shots are applied through cathode followers 451-1 through 451-8, respectively, to terminals T1 through T8, respectively, to provide a set of timing pulses, also designated T1 through T8, respectively.

Figure 6B:
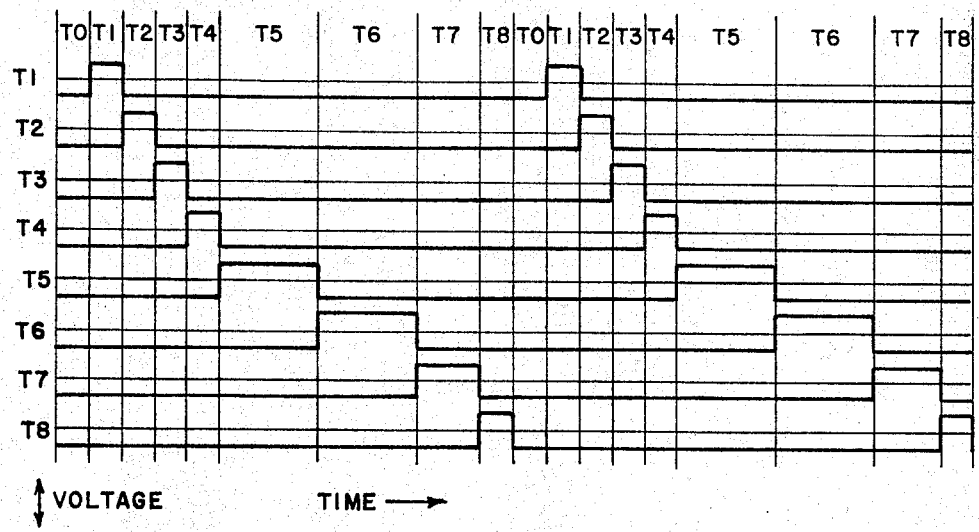
FIGURE 6b shows a timing chart for the pulses generated by the Timing Pulse Generator.

The relationship of the various timing pulses to one another is shown graphically in FIGURE 6b. The left-hand edge of FIGURE 6b represents the time at which flip-flop 468 is set to 1. At some later time determined by the duration of time that single shot 461 is operative, timing pulse T1 becomes positive. When T1 subsequently becomes negative again, T2 becomes positive. When T2 becomes negative, T3 becomes positive, and so on. When T8 becomes negative, another cycle is started if flip-flop 468 has not been reset to the 0 state.

The time interval between the negative-going portion of T8 and the positive-going portion of T1 is again determined by the duration of time that single-shot 461 is operative. The number of cycles through which the timing pulse generator proceeds is dependent on and controlled by the operation being performed as described in detail later.

The various single-shot circuits in FIGURE 6a are designed so that the duration of the timing pulses generated is sufficiently great to allow completion of the calculator operations which they control. With the various circuits used elsewhere in the calculator it is found that about 25 microseconds is sufficient for T1, T2, T3, T4, and T8. Inasmuch as three successive flip-flop actuations may take place in the adder during T5 time (that is, during the time that T5 is positive) or during T6 time, these two timing pulses have approximately 75 microseconds duration. Two successive flip-flop actuations may take place in the adder during T7 time, so this pulse has approximately 50 microseconds duration. The relative durations of the various pulses are indicated in FIGURE 6b by equally spaced vertical lines which show the pulses as lasting for one, two, or three units of time. Any or all of the pulses may have much longer durations than indicated.

FIGURE 6b shows only two cycles of operation of the Timing Pulse Generator, although, of course, many cycles are required for the execution of an instruction. However, each succeeding cycle of timing pulses is identical to each of the two cycles shown. A cycle always terminates at the termination of a T8 pulse. Actually, single-shot 461 in FIGURE 6a is actuated at the termination of the cycles, but the T0 signal thereby generated is blocked by diode 465, as explained previously, so that this signal has no effect.

*The Up-down Counter*

The detailed circuit of the Up-down Counter is shown in FIGURE 7. The Up-down Counter is comprised of the Up-down-3-Counter and the Up-down-4-Counter in blocks 115 and 116, respectively, in FIGURE 1. FIGURE 7 also shows certain of the Address Contacts (block 112 in FIGURE 1) that are used in the HALF ADJUST operation. The Up-down Counter is capable of existing in one of twelve different stable states, designated N0 through N11. Many different forms of counter may be used. The arrangement which has been found to be most conservative in the number of tubes and diodes required and which is at the same time reliable and otherwise practical employs a scheme whereby a 4-counter and a 3-counter are combined. In FIGURE 7, the 4-counter includes as major components the inverter and cathode follower combinations 480-0, 480-1, 480-2, and 480-3. The major components of the 3-counter include the inverter and cathode follower combinations 490-0, 490-1, and 490-2.

To form the 4-counter, a 3-input "or" circuit is connected through a 1-input "and" circuit (the purpose of which is explained later) to each inverter and cathode follower combination (I-CF circuit). For I-CF circuit 480-0, for example, the 3-input "or" circuit is designated 481-0 and the 1-input "and" circuit is designated 482-0. The output terminals of each of two gate circuits are also connected to the input of each I-CF circuit. For I-CF circuit 480-0, the corresponding gates are designated 483-0 and 484-0. The gates are called the "up" gate and "down" gate, respectively. The output terminal of each I-CF circuit is connected to an input terminal of each of the three 3-input "or" circuits of the other three I-CF circuits. Each output terminal is also connected to the gating input line of the gate corresponding to the "up" line of the next higher numbered I-CF circuit and to the gating input line of the gate corresponding to the "down" line of the next lower numbered I-CF circuit. For example, the output from I-CF circuit 480-0 is connected to the gating inputs of gate 483–1, the "up" gate corresponding to I–CF circuit 480–1, and to gate 484–3, the "down" gate corresponding to I–CF circuit 480–3. The output of each I–CF circuit is also connected to one of a set of terminals X0, X1, X2, and X3, respectively.

The 3-counter is formed in an analogous manner, with the necessary differences that each "or" circuit has only two inputs, and each I–CF circuit output is connected to only two "or" circuits. The terminals to which the output lines are connected are designated Y0, Y1, and Y2.

The components associated with the 4-counter in FIGURE 7 cause that portion of the circuit to exist in one of four stable states. For example, assume that signal X0 is positive. This signal is applied through the "or" circuits to each of the other I–CF circuits with the result that each of the signals X1, X2, and X3 will be held negative. These three negative signals applied at the inputs of "or" circuit 481–0 cause a negative signal to appear at the input of I–CF circuit 480–0. The output from 480–0 is therefore positive, which is of the required polarity to hold the 4-counter in this stable state indefinitely. Analogous conditions prevail if any one of the other signals X1, X2, or X3 happens to be positive initially.

In FIGURE 7 an "Up" input terminal 610 is connected through capacitor 501 to one end of resistor 503 and the anode of diode 502. The opposite end of resistor 503 is connected to terminal 125V, and the cathode of diode 502 is connected to the pulse input terminals of all of the "up" gates in both the 4-counter and the 3-counter. A "Down" input terminal 504 is similarly connected to the pulse input terminals of all of the "down" gates in the two counters, with the corresponding capacitor, resistor, and diode being designated 504, 505, and 506, respectively. Because of the current through the resistor-diode combinations and because of the low resistance of the diodes to current flow from terminal 125V through resistors 503 and 505, respectively, the potential at the pulse input terminals of the gates is substantially ground potential in the absence of pulses at the "Up" and "Down" terminals 610 and 611, respectively. A negative pulse at either the "Up" terminal or the "Down" terminal will be coupled through the respective capacitor to cause a negative excursion of potential at the junction of the corresponding resistor-diode combination. Because the diode presents a high resistance to a potential difference of this polarity, the negative pulse will be transmitted to the pulse input terminals of the corresponding gates.

Assume, for example, that the 4-counter is in the stable state where terminal X0 is positive. Then, if a negative pulse is applied at the "Up" terminal, this pulse will be coupled through capacitor 501 to all of the "up" gates in the 4-counter. However, of these gates, only 483–1 will permit a pulse to pass because it is the only one with a positive signal applied at its gating input. The pulse will pass through gate 483–1 to the input of I–CF circuit 480–1. Inasmuch as the pulse is of negative polarity, the effect of 480–1 is to produce a positive output pulse at X1. This positive signal at X1 causes a positive signal to pass through "or" circuit 481–0 and "and" circuit 482–0 to the input of I–CF circuit 480–0. Because of the inverter action of 480–0, the signal at X0 becomes negative. The positive signal at X1 also holds the signals at X2 and X3 negative for analogous reasons. The signal at X1 will then be maintained at a positive value because all three signals applied to the "or" circuit corresponding to I–CF circuit 480–1 will then be negative. The 4-counter will then remain in this new stable state indefinitely. If a second negative pulse is applied at the "Up" terminal, the counter will in a similar fashion shift to the stable state where X2 is positive. A third pulse will cause a shift to the state with X3 positive. A fourth pulse will cause a shift to the state with X4 positive. Continued successive pulses will cause the counter to cycle through the stable states in the sequence indicated.

If negative pulses are applied at the "Down" terminal, the action of the counter will be the same except that the sequence of stable states will be opposite. That is, if X0 is initially positive, X3 will become positive next, then X2, then X1, and then X0 again, and so on.

The action of the 3-counter is substantially identical to the action of the 4-counter with the exception that it reverts to its initial stable state after a sequence of only three input pulses. The sequence is Y0–Y1–Y2–Y0 for input pulses at the "Up" terminal and Y0–Y2–Y1–Y0 for input pulses at the "Down" terminal.

The "and" circuits such as 482–0 in FIGURE 7 have only one input each and therefore do not perform an "and" function, but they serve the purpose of preventing the various I–CF circuits from loading each other excessively. For example, when one of the inputs to "or" circuit 481–0 is positive, this positive signal is applied through the low resistance direction of the corresponding diode in the "or" circuit to the output of the "or" circuit. If "and" circuit 482–0 were not in the circuit, the input grid of I–CF circuit 480–0 would cause heavy loading of the "or" circuit and of the I–CF circuit which is providing the positive signal. With "and" circuit 482–0 present as shown, a positive signal raises the potential of the cathode of the diode in the "and" circuit, but the positive excursion of the anode is limited to a potential determined by current through the resistor in the "and" circuit in combination with the grid-cathode resistance of the tube in I–CF circuit 480–0. "And" circuit 482–0 is bypassed by capacitor 485–0, and each other "and" circuit in FIGURE 7 is similarly bypassed by a capacitor. The capacitor is desirable to improve the speed of operation of the counters. For example, when the output signal from "or" circuit 481–0 is positive-going, the diode in the "and" circuit tends to become in the reverse or high-resistance condition. In the absence of the capacitor, the potential at the input of I–CF circuit 480–0 would be pulled positive only by virtue of current in the resistor of the "and" circuit. However, with the capacitor, the positive-going signal from the "or" circuit is coupled directly to the input of the I–CF circuit.

Inasmuch as each "Up" pulse and each "Down" pulse is transmitted to both the 4-counter and the 3-counter, the twelve stable states of the Up-down Counter as a whole may be distinguished by the combination of stable states of the 4-counter and the 3-counter in the following pattern. The twelve stable states are designated N0 through N11 to correspond to the twelve digit positions of the calculator.

| Stable State | Positive X Signal | Positive Y Signal |
|---|---|---|
| N0 | X0 | Y0 |
| N1 | X1 | Y1 |
| N2 | X2 | Y2 |
| N3 | X3 | Y0 |
| N4 | X0 | Y1 |
| N5 | X1 | Y2 |
| N6 | X2 | Y0 |
| N7 | X3 | Y1 |
| N8 | X0 | Y2 |
| N9 | X1 | Y0 |
| N10 | X2 | Y1 |
| N11 | X3 | Y2 |

Successive pulses may be applied at the "Up" and "Down" terminals interchangeably in any sequence, but are not applied to the "Up" and "Down" terminals simultaneously. As indicated by the above listing of stable states, a pulse at the "Up" terminal causes a change from any given N state to the N state corresponding to the next higher numbered digit position, or to N0 in the case when the counter is initially in the state N11. A pulse at the "Down" terminal causes counter action in the opposite direction.

The X0, X1, X2, and X3 terminals are also connected to the contacts 6–1C, 6–1A, 6–3C, and 6–3A, respectively. Contacts 6–1B and 6–3B are connected to 7–1C and 7–1A, respectively. Contact 7–1B is connected to a terminal designated X$i$. Terminal X$i$ is thereby connected to one of the four terminals X0, X1, X2, or X3 according to which of the relays R6 and R7 are actuated. The Y0, Y1, and Y2 terminals are connected to contacts 13–1C, 13–1A, and 14–1A, respectively. Contact 13–1B is connected to contact 14–1C. Contact 14–1B is connected to terminal Y$i$. Terminal Y$i$ is thereby connected to one of the three terminals Y0, Y1, or Y2 according to which of the relays R13 and R14 are actuated. The signals on the X$i$ and Y$i$ terminals are used in the HALF ADJUST operation.

In FIGURE 7 terminal 470 is connected through capacitor 491 to one end of resistor 492, one end of resistor 493, and the cathodes of diodes 494 and 495. The opposite ends of resistors 492 and 493 are connected to terminal 125V and to ground, respectively. The anodes of diodes 494 and 495 are connected to the inputs of I–CF circuits 480–0 and 490–0, respectively. In the absence of pulses at terminal 470, resistors 492 and 493 act as a voltage divider that holds the cathodes of diodes 494 and 495 positive with respect to their anodes. The diodes therefore present a high resistance and do not affect the operation of the Up-down Counter. However, when a negative pulse is applied at terminal 470 (as a result of flip-flop 468 being changed to the 1 state, see FIGURE 6a) the pulse is coupled through capacitor 491 to the diodes and pulls the cathodes negative with respect to the anodes. This negative pulse is thereby caused to be applied to the input lines of I–CF circuits 480–0 and 490–0. The output signals, X0 and Y0, from these two I–CF circuits then become positive, and the 4-counter and the 3-counter then remain in these stable states by the action described previously. This combination of stable states corresponds to the state N0. By this means, the circuit connected to terminal 470 in FIGURE 7 is used to produce an initial setting of N0 for the Up-down Counter.

*Digit Control Array*

The Digit Control Array (block 120 in FIGURE 1) is shown in FIGURE 8a. Terminals X0 and Y0 are connected to the two inputs of "and" circuit 515, the output of which is connected to terminal N0. Terminals X1 and Y1 are connected to the two inputs of "and" circuit 516, the output of which is connected to terminal N1 and to one input of "and" circuit 510–1. Terminals Y2 and X3 are connected to the two inputs of "and" circuit 514, the output of which is connected to terminal N11 and to one input of "and" circuit 510–11. "And" circuits 510–1 and 510–11 each have two inputs, and "and" circuits 510–2 through 510–10 each have three inputs. Terminal X0 is also connected to one input on each of the "and" circuits 510–4 and 510–8. Terminal X1 is similarly connected to "and" circuits 510–5 and 510–9. Terminal X2 is similarly connected to "and" circuits 510–2, 510–6, and 510–10. Terminal X3 is similarly connected to "and" circuits 510–3 and 510–7. Terminal Y0 is similarly connected to "and" circuits 510–3, 510–6, and 510–9. Terminal Y1 is similarly connected to "and" circuits 510–4, 510–7, and 510–10. Terminal Y2 is similarly connected to "and" circuits 510–2, 510–5, and 510–11. Terminals T2, T6, and T7 are connected to the three inputs of "or" circuit 511, the output of which is connected to the cathode of diode 512. The anode of diode 512 is connected to the anode of diode 513 and to one input of each of the eleven "and" circuits 510–1 through 510–11, but none of the other inputs of these "and" circuits is connected to any other input. The outputs from "and" circuits 510–1 through 510–11 are connected to terminals N1' through N11', respectively.

With the arrangement in FIGURE 8a, the potentials at terminals N0, N1, and N11 follow the pattern described previously. For example, the potential at terminal N0 is positive when the potentials at terminals X0 and Y0 are positive simultaneously. This action is the direct result of the character of "and" circuit 515 to which the terminals are connected. The signals generated at terminals N0, N1, and N11 are used at various other parts of the calculator as described subsequently.

The potentials at the eleven terminals N1' through N11' also follow the pattern described previously except that, because of the action of "or" circuit 511, the duration of the positive excursion of potential is limited to that part of a cycle when terminal T2, T6, or T7 is positive. Diode 513 prevents the potential at one input line of each of the "and" circuits 510–1 through 510–11 from becoming more positive than ground. Therefore, the output potential from any one of these "and" circuits is never more positive than ground. Diode 512 is in the low resistance condition when the output potential from "or" circuit 511 is negative. Therefore, a negative signal from 511 will cause a negative signal to be applied to the "and" circuits to which diode 512 is connected. When the output from "or" circuit 511 is positive, diode 512 will be in the high resistance condition, and diode 513 will therefore not act as a load on "or" circuit 511. Terminals N1' through N11' are also found in FIGURE 3.

*Electronic State Signal Generator*

The Electronic State Signal Generator (block 117 in FIGURE 2) is shown in detail in FIGURE 8b. Nine flip-flops 565–1 through 565–9 are shown with the 1-output of each being connected to the input of one of a set of nine cathode followers 566–1 through 566–9, respectively. The output of each cathode follower is connected to one of a set of terminals K1 through K9, respectively. Terminal 470 (see also FIGURE 6a) is connected to the 1-input of flip-flop 565–1. Each of a set of eight terminals K2' through K9' is connected to the 1-input of one of the flip-flops 565–2 through 565–9, respectively. The left-hand cathodes of all flip-flops (see also FIGURES 5a and 5b) are connected together and to the cathode of diode 567 and to one end of resistor 568. The anode of diode 567 is connected to ground. The other end of resistor 568 is connected to terminal −125V.

With the arrangement shown in FIGURE 8b, no more than one of the flip-flops can be in the 1 state at any given time. The left-hand side of a flip-flop is conducting when the flip-flop is in the 1 state. The cathode current of each left-hand flip-flop side must flow through resistor 568 to terminal −125V. The value of resistance of resistor 568 is so chosen relative to the other circuit parameters that when two or more of the flip-flops are in the 1 state, the sum of the cathode currents is sufficiently great that the voltage drop across resistor 568 causes the potential at the cathodes to be substantially more positive than ground. A positive cathode potential has the same effect as a negative grid potential, and the result is that, if more than 1 flip-flop is in the 1 state, all but one are thereby caused to assume the 0 state.

Any given flip-flop in FIGURE 8b can be set to the 1 state by the action of a negative pulse on the corresponding input terminal. For example, flip-flop 565–2 can be set to the 1 state by the application of a negative pulse on terminal K2'. If any other flip-flop was in the 1 state at the time such a pulse is applied, that other flip-flop will be caused to be set to the 0 state as a result of the action described in the previous paragraph.

At the start of an electronic operation, the Electronic State Signal Generator is set to the K1 state by the action of a negative pulse at terminal 470. This pulse is transmitted to the 1-input of flip-flop 565–1 to set that flip-flop to the 1 state. Any other flip-flop that may have been in the 1 state is set to the 0 state by the action described.

The "electronic state" of the calculator is determined by which one of the flip-flops in FIGURE 8b is in the 1 state. A positive signal is generated at the corresponding terminal of the set K1 through K9.

The action of the circuit of the type shown in FIGURE 8b is further described in my copending U.S. Patent Application No. 767,729 filed October 16, 1958.

*Address Control Array*

The Address Control Array (block 119 in FIGURE 1) is shown in FIGURE 9. FIGURE 9 also shows certain of the Data Contacts (block 126 in FIGURE 1) and certain of the Mechanical Instruction Contacts (block 108 in FIGURE 1).

In FIGURE 9 each of the terminals 11–5C, 11–3C, 5–2A, 11–7A, 11–8C, and K5 is connected to one of the inputs to "or" circuit 521 with no two terminals connected to the same input. Terminals 11–5A and 11–4A are similarly connected to the inputs of "or" circuit 522. Terminals 12–4C and 558 are similarly connected to the inputs of "or" circuit 523. Terminals 558 and 5–6A are similarly connected to the inputs of "or" circuit 524. Terminals 559, 11–5C, and 11–8C are similarly connected to the inputs of "or" circuit 526. Terminals 11–5A and K8 are similarly connected to the inputs of "or" circuit 527. Terminals 11–6A, 11–3C, 12–3A, 5–2A, 12–6C, 11–8A, 5–4A, K5, and K8 are similarly connected to the inputs of "or" circuit 528. Terminals 11–4C, 12–3C, K4, 5–6C, and 5–5C are similarly connected to the inputs of "or" circuit 530. The output of each "or" circuit 521, 522, 523, 524, 526, 527, 528, and 530 is connected to one input of one of the "and" circuits 531, 532, 533, 534, 536, 537, 538, and 540, respectively. Terminals 559 and 5–5C are each connected to one input of "and" circuits 535 and 539, respectively. The output of each "and" circuit 531 and 532 is connected to one of the two inputs of "or" circuit 541, the output of which is connected to the anode of diode 547 and to terminal A. The outputs of "and" circuits 533 and 534 are similarly connected to the inputs of "or" circuit 542, the output of which is connected to the anode of diode 548 and to terminal In. The outputs of "and" circuits 535 and 536 are similarly connected to the inputs of "or" circuit 544, the output of which is connected to the anode of diode 549 and to terminal Ou. The outputs of "and" circuits 537 and 538 are similarly connected to the inputs of "or" circuit 545, the output of which is connected to the anode of diode 550 and to terminal Ac. The outputs of "and" circuits 539 and 540 are connected to the inputs of "or" circuit 546, the output of which is connected to the anode of diode 551 and to terminal MQ. The cathodes of the five diodes 547 through 551 are connected to ground.

In FIGURE 9 terminal K9 is connected to contact 26–2B. Contact 26–2C is connected to contact 25–2B. Contact 25–2C is connected to contact 19–2B. Contact 19–2C is connected to contact 18–2A. Contact 18–2A is connected to terminal 559. Also, the following connections between terminals and contacts are made: K1 to 2–3C; 2–3B to 9–4C; 9–4B to 16–2C and 22–3C; 22–3B to 15–3C; 15–3B to 8–3C; 8–3B to 1–3C; 1–3B to 16–2B; and 16–2A, 1–3A, 8–3A, 15–3A, and 22–3A all to 558. Terminal T2 is connected to one input of "or" circuit 554, the output of which is connected to a second input of each "and" circuit 531, 533, 535, 537, and 539 and to one end of resistor 552. The opposite end of resistor 552 is connected to a second input of "or" circuit 554 and to one plate of capacitor 553. Terminals T6 and T7 are each connected to the first and second inputs, respectively, of "or" circuit 557, the output of which is connected to a second input of each "and" circuit 532, 534, 536, 538, and 540 and to one end of resistor 555. The opposite end of resistor 555 is connected to a third input of "or" circuit 557 and to one plate of capacitor 556. The opposite plates of capacitors 553 and 556 are connected to ground. Resistor 560 interconnects terminals 559 and −125V.

The operation of the Address Control Array in FIGURE 9 is derived directly from the interconnections among the various relay contacts, "and" circuits, and "or" circuits as described previously. For example, one instance when terminal A is rendered relatively positive is when terminals 11–5A and T2 are positive. The "or" circuits 554 and 557 are minor exceptions to the straightforward operation of the Address Control Array in that the output of each of these two "or" circuits is returned through a resistor to an input. During the time that the output potential of one of these "or" circuits is positive, the capacitor connected to the input becomes charged positively. For example, when the output of "or" circuit 554 is positive as a result of T2 being positive, capacitor 553 becomes charged. Then, when T2 becomes negative the charge on capacitor 553 remains positive for a short period of time and causes the output of "or" circuit 554 to remain positive for a short period of time. The purpose of holding the output of "or" circuit 554 positive for a time after T2 becomes negative is to insure proper operation of the magnetic core storage unit. Inasmuch as the "write" pulse in the horizontal drive windings (see FIGURE 3) is established at the time that the A, In, Ou, Ac, or MQ terminal, as the case may be, becomes negative, it is desirable that the signal become negative after the "inhibit" pulse becomes established, which is during T3 time. The circuit connected to one input of "or" circuit 557 functions in the same way. The Address Control Array is so connected that for any one of the five terminals A, In, Ou, Ac, or MQ to be positive, a positive output signal must be present from either "or" circuit 554 or "or" circuit 557. With this arrangement, a positive output signal on any one of the five output lines will remain positive for a small fraction of the succeeding pulse period, that is during a small fraction of T3 time if positive during T2 time, or during a small fraction of T8 time if positive during T6 and T7 times.

In FIGURE 9 the output potentials of the terminals A, In, Ou, Ac, and MQ are never allowed to become positive with respect to ground because of the clamping action of diodes 547, 548, 549, and 551, respectively. The purpose of clamping these signals at ground as a limit in the positive direction is to insure constant-current action of the core drivers as explained previously.

In FIGURE 9 relay contacts 2–3, 9–4, 16–2, 22–3, 15–3, 8–3, and 1–3 provide a closed circuit between terminals K1 and 558 whenever one or more of the relays R22, R15, R8, and R1 are actuated to indicate the presence of an input digit unless one or more of relays R2, R9, and R16 are also actuated, in which case an alphabetic character is indicated. Also, if only relay R16 is actuated, the input decimal digit is indicated to be zero, and a closed circuit exists between terminals K1 and 558 with the path being through contacts 2–3C, 9–4C, 22–3C, 15–3C, 8–3C, 1–3C and 16–2A in that order. This circuit causes the input sequence, described later, to be effective when an input digit is to be entered into the calculator.

Relay contacts 26–2, 25–2, 19–2, and 18–2 provide a closed circuit between terminals K9 and 559 when relay R18 is actuated and relays R26, R25, and R19 are not actuated. This circuit causes the output sequence, described later, to be effective when the mechanical instruction calls for the typing of a digit from the calculator.

*Electronic State Control Array*

The Electronic State Control Array (block 122 in FIGURE 1) is shown in FIGURE 10. This array generates a set of eight signals, K2′ through K9′ for controlling the Electronic State Signal Generator, and it also generates a Stop signal for terminating the electronic operation the calculator may be performing.

The array includes a set of eight gate circuits of the G− type (see FIGURE 5p and associated text) designated 575–2 through 575–9, the output of each of which is connected to one of the terminals K2′ through K9′, respectively. Terminal T8 is connected to the pulse input of each of the gates. The gating input of gate 575-2 is connected to the output of "or" circuit 576-2. The single input of 576-2 is connected to the output of "and" circuit 577. Terminals N0 and K9 are connected to the two inputs, respectively, of 577.

The gating input of gate 575-3 is connected to the output of "or" circuit 576-3. One input of 576-3 is connected to the output of "and" circuit 578. The two inputs of 578 are connected to terminal N0 and to the output of "or" circuit 579, respectively. "Or" circuit 579 has five inputs connected to terminals 11-5C, 11-2C, 5-2C, 4-4A, and 4-7A, respectively. The other input of "or" circuit 576-3 is connected to the output of "and" circuit 580, the two inputs of which are connected to terminals C and 4-6C, respectively. Terminal C carries the Carry signal derived from the Carry Flip-Flop as explained subsequently.

The gating input of gate 575-4 in FIGURE 10 is connected to the output or "or" circuit 576-4. One input of 576-4 is connected to the output of "and" circuit 581. The three inputs of 581 are connected to terminals N11 and $\overline{C}$ and to the output of "or" circuit 582, respectively. Terminal $\overline{C}$ carries the inverse of the Carry signal. "Or" circuit 582 has four inputs connected to terminals 11-4C, 4-6C, 5-7A, and 12-8A, respectively. The other input to "or" circuit 576-4 is connected to the output of "and" circuit 583, the inputs of which are connected to terminals N0 and 4-3A, respectively.

The gating input of gate 575-5 is connected to the output of "or" circuit 576-5, the single input of which is connected to the output of "and" circuit 584. "And" circuit 584 has three inputs connected to terminals N11, $\overline{C}$ and 4-3A, respectively.

In FIGURE 10 the gating input of gate 575-6 is connected to the output of "or" circuit 576-6, the single input of which is connected to the output of "and" circuit 585. The two inputs of 585 are connected to terminal N11 and to the output of "or" circuit 598, respectively. "Or" circuit 598 has five inputs connected to terminals 11-6A, 12-4C, 4-3C, K5, and 5-7C, respectively.

The gating input of gate 575-7 is connected to the output of "or" circuit 576-7, the single input of which is connected to the output of "and" circuit 586. The two inputs of 586 are connected to terminal $\overline{C}$ and to the output of "or" circuit 587, respectively. The two inputs of 587 are connected to terminals 4-4C and 4-6A, respectively.

The gating input of gate 575-8 is connected to the output of "or" circuit 576-8, the single input of which is connected to the output of "and" circuit 588. The two inputs of 588 are connected to terminal K7 and to the output of "or" circuit 589, respectively. The two inputs of 589 are connected to terminals N11 and 5-5A, respectively.

The gating input of gate 575-9 in FIGURE 10 is connected to the output of "or" circuit 576-9, the single input of which is connected to the output of "and" circuit 590. The two inputs of 590 are connected to terminals N0 and K1, respectively.

The gating input of gate 575-10 is connected to the output of "or" circuit 576-10. The three inputs of 576-10 are connected to the outputs of "and" circuits 591, 593 and 596, respectively. The three inputs of 591 are connected to terminals N11 and $\overline{I}$ and to the output of "or" circuit 592, respectively. The signal carried by terminal $\overline{I}$ is derived from the Adder as explained subsequently. The two inputs of 592 are connected to terminals 11-5C and 12-3A, respectively. The three inputs of 593 are connected to terminals N11 and C and to the output of "or" circuit 594, respectively. "Or" circuit 594 has four inputs connected to terminals 11-3C, 11-2C, and 4-4C, and 4-6A, respectively. The two inputs of 596 are connected to terminal N11 and to the output of "or" circuit 597, respectively. "Or" circuit 597 has seven inputs connected to terminals 11-6C, 11-5A, 12-4A, 11-2A, 11-7C, 12-6A, and 5-6A, respectively.

Terminal T8 is also connected to the cathode of diode 599, the anode of which is connected to one plate of capacitor 600, one end of resistor 601, and one end of resistor 602. The opposite elements of 600 and 601 are connected to ground. The opposite end of 602 is connected to terminal —125V. These components are not fundamental to the operation of the calculator, but they serve the purpose of eliminating unwanted effects of negative overshoot that may otherwise exist in the T8 signal. The resistance values of 601 and 602 are so chosen that diode 599 is in the high resistance condition for the intended potentials of T8. If T8 becomes more negative than intended for some reason, such as overshoot in the circuit that generates the T8 signal, diode 599 will become conducting, and capacitor 600 will provide a heavy load on the circuit and thereby prevent a rapid negative-going excursion of potential that would cause improper operation of the various gate circuits in FIGURE 10 to which terminal T8 is connected.

The remainder of the circuits in FIGURE 10 function exactly as indicated by the various interconnections among the basic logical circuits described previously. For example, when the potential at terminal T8 is negative-going, a negative pulse is generated at terminal K3' if the potentials at terminals N0 and 11-5C are positive.

As will become apparent when describing the various operations of the calculator, none or only one of the terminals K2' through K9' and terminal 471 will receive a negative pulse at any given negative-going excursion of potential at terminal T8.

*Up-down Counter Control Array*

The Up-down Counter Control Array (block 121 in FIGURE 1) is shown in FIGURE 11. The pulse for controlling the "up" action of the counter appears at terminal 610, which is connected to the output of an inverter 617. The input of 617 is connected through resistor 635 to ground and to the output of "or" circuit 616, the three inputs of which are connected to the outputs of "and" circuits 613, 615, and 619, respectively. The direct input of 613 is connected to the output of "or" circuit 612, and the pulse input of 613 (see FIGURES 5c and 5d) is connected to terminal T1. "Or" circuit 612 has eleven inputs connected to terminals 5-3C, 11-4A, 4-2A, 12-6C, 11-8C, 5-4A, 4-4A, K5, 5-6A, 12-7A, and 12-8A, respectively. The direct input of "and" circuit 615 is connected to the output of "or" circuit 614, and the pulse input of 615 is connected to terminal T4. "Or" circuit 614 has two inputs connected to the output of "or" circuit 620 and to terminal 11-8A, respectively. The direct input of "and" circuit 619 is connected to the output of "or" circuit 618, and the pulse input of 619 is connected to terminal T8.

The pulse for controlling the "down" action of the counter appears at terminal 611, which is connected to the output of inverter 628. The input of 628 is connected through resistor 636 to ground and to the output of "or" circuit 624, the four inputs of which are connected to the outputs of "and" circuits 622, 623, 625, and 626, respectively. The direct input of 622 is connected to the output of "or" circuit 621, and the pulse input of 622 is connected to terminal T1. "Or" circuit 621 has three inputs connected to the output of "or" circuit 620 and to terminals 11-4C and 4-6C, respectively. The direct and pulse inputs of "and" circuit 623 are connected to terminals 12-8A and T4, respectively. The direct and pulse inputs of "and" circuit 625 are connected to the output of "or" circuit 620 and to terminal T8, respectively. The two direct inputs of "and" circuit 626 are connected to terminal $\overline{C}$ and to the output of "or" circuit 627, respectively, and the pulse input of 626 is connected to terminal T8. The two inputs of "or" circuit 627 are connected to terminals K4 and 4-6A, respectively.

The four inputs of "or" circuit 620 in FIGURE 11 are connected to terminals K1, 5–5C, 12–8C, and K9, respectively.

The operation of the array in FIGURE 11 is as indicated by the interconnections among the various basic logical circuits described previously. In the "up" part of the array, the resistance of resistor 635 is so chosen relative to the resistance in "or" circuit 616 that the quiescent potential at the input of inverter 617 is somewhat more negative than the cut-off potential of the tube in 617. The two resistances in each "and" circuit in FIGURE 11 (see also FIGURE 5c) are so chosen relative to each other that the quiescent output potential of each "and" circuit is also somewhat more negative than the cut-off potential. Then, for example, if the output from "or" circuit 612 is positive as a result of a positive signal applied at terminal 5–3C, when a positive-going potential appears at terminal T1, this positive pulse will be transmitted through "and" circuit 613 and "or" circuit 616 to inverter 617. The negative pulse that is thereby generated at the output of 617 is transmitted to terminal 610 and is called the "Up" pulse. A negative pulse that may be similarly generated at terminal 611 is called the "Down" pulse.

Input signals are never applied to the array in FIGURE 11 in such a combination that an "Up" pulse and a "Down" pulse are generated simultaneously.

*Adder and Carry Flip-Flop*

The Adder and Carry Flip-Flop (blocks 124 and 130 in FIGURE 1) are shown in FIGURE 12a. In the Adder four flip-flops 640, 641, 642, and 643 are used to store the 1, the 2, the 4, and the 8 bits, respectively, of a decimal digit. The Carry Flip-Flop is flip-flop 644, and it is used to store the decimal carry. The 1 and 0 outputs of flip-flop 640 are connected through cathode followers 646 and 647, respectively, to terminals 1 and $\bar{1}$, respectively. Flip-flop 641 is similarly connected through cathode followers to terminals 2 and $\bar{2}$, flip-flop 642 to terminals 4 and $\bar{4}$, flip-flop 643 to terminals 8 and $\bar{8}$, and flip-flop 644 to terminals C and $\bar{C}$. The 1 bit input signal is applied at terminal 655, which is connected through inverter 648 to both the 1 input and the 0 input of flip-flop 640. The output of 648 is also connected through capacitor 645 to ground. This capacitor is not essential to the operation of the circuit, but it is found that with a moderate amount of capacitance at this point in the circuit more reliable flip-flop action is obtained. The low impedance of the inverter when conducting discharges the capacitor rapidly, and the negative pulse actuates the flip-flop, but the relatively high anode load resistance in the inverter causes the capacitor to recharge relatively slowly so the positive-going portion of the pulse does not then cause excessive interference with the flip-flop action. Terminals 656, 657, and 658 are similarly connected through inverters to the inputs of flip-flops 641, 642, and 643, respectively. Terminal 659 is connected to the gating input of gate 651, which is of the G– variety (see FIGURE 5p and associated text). Terminal 8 is connected through capacitor 652 to the pulse input of gate 651. The pulse input is also connected through resistor 654 to terminal 125V and through resistor 653 to ground. The output of gate 651 is connected to the 1 input of flip-flop 644. Terminal T4 is connected to the cathode of diode 649. The anode of diode 649 is connected to the 0 input of flip-flop 644 and is connected through resistor 650 to terminal 125V. The 1-outputs of flip-flops 640 and 641 are connected to the inputs of single-shots 660 and 661, respectively.

The left-hand output (see FIGURES 5g and 5h) of single-shot 660 in FIGURE 12a is coupled through capacitor 667 to the junction of one end of resistor 665 and to the cathode of diode 663, the anode of which is connected to ground. The other end of 665 is connected to terminal 1C and to one end of resistor 666, the other end of which is connected to terminal –125V. Resistor 665 is bypassed by capacitor 664. The left-hand output of single-shot 661 is connected through a similar array of components to terminal 2C, and the output of cathode follower 668, which is the cathode follower connected between the 0-output of flip-flop 642 and terminal $\bar{4}$, is also connected through a similar array of components to terminal 4C.

The left-hand cathodes (see FIGURES 5a and 5b) of all of the five flip-flops in FIGURE 12a are connected to ground. The Adder stores decimal digits in the 8–4–2–1 code, which is set forth in detail as follows: decimal 0 is 0000, decimal 1 is 0001, decimal 2 is 0010, decimal 3 is 0011, decimal 4 is 0100, decimal 5 is 0101, decimal 6 is 0110, decimal 7 is 0111, decimal 8 is 1000, and decimal 9 is 1001. The four bits in each representation have weights of 8, 4, 2, and 1, respectively. In the operation of the calculator, the adder may temporarily store a quantity greater than 9, such as, for example, 13, which would be stored as 1101. However, these quantities are always corrected, by means of the Adder Input Array, to be described subsequently, to the corresponding digit less than ten, but with a carry. For example, 13 would be corrected to 3, and the carry flip-flop 644 would be turned "on," that is to the 1 state.

The four bits of a decimal digit to be entered into the Adder or added to a digit already in the Adder are applied simultaneously at terminals 658, 657, 656, and 655 for the 8, 4, 2, and 1 bits, respectively. The same 8–4–2–1 code is used. The 1's and 0's in the representation of a decimal digit are transmitted by the presence or absence, respectively, of pulses. A pulse causes the corresponding flip-flop to be changed to the opposite state of equilibrium. If flip-flop 640, corresponding to the 1 bit, is changed from the storage of a 1 to a 0, the negative-going signal appearing at the 1 output of this flip-flop causes single-shot 660 to be actuated. The potential at the left-hand output of 660 is negative-going at the time of actuation, but at a subsequent time the potential is positive-going when the single-shot returns to its initial state of equilibrium. In the quiescent condition, the potential at the cathode of diode 663 is substantially at ground potential because of the low resistance of the diode to the current which flows from ground through the diode and through resistors 665 and 666 to terminal –125V. The negative-going pulse coupled through capacitor 667 does not cause a significant change in the potential at the cathode of the diode because the diode continues to present a low resistance. However, when the subsequent positive-going pulse is applied through capacitor 667, the potential at the cathode rises to a positive value because when the cathode is more positive than the anode, which is at ground potential, the diode presents a high resistance. This positive pulse is coupled through capacitor 664 to terminal 1C. The various parameters of the circuit are so chosen that the potential at terminal 1C is sufficiently negative in the absence of pulses to hold a tube cut off. When a pulse is applied, the potential at terminal 1C is carried to a positive value. The pulse at terminal 1C is used to enter a "1 bit carry" into flip-flop 641 as described subsequently.

Also, in FIGURE 12a, if flip-flop 641, corresponding to the 2 bit, is changed from the storage of a 1 to a 0, the negative-going signal appearing at the 1 output of this flip-flop causes single-shot 661 to be actuated. When the single-shot returns to its initial condition a positive pulse is generated at terminal 2C by a similar process. This pulse is used to enter a "2 bit carry" into flip-flop 642, as described subsequently.

When flip-flop 642 changes from the storage of a 0 to the storage of a 1 as the result of an input pulse, the potential at terminal $\bar{4}$ is negative-going, but when the change is from 1 to 0, it is positive-going. The negative-going potential has no effect on the potential at terminal 4C, but the positive-going potential causes a positive pulse at terminal 4C. The action of the circuit connected to terminal 4C is substantially the same as for the circuits connected to terminals 1C and 2C. The pulse at terminal 4C is used to enter a "4 bit carry" into flip-flop 643 as described subsequently.

Single-shots 660 and 661 in FIGURE 12a serve to delay the entry of the "1 bit carry" and the "2 bit carry" into their respective flip-flops. No delay is needed for the "4 bit carry" because no decimal digits greater than 9 will ever be entered into the Adder with the result that pulses corresponding to the 4 bit and the 8 bit will never be entered into the Adder simultaneously. Pulses may be entered simultaneously into the 1 bit, 2 bit, and 4 bit portions of the Adder. These portions correspond to flip-flops 640, 641, and 642. An example would be for the entry of decimal digit 7, where the bit representation is 0111. In such an instance it would not be satisfactory for the "1 bit carry," for example, to be transmitted without delay to flip-flop 641 because this flip-flop would not respond properly to the substantially simultaneous entry of the 2 bit and the "1 bit carry." Similarly, flip-flop 642 would not respond properly to the substantially simultaneous entry of the 4 bit and the "2 bit carry" generated by flip-flop 641.

In FIGURE 12a, if flip-flop 643, corresponding to the 8 bit, is changed from the storage of a 1 to the storage of a 0, the negative-going signal appearing at the 1 output of this flip-flop is transmitted through cathode follower 662 and then coupled through capacitor 652 to the pulse input of gate 651, which is of the G— variety. Resistors 653 and 654 hold the potential of the pulse input a few volts positive with respect to ground in the quiescent condition. If the potential of terminal 659, which is connected to the gating input of 659, is at a positive value, as it is during T5, T6, or T7 time, the pulse will pass through the gate to the 1 input of flip-flop 644 to cause that flip-flop to be turned "on" to represent the storage of a carry.

When the potential at terminal T4 is negative, a current flows from terminal 125V through resistor 650 and diode 649 to terminal T4. Because of the low resistance of the diode, the potential at the 0 input of flip-flop 644 is substantially the same as the potential at terminal T4. When T4 becomes positive, as it does at the beginning of T4 time, diode 649 may exist in the high resistance condition for a short time because the resistance of resistor 650 is relatively high, and the potential at the 0 input of flip-flop 644 rises relatively slowly. The positive-going portion of the signal on terminal T4 therefore does not actuate the flip-flop. However, when T4 subsequently becomes negative, the negative-going potential will be transmitted through diode 649 to the 0 input of flip-flop 644 and will cause that flip-flop to be turned "off" if it was not already "off." In other words, the flip-flop is reset to 0 at the end of T4 time, that is, at the beginning of T5 time. As will be explained in more detail later, a decimal carry may be added into the 1-bit flip-flop 640 at the beginning of T5 time, but the simultaneous turning "off" of the carry flip-flop 644 will not prevent the entry of the carry. Also, the entry of a decimal carry into flip-flop 640 will not simultaneously produce a decimal carry to be stored in flip-flop 644 because of the delaying action of single-shot 660.

To illustrate the action of the Adder and Carry Flip-Flop in FIGURE 12a, assume, for example, that the adder initially contains the decimal digit 9 represented by 1001 and that the decimal digit 7 represented by 0111 is to be added to the 9. Upon the simultaneous application of pulses to the 1, 2, and 4 bit positions for the entry of the decimal 7, flip-flop 640 will change from 1 to 0, flip-flop 641 will change from 0 to 1, flip-flop 642 will change from 0 to 1, and flip-flop 643 will remain in the 1 state. When the pulse at terminal 1C is subsequently generated, this pulse will be sent to the 2 bit position (through circuits described later) to change flip-flop 641 from 1 to 0. Then when the pulse at terminal 2C is generated, this pulse will be sent to the 4 bit position (through circuits described later) to change flip-flop 642 from 1 to 0. The pulse generated at terminal 4C at this time will be sent to the 8 bit position (through circuits described later) to change flip-flop 643 from 1 to 0. The negative-going pulse at terminal 8 will then pass through gate 651, assuming that the operation takes place during T5, T6, or T7 time, to flip-flop 644 to cause 644 to be turned "on" in the representation of the storage of a decimal carry. The adder will now store 0000 plus a decimal carry. That the sum is greater than 9, actually 16 in this example, will be sensed by circuits to be described subsequently in connection with the Adder Input Array. A corrective 6, represented by 0110, will then be added to the digit in the Adder. The pulses for this corrective 6 will cause flip-flops 641 and 642 each to be changed from the storage of 0's to the storage of 1's and will leave flip-flops 640 and 643 unchanged. The Adder will then store a decimal 6 with the Carry Flip-Flop "on," as desired for the sum of 9 and 7.

As already indicated, some of the Adder functions will be explained more completely after the Adder Input Array has been described in detail.

*Storage Input Control*

The Storage Input Control (block 128 in FIGURE 1) is shown in FIGURE 12b. The outputs of four "and" circuits 753, 752, 751, and 750 are connected to terminals 8', 4', 2', and 1', respectively, for controlling the writing of the 8, 4, 2, and 1 bits, respectively, into the magnetic core storage unit. Terminals $\bar{8}$, $\bar{4}$, $\bar{2}$, and $\bar{1}$ are each connected to one input of "and" circuits 753, 752, 751, and 750, respectively. The other inputs of the "and" circuits are all connected to the junction of the anodes of diodes 755 and 756. The cathode of diode 755 is connected to the output of "or" circuit 754, and the cathode of diode 756 is connected to ground. The two inputs of "or" circuit 754 are connected to terminals T3 and T8, respectively. Terminals 8', 4', 2', and 1' are also found in FIGURE 3. Terminals $\bar{8}$, $\bar{4}$, $\bar{2}$, and $\bar{1}$ are also found in FIGURE 12a.

The Storage Input Control in FIGURE 12b generates the signals for initiating inhibit currents in those core groups for which no 1 is to be entered. This action takes place at T3 time and at T8 time in each cycle as controlled by "or" circuit 754 to which terminals T3 and T8 are connected. The output signal from this "or" circuit actuates one input of each "and" circuit. The "and" circuits are also controlled by signals representing the bits stored in the Adder. The output potentials on terminals 8', 4', 2', and 1' never become more positive than ground because of the clamping action of diode 756, which prevents one input to each "and" circuit from becoming more positive than ground. This limitation on the potential supplied to the grids of the tubes in the inhibit circuits of the Storage Unit allows a constant current to be generated in the inhibit windings in the manner described previously. Diode 755 allows the output of "or" circuit 754 to become more positive than ground without an excessive load being placed on the "or" circuit as a result of the low resistance path to ground that would occur through diode 756. This action is a result of the fact that diode 755 provides a low resistance when the output of "or" circuit 754 is negative, but when the output is positive, the cathode of diode 755 is more positive than the anode so that the diode becomes in the high resistance condition.

In the operation of the calculator, the "write" action in the Storage Unit takes place during T3 and T8 times. If during T3 time or T8 time a bit in the Adder is 0, both inputs to the corresponding "and" circuit in FIGURE 12b will receive relatively positive signals. For example, if the 8 bit is 0, terminal $\bar{8}$ connected to "and" circuit 753 will be positive. Then during T3 time or during T8 time, as the case may be, the relatively positive signal (but clamped at ground potential as a limit in the positive direction, as explained previously) that is applied at the other input of "and" circuit 753 causes a relatively positive potential to appear at terminal 8'. An inhibit current is caused to flow in the Storage Unit so that the write currents, which are generated at substantially the same time, will be inhibited from altering the flux in the corresponding storage core. If the 8 bit is a 1, terminal $\bar{8}$ will be held negative so that terminal 8' will negative also, and no inhibiting action will occur. The operation is analogous for the 4, 2, and 1 bits.

*Output Relay Control*

The Output Relay Control (block 125 in FIGURE 1) is shown in FIGURE 12c. It comprises four thyratrons 760 through 763 with the cathodes of each connected to ground. The anodes of thyratrons 760 through 763 are connected to one end of resistors 772 through 775, respectively, the other ends of which are connected to terminal 125V. The anodes of the thyratrons are also connected to the cathodes of diodes 776 through 779, respectively, the anodes of which are connected to one end of the coils of relays R29, R30, R36, and R37, respectively. The opposite ends of the relay coils are all connected to one terminal of switch 797', the opposite terminal of which is connected to terminal 48V which supplies a positive voltage source of 48 volts. Each thyratron has two control elements, or grids, both of which must be more positive than a certain critical value for the thyratron to "fire," that is, become conducting. One grid of thyratron 760 is connected through resistor 764 to terminal 1. The other grid is connected through resistor 768 to the output of "and" circuit 781. Similarly, one grid of thyratrons 761, 762, and 763 are connected through resistors 765, 766, and 767, respectively, to terminals 2, 4, and 8, respectively. The other grids of 761, 762, and 763 are connected through resistors 769, 770, and 771, respectively, to the output of "and" circuits 781. "And" circuit 781 has three direct inputs connected to terminal T5, terminal N11, and the output of "or" circuit 780, respectively. "Or" circuit 780 has two inputs connected to terminals 11–5C and K9, respectively. Terminals 8, 4, 2, and 1 are also found in FIGURE 12a.

In the operation of the Output Relay Control in FIGURE 12c it may be assumed that the thyratrons are initially not conducting. One grid of each thyratron is made positive during T5 time when the calculator is in the N11 digit position and when one or the other of terminals 11–5C or K9 is positive. If the flip-flop corresponding the 1 bit in the Adder stores a 1 at this time, terminal 1 will be positive, and thyratron 760 will be caused to conduct current. The path of current flow will initially be from terminal 125V through resistor 772 and then through the thyratron to ground. After conduction starts, the potential at the anode of the thyratron will drop to a low positive value, and additional current will flow from terminal 48V through switch 797', which is assumed to be closed, and then through relay coil R29, through diode 776, and through the thyratron to ground. The purpose of resistor 772 and diode 776 is to provide an initial relatively high voltage on the thyratron anode to insure positive "firing" of the thyratron. When the thyratron is not conducting, diode 776 will be in the reverse, or high resistance, condition so that very little current flows through it, and the potential of the anode of the thyratron will be approximately 125 volts positive. The resistance of resistor 772 is relatively high so that the current that flows through it during the time that the thyratron is conducting is not objectionable. As is well known to the prior art, the thyratron will continue to conduct even after the potential of one or both grids has been returned to a high negative value. The duration of current through the coil of relay R29 is therefore sufficient to allow actuation of relay R29. Relays R30, R36, and R37 are each similarly actuated at the same time according to which of the 2, 4, and 8 bits, respectively, in the Adder are 1. If any of the bits are 0, the corresponding relays are not actuated.

The relays remain actuated as long as switch 797' provides a closed path from terminal 48V to the relay coils. When switch 797' is opened, the relays no longer remain actuated. Because of the high resistance of resistors 772 through 775, the current through them is not sufficiently great to maintain ionization in the respective thyratrons. Therefore, the grids of the thyratrons again assume control so that the thyratrons remain in the cut-off condition even after a closed circuit is made again between terminal 48V and the relay coils.

It is intended that switch 797' be operated by the card input device, but for purposes of explaining the principles of this invention, the switch may be assumed to be manually operated. The timing of this switch is the same as for switch 797 in FIGURE 14, which is explained in detail later.

*Adder Input Array*

The Adder Input Array (block 123 in FIGURE 1) is shown in FIGURE 13. The Adder Input Array comprises four "or" circuits 701 through 704 with their outputs connected to terminals 655 through 658, respectively. These terminals are the input terminals found in FIGURE 12a. The outputs of the "or" circuits are also connected to one end of resistors 705 through 708, respectively, and the other end of each of these resistors is connected to ground.

"Or" circuit 701 in FIGURE 13 has nine inputs connected to contact 1–2A, contact 14–9A, terminal 1S, and the outputs of "and" circuits 710, 712, 714, 716, 717, and 718, respectively. The pulse input of "and" circuit 710 is connected to terminal T2, and this "and" circuit has three direct inputs connected to terminals Xi, Yi, and the output of "or" circuit 709, respectively. The two inputs of "or" circuit 709 are connected to terminals 12–3A and 11–8A, respectively. The pulse input of "and" circuit 712 is connected to terminal T5, and its two direct inputs are connected to terminal N1 and the output of "or" circuit 711, respectively. "Or" circuit 711 has five inputs connected to terminals 12–4A, 11–3C, 11–2C, 4–3A, and 11–8A, respectively. The pulse input of "and" circuit 714 is connected to terminal $\bar{C}$, and its two direct inputs are connected to terminal T5 and the output of "or" circuit 713, respectively. The three inputs of "or" circuit 713 are connected to terminals K2, K3, and K5, respectively. The pulse input of "and" circuit 716 is connected to terminal T5, and the direct input is connected to the output of "or" circuit 715, the two inputs of which are connected to terminals K4 and 4–6A, respectively. The pulse input of "and" circuit 717 is connected to terminal T4 and the direct input is connected to the output of "or" circuit 741. The pulse input of "and" circuit 718 is connected to terminal T1 and the direct input is connected to terminal 1.

"Or" circuit 702 in FIGURE 13 has six inputs connected to contacts 8–2A, 13–9A, terminal 2S, and the outputs of "and" circuits 721, 722, and 723, respectively. The pulse input of "and" circuit 721 is connected to terminal T7, and the two direct inputs of this "and" circuit are connected to the outputs of "or" circuits 719 and 720, respectively. The two inputs of "or" circuit 720 are connected to terminals 8 and C, respectively, and the three inputs of "or" circuit 719 are connected to terminals 2, 4, and C, respectively. "And" circuit 722 has two direct inputs connected to terminal 1C and the output of "or" circuit 736, respectively. The pulse input of "and" circuit 723 is connected to terminal T1 and the direct input is connected to terminal 2.

"Or" circuit 703 in FIGURE 13 has seven inputs connected to contacts 15–2A, 7–9A, terminals 4S, and the outputs of "and" circuits 724, 725, 726, and 727, respectively. The pulse input of "and" circuit 724 is connected to terminal T2, and the three direct inputs are connected to terminals 12–3A, X*i*, and Y*i*, respectively. "And" circuit 725 has two direct inputs connected to terminal 2C and the output of "or" circuit 736, respectively. The pulse input of "and" circuit 726 is connected to terminal T4, and the two direct inputs are connected to terminal 2 and the output of "or" circuit 721, respectively. The pulse input of "and" circuit 727 is connected to terminal T1, and the direct input is connected to terminal 4.

"Or" circuit 704 in FIGURE 13 has six inputs connected to contacts 23–2A, 6–9A, terminal 8S, and the outputs of "and" circuits 733, 734, and 735, respectively. "And" circuit 733 has two direct inputs connected to terminal 4C and the output of "or" circuit 736, respectively. The pulse input of "and" circuit 734 is connected to terminal T4, and the three direct inputs are connected to terminals $\bar{2}$ and $\bar{4}$ and to the output of "or" circuit 741, respectively. The pulse input of "and" circuit 735 is connected to terminal T1 and the direct input is connected to terminal 8.

"Or" circuit 736 in FIGURE 13 has three inputs connected to terminals T5, T6, and T7, respectively. The output of 736 is connected to terminal 659 (also found in FIGURE 12*a*) in addition to the inputs of the "and" circuits mentioned previously. "Or" circuit 741 has seven inputs connected to terminals 4–6C, 11–4C, 11–2C, 12–2C, 4–3A, 11–7C, and 5–4C, respectively. Contacts 23–2B, 15–2B, 8–2B, and 1–2B are all connected to the output of "and" circuit 728, the pulse input of which is connected to terminal T5. "And" circuit 728 has two direct inputs connected to terminals N1 and 558, respectively. Terminal 558 (also found in FIGURE 9) is also connected through resistor 743 to terminal −125V. The resistance of resistor 743 is sufficiently low relative to the resistance in "and" circuit 728 to cause the potential at terminal 558 to be held at a negative value that is great enough to cause a tube to be cut off under circumstances that do not provide a connection between terminals K1 and 558 in FIGURE 9. No such connection exists when, for example, relay R2 is actuated.

In FIGURE 13 contacts 6–9B, 7–9B, 13–9B, and 14–9B are all connected to the output of "and" circuit 729, the pulse input of which is connected to terminal T2. The direct input of 729 is connected to terminal 11–4C. Terminals 8S, 4S, 2S, and 1S are connected to the anodes of diodes 740, 739, 738, and 737, respectively. The cathodes of these diodes are connected together and connected to the output of "and" circuit 731 which has two direct inputs connected to the outputs of "or" circuits 730 and 732, respectively. "Or" circuit 730 has ten inputs connected to terminals 12–4A, 11–3C, 12–3A, 11–2C, 12–6C, 11–8A, K4, K5, 5–6C, and T2, respectively. "Or" circuit 732 has two inputs connected to terminals T2 and T6, respectively.

The resistance of resistor 705 is so chosen relative to the resistance in "or" circuit 701 that in the absence of pulses being transmitted through the "or" circuit the potential at terminal 655 is more negative than the cut-off potential of a tube. Also, the resistance in each "and" circuit having a pulse input, such as "and" circuit 710, are so chosen that in the absence of pulses the output potential of the "and" circuit is more negative than the cut-off potential of a tube. The various circuits are so designed that when a pulse is transmitted through "or" circuit 701 it is of sufficient amplitude to carry the potential of terminal 655 to a positive value suitable for actuation of the inverter to which it is connected to the Adder. "Or" circuits 702, 703, and 704 and their associated circuits are similarly designed.

In the operation of the Adder Input Array of FIGURE 13, "and" circuits 718, 723, 727, and 735 are for the purpose of resetting the Adder to zero, that is, to 0000. When the potential of terminal T1 becomes positive at T1 time a pulse is transmitted through "and" circuit 718 if the potential at terminal 1 is positive, as would be the case when flip-flop 640 (FIGURE 12*a*) corresponding to the 1 bit in the Adder stores a 1. The pulse is transmitted through "or" circuit 701 to cause the flip-flop to change to 0. Similarly, the flip-flops corresponding to the 2, 4, and 8 bits are changed to 0 if they initially store 1's. No carries are transmitted from one flip-flop to the next because at T1 time the "and" circuits 722, 725, and 733 in FIGURE 13 and also gate 651 in FIGURE 12*a* which provide for carry transmission each have an input held at a negative potential. Accordingly, in the operation of the calculator, the Adder is always reset to zero at T1 time. However, the decimal carry flip-flop 644 in FIGURE 12*a* continues to store a carry, if a carry was generated on the previous cycle.

Because of the action of "or" circuit 736 in FIGURE 13, one input of each of the "and" circuits 722, 725, and 733 is positive during T5, T6, and T7 times. If a "1 bit carry" pulse appears at terminal 1C during T5, T6, or T7 time, this pulse will be transmitted through "and" circuit 722 and "or" circuit 702 to flip-flop 641 (FIGURE 12*a*) corresponding to the 2 bit in the Adder. Similarly, a "2 bit carry" at terminal 2C or a "4 bit carry" at terminal 4C will be transmitted to flip-flops 642 and 643, respectively, corresponding to the 4 bit and 8 bit, respectively, in the Adder, if these pulses occur during T5, T6, or T7 time. Also, because the output of "or" circuit 736 in FIGURE 13 is connected to terminal 659, which is connected to gate 651 in FIGURE 12*a*, the carry from the flip-flop corresponding to the 8 bit will be transmitted to the decimal carry flip-flop only if the carry occurs during T5, T6, or T7 time. In other words, the Adder functions as an adder only when pulses are applied to it during T5, T6, or T7 time. If pulses reach the flip-flops in the Adder at other times, such as at T1 time when the Adder is reset to zero, the pulses affect only the corresponding flip-flops with no carries being transmitted. It is assumed that the single-shots that generated the T5, T6, and T7 pulses are so designed that the duration of these pulses is sufficiently long to allow carry propagation as necessary.

The entry of digits into the calculator is accomplished by means of relay contacts 23–2, 15–2, 8–2, and 1–2, which are held closed for the representation of 1's in the 8, 4, 2, and 1 bits, respectively, of a decimal digit. "And" circuit 728 in FIGURE 13 controls the entry of the digit. As indicated by the connections to the inputs of this "and" circuit, the entry takes place at T5 time on a cycle when N1 is positive and when the potential at terminal 558 is positive. Terminal 558 is connected through some relay contacts shown in FIGURE 9 to terminal K1. If these contacts cause an open circuit to exist between terminals K1 and 558, current through resistor 743 in FIGURE 13 is sufficient to hold the potential of terminal 558 negative. Therefore, for the entry of a digit, it is necessary that terminal K1 be positive and that the contacts be operated in some combination that results in a closed circuit between terminals K1 and 558.

As indicated in FIGURE 13, a digit may also be entered into the calculator by means of relay contacts 6–9, 7–9, 13–9, and 14–9, the closure of which represents the 8, 4, 2, and 1 bits, respectively. In this case control is by means of "and" circuit 729 with the entry taking place at T2 time on a cycle when terminal 11–4C is positive. However, as the calculator is used, a digit entered by this path is not a regular data digit, but is a digit that represents the number of positions a number should be shifted in a SHIFT LEFT or a SHIFT RIGHT operation.

Digits from the Storage Unit are entered into the Adder through terminals 8S, 4S, 2S, and 1S in FIGURE 13 (see also FIGURE 3). Pulses may appear at these terminals at T2 or T6 times when the Storage Unit is sensed.

Pulses may also appear at T3 and T8 times when the Storage Unit is written into inasmuch as the writing as well as the reading causes magnetic core flux changes that create output pulses. However, the pulses at T3 and T8 times, which are unwanted, are prevented from entering the Adder by means of diodes 737 through 740, the cathodes of which are held negative except at times when the entry of a digit from the Storage Unit into the Adder is desired. At T2 time the outputs of both of the "or" circuits 730 and 732 are positive because terminal T2 is connected to an input of each of these "or" circuits. The output of "and" circuit 731 is then positive with the result that at T2 time any digit arriving at terminals 8S, 4S, 2S, and 1S is always entered into the Adder. At T6 time the output of "or" circuit 732 is positive, but the output of "or" circuit 730 is positive only during cycles when one of the ten terminals connected to an input of "or" circuit 730 is positive. That is, at T6 time the digit arriving from the Storage Unit may or may not be entered into the Adder. Pulses appearing at the 8S, 4S, 2S, and 1S terminals are never entered into the Adder at times other than T2 or T6.

"And" circuits 710 and 724 are used for entering a decimal five (0101) into the Adder during the HALF ADJUST (round off) operation. Terminal 12–3A, which is connected to one of the inputs of "and" circuit 724 and which is also connected through "or" circuit 709 to one of the inputs of "and" circuit 710, is positive during the HALF ADJUST operation. Terminals $Xi$ and $Yi$, which are connected to other inputs of these "and" circuits, are also connected through relay contacts (see FIGURE 7) to the various X and Y terminals from the Up-down Counters. Then, during the time that the Up-down Counters correspond to a given digit position, depending on the settings of the relays, all direct inputs of these two "and" circuits become positive so that at T2 time a pulse is entered into the 1 bit and 4 bit positions of the Adder to effect the entry of a decimal 5. In the event that the number being rounded is negative, the addition of a five produces an incorrect result which has to be corrected. In this event, terminal 11–8A connected to "or" circuit 709 subsequently becomes positive, and a corrective 1 is entered into the Adder during T2 time on a cycle when terminals $Xi$ and $Yi$ are positive. The details of the HALF ADJUST operation are explained subsequently along with the explanation of all of the arithmetic operations.

"And" circuit 721 in FIGURE 13 is used to enter the corrective decimal six (0110) when the sum of two digits in the Adder exceeds 9. A sum greater than 9 is indicated when the carry flip-flop has been turned "on" to create a positive signal at terminal C. A sum greater than 9 is also indicated when the flip-flop corresponding to the 8 bit is in the 1 state at the same time that either the 4 bit flip-flop or the 2 bit flip-flop is in the 1 state. Terminal 8 and either terminal 4 or terminal 2 are positive under these latter conditions. If terminal C is positive, the output of both "or" circuits 719 and 720 are positive because terminal C is connected to an input of each of these "or" circuits. Also, both outputs are positive if terminal 8 is positive and if one or the other, or both, of terminals 4 and 2 are positive. Then, under these conditions, which comprise all of the conditions corresponding to a decimal sum greater than 9 in the Adder, the two direct inputs of "and" circuit 721 are positive. Then, a pulse appearing at terminal T7 at T7 time will pass through "and" circuit 721 to "or" circuits 702 and 703 and thence to the flip-flops corresponding to the 2 bit and 4 bit in the Adder to effect the entry of a decimal six. Inasmuch as this entry of a six is during T7 time when the carry circuits are operative, as described previously, the six is added to the previous contents of the Adder. To illustrate the operation of the corrective six more explicitly, the conditions under which the corrective six is added and the results of the correction are as follows.

For sums in the Adder represented by decimal 0 through 9 (0000 through 1001) without a decimal carry, no correction is made. For sums represented by decimal 10 through 15 (1010 through 1111) without a decimal carry, a corrective 6 is added to produce a corrected decimal sum of 0 through 5 (0000 through 0101), respectively, plus a decimal carry. For sums represented by decimal 0 through 3 (0000 through 0011) plus a decimal carry, a corrective 6 is added to produce a corrected sum of 6 through 9 (0110 through 1001), respectively, and the carry is retained. Note that, for example, the addition of 8 to 9 (1000 to 1001) would produce, without the correction an indication of 1 (0001) plus a carry. However, the sum of 8 and 9 is 17, so the corrective 6 produces the desired result. Note also that prior to the correction, the largest sum that the Adder will indicate is 3 (0011) with a decimal carry. This largest sum results from the addition of 9 to 9 with a decimal carry from the next lower decimal order. When corrected by the addition of 6, this sum becomes 9 (1001) plus a decimal carry, the correct representation of 19.

"And" circuit 712 in FIGURE 13 is used to enter a 1 into the Adder for addition to the digit in position N1 of some address as is desired for various arithmetic operations discussed in detail later. The particular cycle for which the addition of 1 takes place is controlled by "or" circuit 711. If any one of the inputs of this "or" circuit is positive, one of the direct inputs of "and" circuit 712 is held positive. The other direct input is positive when terminal N1 is positive. Under these conditions a pulse from terminal T5 passes through "and" circuit 712 at T5 time. The pulse proceeds through "or" circuit 701 to the 1 bit flip-flop in the Adder. Inasmuch as the entry of a 1 is at the beginning of T5 time, the carry circuits are operative as described previously, and therefore the entry of a 1 constitutes an actual addition of 1 to any digit already in the Adder.

"And" circuit 714 in FIGURE 13 is used to add a decimal carry into the Adder. Because of the connections to "or" circuit 713, "and" circuit 714 is operative when one of the terminals K2, K3, or K5 is positive, which is when the calculator is in the K2, K3, or K5 state. Also, because of the connection to terminal T5, "and" circuit 714 is operative only during T5 time. If the carry flip-flop in the Adder (flip-flop 644 in FIGURE 12a) stores a carry at the termination of T4 time, it is reset to 0 as described previously. When this flip-flop changes to the 0 state, the potential at terminal $\overline{C}$ is positive-going. The termination of T4 time coincides with the beginning of T5 time with the result that a positive-going potential at terminal $\overline{C}$ at this time passes through the pulse input of "and" circuit 714 to "or" circuit 701 and then to the Adder to cause the addition of a 1. If no carry was stored in the carry flip-flop, terminal $\overline{C}$ will already have been positive so that no pulse signal will appear at the pulse input of "and" circuit 714. As already implied, decimal carries are entered into the Adder only during cycles when the calculator is in the K2, K3, or K5 state.

Although the time at which pulses pass through "and" circuits 712 and 714 is the beginning of T5 time in both cases, no situation ever arises where pulses pass through both "and" circuits simultaneously. This effect is the result of the fact that carry signals are never entered into the N1 digit position (units position). The cycling of the various arithmetic operations is so arranged that whenever a pulse is to be entered into the N1 digit position, the carry flip-flop will have been reset during some previous cycle.

"And" circuit 716 in FIGURE 13 is also for the purpose of entering a 1 into the Adder. In this case, because of the connections to "or" circuit 715, the entry takes place when terminal K4 or terminal 4–6A is positive regardless of other considerations. The time of the pulse is also at the beginning of T5 time. Because the circuits are so arranged that neither terminal K4 nor terminal 4–6A can be positive at the same time that any of the terminals connected to the inputs of "or" circuits 711 and 713 are positive, a pulse never passes through "and" circuit 716 at the same time that a pulse passes through "and" circuit 712 or "and" circuit 714.

"And" circuits 717, 726, and 734 in FIGURE 13 are for the purpose of transposing the decimal digit in the Adder to the 9's complement of itself. The 9's complement digit is defined as the digit obtained by subtracting the given digit from 9. That is, for example, the 9's complement of 9 is 0, the 9's complement of 8 is 1, etc. The listing below sets forth the 8-4-2-1 representations of the ten decimal digits and their 9's complements.

| Decimal Value | Original Digit | 9's Complement |
| --- | --- | --- |
| 0 | 0000 | 1001 |
| 1 | 0001 | 1000 |
| 2 | 0010 | 0111 |
| 3 | 0011 | 0110 |
| 4 | 0100 | 0101 |
| 5 | 0101 | 0100 |
| 6 | 0110 | 0011 |
| 7 | 0111 | 0010 |
| 8 | 1000 | 0001 |
| 9 | 1001 | 0001 |

A brief study of the listing reveals that the 1 bit of the complemented digit is always the inverse of the 1 bit of the given digit. That is, the 1 bit is 1 or 0 in the complemented digit according as the 1 bit is 0 or 1, respectively, in the given digit. The 2 bit is always the same in the complemented digit as in the given digit. The 4 bit is the inverse in the complemented digit in each instance when the 2 bit in the original digit is 1, but is the same in each other instance. Specifically, when complementing decimal digits 2, 3, 6 or 7, the 4 bit is changed, but is not changed for any of the other decimal digits. The 8 bit is inverted in the complemented digit in each instance when both the 4 bit and the 2 bit are 1, but is the same otherwise. Specifically, when complementary decimal digits 0, 1, 8, or 9 the 8 bit should be changed, but not for any of the other decimal digits. On cycles when the digit in the Adder is to be complemented, a positive signal is applied at one of the inputs of "or" circuit 741 in FIGURE 13. The positive output from this "or" circuit is applied to a direct input of each of the three "and" circuits 717, 727, and 735. In the case of "and" circuit 717, the T4 signal applied at the pulse input passes through this "and" circuit to enter a pulse into the 1 bit portion of the Adder. "And" circuit 726 allows the T4 pulse to pass through "or" circuit 703 to the 4 bit portion of the Adder only if the potential at terminal 2 is positive, with the result that the flip-flop corresponding to the 4 bit in the Adder is actuated only in instances when the 2 bit flip-flop initially stores a 1. Similarly, "and" circuit 735 allows the T4 pulse to pass through "or" circuit 704 to the 8 bit portion of the Adder only if the potentials at terminals $\bar{2}$ and $\bar{4}$ are both positive as is the case only when the 2 and 4 bits in the Adder are both 0. This action of the circuits follows the pattern described above for obtaining the 9's complement of a decimal digit in the 8-4-2-1 code. Note that no circuits are provided for actuating the flip-flop corresponding to the 2 bit in the Adder because the 2 bit should never be altered in the complementing process. Inasmuch as the complementing takes place at T4 time when the carry circuits are not operative, no carries are transmitted from one flip-flop to the next during the complementing process.

Input Circuits

The Input Circuits (blocks 101, 102, 103, and 104 in FIGURE 1) are shown in FIGURE 14. In this figure, one end of the coil of relay R4 is connected to contact 4–1B and the anode of diode 790, the cathode of which is connected to one terminal of contact PC12. The notation PC may be thought of as meaning "program card." The other terminal of PC12 is connected to one terminal of switch 798, and the other terminal of 798 is connected to ground. Similarly, one end of the coil of relay R5 is connected to contact 5–1B and the anode of diode 791, the cathode of which is connected to one terminal of contact PC11. The other terminal of PC11 is also connected to the same terminal of contact 797 to which PC12 is connected. The coils of relays R11, R12, R6, R7, R13, R14, R18, R19, R25, R26, R2, R9, and R16 are similarly connected to the 1B contacts of the respective relays and through diodes to contacts PC0 through PC9, DC12, DC11, and DC0, respectively. The notation DC may be thought of as meaning "detail card." One end of the coil of relay R1 is connected to contact 1–1B and to the anodes of diodes 792, 793, 794, 795, and 796, the cathodes of which are connected to one terminal of contacts DC1, DC3, DC5, DC7, and DC9, respectively. One end of the coil of relay R8 is similarly connected to contact 8–1B and through diodes to one terminal of contacts DC2, DC3, DC6, and DC7. One end of the coil of relay R15 is similarly connected to contact 15–1B and through diodes to one terminal of contacts DC4, DC5, DC6, and DC7. One end of the coil of relay R22 is similarly connected to contact 22–1B and through diodes to one terminal of contacts DC8 and DC9. All of the 1A contacts in FIGURE 14, such as 4–1A, 5–1A, etc., are connected together and to one terminal of switch 798, the other terminal of which is connected to ground. The other end of all relay coils in the figure are connected to terminal 48V.

In FIGURE 14 the program card contacts (designated PC) and the detail card contacts (designated DC) are intended to be actuated by holes in punched cards, but these contacts may be actuated by any of many other means. For purposes of illustrating the principles of this invention, these contacts may be assumed to be manually operated switches. Switches 797 and 798 are intended to be cam operated contacts with the cams being mechanically coupled to the card feeding mechanism, these switches may also be operated by any other means insofar as the principles of this invention are concerned. For purposes of illustration, the switches are assumed to be manually operated.

Switch 797 is assumed to be closed initially. Entry of the program and data into the calculator is accomplished through the closing of the various program card and detail card contacts in coded combinations that will be described in detail later. After the desired contacts are closed, switch 798 is closed, and the corresponding relays will then be actuated. For example, if contact PC12 is closed, relay R4 will be actuated when 798 is closed. Contact 4–1 then becomes closed and forms a "hold" circuit through switch 797 to ground. Relay R4 then remains actuated even after contact PC12 and switch 798 are opened. The circuits to the other relays in FIGURE 14 operate in a corresponding manner. In the cases of relays R1, R8, R15, and R22 there is a code translation from the 1-out-of-10 code of the contacts DC1 through DC9, which represent the ten decimals digits 1 through 9, respectively. These four relays represent the 1, 2, 4, and 8 bits, respectively. For example, if contact DC7 is closed, when switch 798 is closed, circuits will be completed to relays R1, R8, and R15 to actuate all three of these relays as required for the 8-4-2-1 code representation for decimal 7. Contacts 1—1, 8–1, and 15–1 will then be actuated to hold the three relays actuated. If any other contact in the group DC1 through DC9 had been closed, the relays corresponding to the code representation of the specified digit would be actuated according to the 8-4-2-1 code as set forth in detail previously. In general, only one of the contacts DC1 through DC9 is closed at any given time, or none of them is closed. However, the other DC contacts and the PC contacts may be closed in any number and in any combination.

When switch 797 in FIGURE 14 is opened, the hold circuits to all relays in the figure will be broken, and all relays that may have been actuated will be released provided switch 798 has been opened in the meantime, as is assumed to be the case.

The various diodes in FIGURE 14 prevent unwanted "back circuits" that might otherwise occur in certain circumstances. For example, assume that relay R4 has been actuated and is being held actuated by contact 4–1 while the corresponding calculator operation is in progress. Then assume that contacts PC12 and PC11 are both closed in preparation for a subsequent calculator operation. Prior to the time that switch 798 is closed to prepare the calculator for the subsequent operation, an unwanted current path would exist from the coil of relay R5 through contacts PC11 and PC12, contact 4–1, and switch 797 to ground. Relay R5 would be actuated prematurely. However, in this example diode 790 blocks the flow of current in this direction through the indicated path, so that relay R5 is not actuated at this time. The diodes connected to relays R1, R8, R15, and R22 additionally serve the purpose of an "or" function. For example, relay R1 is actuated when contact DC1 "or" DC3 "or" DC5 "or" DC7 "or" DC9 is closed. This response is as desired because the 1 bit is 1 for decimal digits 1, 3, 5, 7, or 9.

In FIGURE 14, relays R4, R5, R11, and R12 are used to specify the Electronic Operation. Relays R6, R7, R13, and R14 are used to specify the Address. Relays R18, R19, R25, and R26 are used to specify the Mechanical Operation. Although the widely-used punched-card notation of 12, 11, and 0 through 9 has been used for the twelve PC contacts, there is not necessarily any relationship between the digits in this notation and the corresponding relays. As already mentioned, relays R1, R8, R15, and R22 correspond to the 1, 2, 4, and 8 bits, respectively, of a decimal digit in the 8–4–2–1 code with the code translation being made by the manner in which diodes interconnect these relays and contacts DC1 through DC9. In this case there is a direct relationship between the punched-card code and the DC contact notation. Relays R2, R9, and R16 correspond to the 12, 11, and 0, respectively, holes in the detail card. The actuation of relay R16 corresponds to the digit 0. However, the actuation of relays R2 or R9, or the actuation of relay R16 in combination with actuation of any other digit relay, corresponds to an alphabetic or other non-numeric character. Inasmuch as the typing of non-numeric information is not an integral part of this invention, the details of some of the circuits pertaining to these relays are omitted from the drawings. However, when a non-numeric character is sensed in the card (or indicated by the manual closing of the various DC contacts), certain of the electronic circuits are not called into operation, and those contacts on relays R2, R9, and R16 which control the electronic circuits have been shown in FIGURE 9.

*Electronic Instruction Contacts*

The Electronic Instruction Contacts (block 111 in FIGURE 1) are shown in FIGURE 15. Terminals K2 through K8 are connected as follows: K2 to contact 4–2B; K3 to 12–6B; K4 to 4–4B; K6 to 5–6B; K7 to 5–5B; and K8 to 12–8B. Terminal K5 is not connected to any of the Electronic Instruction Contacts inasmuch as the calculator is in the K5 state only during a DIVIDE operation with the result that the calculator always performs the same functions when in the K5 state.

Also, the following contact interconnections are made in FIGURE 15: 4–2C to 5–3B; 4–2A to 5–2B; 5–3C to 12–5B; 5–3A to 11–4B; 5–2C to 11–3B; 5–2A to 11–2B; 12–5C to 11–6B; 12–5A to 11–5B; 11–4A to 12–4B; 11–3A to 12–3B; 11–2A to 12–2B; 11–7A to 4–3B; 12–6C to 11–7B; 12–6A to 5–4B; 5–4C to 11–8B; 5–6C to 4–6B; 5–5A to 12–7B; 4–7C to 5–7B; and 12–8C to 4–7B.

The following contacts are connected to terminals of the same designations, respectively: 11–6C, 11–6A, 11–5C, 11–5A, 11–4C, 12–4C, 12–4A, 11–3C, 12–3C, 12–3A, 11–2C, 12–2C, 12–2A, 4–3C, 4–3A, 11–7C, 11–8C, 11–8A, 5–4A, 4–4C, 4–4A, 4–6C, 4–6A, 5–6A, 5–5C, 12–7C, 12–7A, 5–7C, 5–7A, 4–7A, 12–8A, 5–3C, 11–4A, 5–2C, 11–3A, 4–2A, 5–2A, 11–2A, 11–7A, 12–6C, 12–6A, 5–4C, 5–6C, 5–5A, and 12–8C.

In the Electronic Instruction Contacts of FIGURE 15, closed paths exist from the various K2 through K8 terminals to the various contacts in accordance with the electronic operation to be preformed. The relays R4, R5, R11, and R12 are actuated in accordance with the following pattern for the various electronic operations. A 1 in the listing indicates that the relay is actuated, and a 0 indicates that the relay is not actuated.

| Abbreviation | Electronic Operation | R4 | R5 | R11 | R12 |
|---|---|---|---|---|---|
| Nn | No Operation | 0 | 0 | 0 | 0 |
| To | Transfer address to output | 0 | 0 | 0 | 1 |
| Mu | Multiply | 0 | 0 | 1 | 0 |
| Ta | Transfer accumulator to address | 0 | 0 | 1 | 1 |
| Le | Shift left | 0 | 1 | 0 | 0 |
| Ri | Shift right | 0 | 1 | 0 | 1 |
| Ti | Transfer input to address | 0 | 1 | 1 | 0 |
| A1 | Add 1 to address | 0 | 1 | 1 | 1 |
| Ad | Add | 1 | 0 | 0 | 0 |
|  | Not used | 1 | 0 | 0 | 1 |
| Di | Divide | 1 | 0 | 1 | 0 |
| Ha | Half adjust | 1 | 0 | 1 | 1 |
| Su | Subtract | 1 | 1 | 0 | 0 |
| Ry | Reduce by | 1 | 1 | 0 | 1 |
| Sr | Reset and subtract | 1 | 1 | 1 | 0 |
| Ar | Reset and add | 1 | 1 | 1 | 1 |

The particular combination of relays R4 and R12 actuated with R5 and R11 not actuated is not used. This combination could be used, however, for an additional electronic operation if it were desired to incorporate some other operation into the calculator.

The relationship between the above listing and the circuit in FIGURE 15 will be explained by means of an example. Assume that the MULTIPLY operation is to be performed. Relay R11 will be actuated and relays R4, R5, and R12 will not be actuated. Then a connection will be made from terminal K2 through contacts 4–2C, 5–3C, 12–5C, and 11–6A to terminal 11–6A. Therefore, when the calculator is in the K2 state during a MULTIPLY operation, a positive signal will appear at terminal 11–6A inasmuch as terminal K2 is positive when the calculator is in the K2 state. The signal at this terminal may then be used to control various functions in other parts of the calculator. Also, during a MULTIPLY operation, a connection is made from terminal K3 through contacts 12–6C, 11–7A, and 4–3C to terminal 4–3C. Then when the calculator is in the K3 state a positive signal will appear at terminal 4–3C for controlling a different set of functions in other parts of the calculator. Similarly, connections are made from terminals K4, K6, K7, and K8 to terminals 4–4C, 4–6C, 5–5C and 5–7C, respectively, for controlling still other sets of functions when, during MULTIPLY, the calculator is in these other states. The circuits of the calculator are so arranged that it will never be in the K5 state during a MULTIPLY operation.

For another example, consider the ADD operation. Relay R4 is actuated and relays R5, R11, and R12 are not actuated. Terminal K2 is then connected through contacts 4–2A, 5–2C, and 11–3C to terminal 11–3C. Also, terminal K3 is connected through contacts 12–6C and 11–7C to terminal 11–7C. Also, terminals K4, K6, K7, and K8 are connected to certain other terminals during the ADD operation, but for ADD, the calculator exists for a time in the K2 state and may subsequently exist for a time in the K3 state, but it never exists in any of the K4 through K8 states. Therefore, the connections of terminals K4 through K8 are irrelevant during an ADD operation.

In FIGURE 15, the electronic operation during which the various terminals come into play are noted in parenthesis with the abbreviations as used in the previous listing. For example, the notation Mu is found near terminals 11–6A, 4–3C, 4–4C, 4–6C, 5–5C, and 5–7C because these terminals come into play during MULTIPLY. Also, the notation Ad is found near terminals 11–3C and 11–7C because these terminals come into play during ADD.

Some terminals come into play during two or more different operations. For example, terminal 4–4C is used for the SHIFT LEFT and SHIFT RIGHT operations, abbreviated Le and Ri, respectively, as well as for the MULTIPLY operation. Therefore, all three notations are found near terminal 4–4C in FIGURE 15. A single terminal can be used for more than one operation only when all functions to be controlled by the terminal are identical. That is, for example, it happens that when the calculator is in the K4 state, the functions to be performed are the same regardless of whether the calculator is executing a Mu, a Le, or a Ri operation.

In other cases, such as for example terminal 5–3C, a saving in total components can be achieved by using a single terminal to control certain functions that are common to more than one operation, but where it is nevertheless necessary to provide individual terminals for each operation. In this case terminal 5–3C is used to control the Up-down Counter for all four of the operations, Nn, Mu, To, and Ta when the calculator is in the K2 state. This result can be accomplished because terminal K2 is connected to terminal 5–3C for all four of the combinations of relay actuations corresponding to these operations, and because the action of the Up-down Counter is the same for each of these four operations. However, other functions are not the same during the time the calculator is in the K2 state for the four operations, so individual terminals are provided for each operation as shown in FIGURE 15. Similar circumstances apply in other instances as will be more apparent during the detailed descriptions of the several operations the calculator is capable of performing.

*Mechanical Instruction Contacts and Output Contacts*

The Mechanical Instruction Contacts and the Output Contacts (blocks 108 and 109 in FIGURE 1) are shown in FIGURE 16. In this figure switch 107 is connected between ground and contact 2–2B. The following contact interconnections are made: 2–2C to 9–2C and 33–4B; 2–2A to 9–2B; 33–4C to 26–3B; 26–3C to 25–3B; 26–3A to 18–7B; 25–3C to 19–3B; 25–3A to 19–4B; 18–7C to 19–5B; 18–7A to 19–6B; 19–3C to 18–3B; 19–3A to 18–4B; 19–4C to 18–5B; 19–4A to 18–6B; 19–5C to 25–4B; 19–5A to 25–5B; 19–6C to 25–6B; 19–6A to 25–7B; 18–3A to 37–1B; 37–1C to 36–1B; 37–1A to 29–5B; 36–1C to 30–1B; 36–1A to 30–2B; 30–1C to 29–1B; 30–1A to 29–2B; 30–2C to 29–3B; 30–2A to 29–4B; 9–2A to 1–4B; 1–4C to 16–3B; 1–4A to 16–4B; 16–3C to 8–4B; 8–4C to 15–4B; 8–4A to 15–7B; 15–4C to 22–5B; 15–4A to 22–6B; 15–7C to 22–7B; 15–7A to 22–8B; ground to 39–1B; 39–1C to 33–3B; 25–5C to 37–2B.

Contacts 29–1C, 29–1A, 29–2C, 29–2A, 29–3C, 29–3A, 29–4C, 29–4A, 29–5C, and 29–5A are connected to one end of the solenoids for typing the digits 0 through 9, respectively. In FIGURE 16 the solenoids for typing 0 and 1 are designated 800 and 801, respectively. Contacts 18–4C and 33–4A are both connected to a matrix of relay contacts 810. The output lines from this matrix are connected to typewriter solenoids 811. The exact nature of matrix 810 is not pertinent to this invention, but it is comprised of contacts on relays R2, R9, R16, R1, R8, R15, and R22, and the matrix serves the purpose of decoding the alphabetic character, decimal digit, or special character that may be represented by the combination of these relays that are actuated. Only three lines are shown interconnecting 810 and 811 although in practice perhaps forty or more lines would be used to distinguish all of the different characters that may be typed.

Also, in FIGURE 16 contacts 18–4A and 37–2C are connected to one end of solenoid 813 which actuates the space bar of the typewriter. Contact 18–5C is connected to one end of solenoid 814 which actuates the tabulate carriage function of the typewriter. Contact 18–5A is connected to one end of solenoid 815 which actuates the carriage return function of the typewriter. Contact 37–2A is connected to one end of the solenoid which types a minus sign or other negative-indicating symbol on the typewriter. Contacts 22–7C and 33–3A are both connected to one end of the coil of relay R33. Contact 16–4C is connected to one end of the coil of relay R39.

The opposite end of each solenoid and relay shown in FIGURE 16 is connected to terminal 48V.

In the operation of the circuit in FIGURE 16, switch 107 is closed temporarily. This switch is intended to be a cam operated contact on the card feed mechanism, but may be any other suitably timed switch. For purposes of explanation, switch 107 may be assumed to be manually operated. When switch 107 is closed, a path may be completed to a solenoid or relay to actuate it. The path is dependent upon which relays may have been previously actuated. First, if both relays R2 and R9 are actuated, the path is through contacts 2–2A and 9–2A to contact 1–4B and then through the array controlled by relays R1, R16, R8, R15, and R22. These relays (see FIGURE 14) hold the detail digit that was entered into the calculator. In other words, if both the 11 and 12 holes in the detail card were punched, the holes that may be punched in the digit-indicating positions do not represent a digit, but instead they control a mechanical function. For example, if the 11 and 12 holes were punched (or if contacts DC11 and DC12 are otherwise closed) so that relays R2 and R9 are actuated, but no other relays in the set are actuated, the path of current to switch 107 is through contacts 1–4C, 16–3C, 8–4C, 15–4C, and 22–5C to the tabulate carriage solenoid 814. If relay R22 is actuated in addition to relays R2 and R9, the path would be through contact 22–5A to the carriage return solenoid 815. For another example, if relay R8 is actuated (and not relay R22) in addition to relays R2 and R9, the path is through contacts 1–4C, 16–3C, 8–4A, 15–7C, and 22–7C to the coil of relay R33. Relay R33 then becomes actuated, and R33 holds through contacts 33–3A, which is now closed, and 39–1C. If relay R1 is actuated in addition to relays R2 and R9, the path is through contacts 1–4A and 16–4C to the coil of relay R39. When R39 is actuated, the hold circuit to relay R33 is broken by the opening of contact 39–1C. Relay R33 is thereby released.

If neither or only one of relays R2 and R9 is actuated, the path from switch 107 is to contact 33–4B. If relay R33 has been actuated as described in the previous paragraph, the path proceeds through contact 33–4A to matrix 810 and then to the typewriter solenoids 811. When switch 107 is closed, a digit, alphabetic character, or special character is typed. If on the other hand relay R33 is not actuated, the path proceeds through contact 33–4C to contact 26–3B and then to one of several destinations controlled by relays R18, R19, R25, and R26. These four relays are the Mechanical Operation Relays (see FIGURE 14). As shown in FIGURE 16, the contacts on these relays direct the path from switch 107 to one of a number of solenoids that initiate mechanical operations, some of which have already been mentioned as being capable of being actuated through other circuits paths.

If only relay R19 in FIGURE 16 of the set comprised of relays R18, R19, R25, and R26 is actuated, the path from switch 107 is through contacts 26–3C, 25–3C, 19–3A, and 18–4C to matrix 810. In this case a digit, alphabetic character, or special character would be typed. If both relays R18 and R19 are actuated, the path is through contact 18–4A to the space solenoid 813, and the typewriter would space one position. Actually, the typewriter solenoids 811 can include the space actuating solenoid and other solenoids in addition to the solenoids mentioned. When using the calculator, a Mechanical Operation would be used to program a space when a space is desired for proper positioning of output data on the paper. Contacts 810 and solenoids 811 would be used to obtain a space when a series of characters from the detail card are being typed.

If relay R25, but not relays R18, R19, or R26, is actuated, the path would be through contacts 26–3C, 25–3A, 19–4C, and 18–5C to the tabulate carriage solenoid 814. If relays R18 and R25 are actuated, the path would be through contact 18–5A to the carriage return solenoid 815. If only relay R18 is actuated, the path is through contact 18–3A to contact 37–1B. The action of the calculator then depends on the combination of relays R29, R30, R36, and R37 that are actuated. These four relays are the Output Relays (see FIGURE 12c). To cite one more example in FIGURE 16, if relays R19 and R26, but not relays R18 and R25, are actuated, the path is through contacts 26–3A, 18–7C, 19–5A, and 25–5C to contact 37–2B. If relay R37, one of the Output Relays, is not actuated, the path continues through contact 37–2C to the space solenoid 813, but if relay R37 is actuated, the path is through contact 37–2A to solenoid 812 which causes the typing of a minus sign or some other negative-indicating symbol. The manner in which this feature is used to indicate negative numbers is described in more detail later.

In the instance where the path from switch 107 in FIGURE 16 is to contact 37–1B, the path continues to one of the ten digit-indicating solenoids. The particular solenoid to which the path leads is determined in accordance with the 8-4-2-1 code where relays R37, R36, R30, and R29 represent the 8, 4, 2, and 1 bits respectively. For example, if relays R36, R30, and R29 are actuated to represent a decimal 7, the path is through contacts 37–1C, 36–1A, 30–2A, and 29–4A to the solenoid which controls the typing of the digit 7.

Several terminals in FIGURE 16 are not shown connected to anything. Actually, it is intended that these terminals be used for controlling various other mechanical functions such as the shifting of the typewriter carriage for upper and lower case typing, the typing of special characters under control of the program, ribbon color control, control of switching circuits that cause program or detail information to be taken from sources other than those indicated, and turning on or off auxiliary pieces of equipment. Because the incorporation of these additional mechanical operations is not a part of this invention, a description of them is omitted for simplicity.

*Calculator operation*

The major occurrences in the operation of the calculator of this invention are as follows.

First, switches 797 and 797′ in FIGURES 14 and 12c, respectively, are opened temporarily to open the hold circuits to all relays in the respective figures so that any relays which may have been actuated will assume the unactuated condition. Also, switch 475 in FIGURE 6a is closed temporarily to cause flip-flop 468 to be set to the 0 state, or "off" condition.

Second, the various PC and DC contacts in FIGURE 14 are closed as required for the entry of one instruction of the program and one digit of data. This second step may actually occur at the same time as or prior to the first step.

Third, switch 798 in FIGURE 14 is closed temporarily to cause actuation of the relays in this figure in accordance with the closures of switches as described in the previous paragraph.

Fourth, switch 105 in FIGURE 6a is closed temporarily to set flip-flop 468 to the 1 state, or "on" condition. As described previously, when flip-flop 468 goes "on," the Up-down Counter is set to the state corresponding to the N0 position in storage, the Electronic State Signal Generator is set to the K1 state, and the Timing Pulse Generator is activated so that it starts generating T1 through T8 pulses in cyclic fashion.

Fifth, the calculator proceeds through an "input sequence" comprising twelve cycles of the Timing Pulse Generator. The calculator remains in the K1 state during this time. During the input sequence, the decimal digit, if any, stored in relays R1, R8, R15, and R22 (and R16 in the case of a decimal 0) in FIGURE 14 as a result of the third step above is caused to be entered into the magnetic core storage unit in the N1 position of the Input Register (see FIGURE 4). If a digit is thus entered, each digit already in the Input Register is caused to be shifted one place to the next higher numbered N position, that is, one place to the left in the customary representation of numbers. The details of the input sequence are set forth in a subsequent section of these specifications.

Sixth, the calculator proceeds through an "output sequence" comprising another twelve cycles of the Timing Pulse Generator. At the completion of the input sequence, an electronic pulse is generated at terminal K9′ (see FIGURES 8b and 10) to cause the Electronic State Signal Generator to exist in the K9 state. The calculator remains in the K9 state during the output sequence. During the output sequence, the decimal digit in the N10 position of the Output Register (see FIGURE 4) is caused to be entered into relays R37, R36, R30, and R29 in FIGURE 12c for temporary storage. Also, each digit in the N1 through N9 positions of the Output Register is shifted to the next higher numbered N position, that is, it is shifted one position to the left. The digit or sign in the N11 position at the beginning of the output sequence is not used during the output sequence, and it is lost on the first cycle of the output sequence. Because of the connections to relay contacts 26–2, 25–2, 19–2, and 18–2 in FIGURE 9, a closed path exists between terminals K9 and 559 only when relay R18 actuated with relays R26, R25, and R19 not actuated. It is this combination of relay actuations that is used in the Mechanical Operation part of an instruction to initiate the typing of a digit stored in relays R37, R36, R30, and R29 (see FIGURE 16). Accordingly, when the calculator is in the K9 state, terminal Ou in FIGURES 3 and 9 can become positive only when the program directs that a digit be typed from the Output Register. That is, although the calculator proceeds through the output sequence cycles, the Output Register is affected only in instances when one particular combination of actuations of the Mechanical Operation relays is encountered. The details of the output sequence are set forth in a subsequent section of these specifications.

Seventh, the calculator executes the Electronic Operation part of an instruction. The calculator proceeds through a number of cycles of the Timing Pulse Generator, where the exact number of cycles is dependent on the operation being performed. For the calculator design being described, the minimum number of cycles is eleven, and this minimum occurs for operations such as NO OPERATION or TRANSFER ACCUMULATOR TO ADDRESS. When no corrections are necessary the minimum also occurs for the operations of ADD, SUBTRACT, REDUCE BY, and TRANSFER ADDRESS TO OUTPUT. When a correction is necessary with these operations the number of cycles through which the calculator proceeds is twenty-three. For some instructions, such as SHIFT LEFT and MULTIPLY for examples, the number of cycles depends on the values of the particular digits that happen to be involved. The details of the cycles will be explained later when the individual electronic operations are described. At the completion of the output sequence an electronic pulse is generated at terminal K2' (see FIGURES 8b and 10) to cause the Electronic State Signal Generator to change to the K2 state. During the execution of the Electronic Operation the Electronic State Signal Generator may be caused to exist subsequently in any of the states K2 through K8. The pattern in which the calculator is changed from one state to another and the means by which the state-changing signals are generated are described later in the specifications in connection with the detailed descriptions of the various electronic operations.

Eighth, at the completion of the execution of the Electronic Operation, an electronic pulse is generated at terminal 471 (see FIGURES 6a and 10). This pulse is applied to flip-flop 468 in FIGURE 6a to cause the flip-flop to be turned "off." When flip-flop 468 is turned "off" the generation of the T1 through T8 pulses ceases, as explained previously, and the calculating portion of the calculator is then dormant.

Ninth, switch 107 (which was assumed to be open initially) in FIGURE 16 is closed temporarily, and a Mechanical Operation is actuated as described previously. The calculation as described in the previous paragraph need not be completed at the time switch 107 is closed. It is sufficient that the closing of switch 107 occur at a time late enough relative to the closing of switch 105 that relays R37, R36, R30, and R29 (see FIGURE 12c) be operated in those instances when the Mechanical Operation part of the program calls for a digit to be typed from these relays. The actuation of these relays was initiated during the output sequence when the calculator was in the K9 state, or under certain circumstances to be described later when the calculator was in the K2 state during the execution of a TRANSFER ADDRESS TO OUTPUT operation.

After the completion of the nine steps just described, the calculator is caused to repeat them over and over as many times as necessary to complete the entry of the desired data and the performance of the desired instructions. An exception to the procedure occurs for instructions after the first in that it is generally not necessary when repeating the steps to operate switch 475 because flip-flop 468 will have been turned "off" at the termination of preceding Electronic Operation.

*The input sequence*

The input sequence, the output sequence, and the various electronic operations will be explained with the help of the table in FIGURE 17. This table specifies the detailed electronic events for each cycle of operation of the calculator. Each row of entries in the table represents the events for one cycle of operation. In the course of executing an input sequence, an output sequence, or an electronic operation, the calculator will in general, but not always, proceed through the events of a given row several times.

The table in FIGURE 17 is divided into nine sections designated K1 through K9 corresponding to the nine states of the calculator, as determined by the Electronic State Signal Generator. The entries in the first column indicate the section to which each row belongs. The entries in the second column of the table indicate the sequence or operation to which each cycle corresponds.

The entries in the third column are notations that provide reminders to indicate the status of the Up-down Counters in terms of the N position they represent at the start of the first cycle after the calculator arrives at a given state. The entries are either 0, 10, or 11, corresponding to digit positions N0, N10, or N11, respectively. The next eight columns correspond to the T1 through T8 pulse times, respectively. For each row of entries in the table, there may be, in the T1, T4, and T8 columns, the notation of U or D, representing "Up" or "Down," respectively. A U signifies that for the pulse time and cycle in question, the Up-down Counters are stepped up one position. Similarly, a D signifies a step down of one position. The Storage Unit is sensed during T2 and T6 times, and the particular register which is sensed is indicated by the notations of A, Ac, In, Ou, or MQ, which refer to Address, Accumulator, Input Register, Output Register, and Multiplier-quotient Register, respectively. In the Address the address may be any one of the sixteen registers, including the Accumulator and other special registers, in the Storage Unit with the particular address being selected by the Address Relays as described previously. The absence of an entry in the T2 or T6 columns implies that the Storage Unit is not sensed for the pulse time in question. In the T6 column an asterisk (*) appears next to some of the entries. An asterisk carries the meaning that, although the indicated register is sensed, the output signals from the Storage Unit are not entered into the Adder. The sensing of a register causes the corresponding digit position in the register to be set to zero. It is always desired that the digit being sensed at T2 time be retained in the Storage Unit. Therefore, it is necessary to re-write the digit in the Storage Unit. The re-writing is accomplished during T3 time. Inasmuch as the Adder is always reset to zero at T1 time (see "and" circuits 718, 723, 727, and 735 in FIGURE 13), the digit the Adder may contain at the end of T2 time is the same as the digit, if any, obtained from the Storage Unit. No entries are shown in the T3 column, but it is assumed that in each case the digit in the Adder is re-written into the same digit position of the same register (or address) in the Adder. The net effect of setting the Adder to zero at T1 time, sensing the Storage Unit at T2 time, and rewriting the digit at T3 time is to cause the digit in storage to appear in the Adder without altering the digit in storage.

The digit, if any which is sensed at T6 time and sent to the Adder is added to any digit which may already be in the Adder. Therefore, the digit in the storage position being sensed at T6 time is, in general, lost.

At T8 time, the digit currently in the Adder is entered into the Storage Unit. The particular storage position involved is the same storage position that came into play during T6 time because neither the K status controlled by the Electronic State Signal Generator nor the N status controlled by the Up-down Counters is altered in the meantime. The digit in the Adder at T8 time is, in general, the sum of the digits entered into the Adder at T2 and T6 times, but the sum digit may have been altered by the addition of a carry, altered by the addition of a corrective 6, or altered by effecting a 9's complement, as explained previously. Also, the digit in the Adder at T8 time may have been derived in some other way such as by the entry of the digit from the input relay contacts such as contacts 1–2 or 14–9 for the 1 bit (see FIGURE 13).

Various other entries appear in the table in FIGURE 17. The notation "9's" in the column corresponding to T4 indicates those cycles during which the 9's complementing action takes place. The notation 1 indicates the cycles during which an extra 1 is entered into the Adder. The addition of 1 is usually done at T5 time, but in one instance is at T2 time. In most instances, the 1 is entered conditionally, that is for example, only when the N1 digit position is involved. The details of the conditions and the purposes of the entry of 1 are explained later in connection with the operations in which the entry is used. The notation "E*i*" indicates the entry of an input digit. The notation "E5" indicates the entry of a decimal 5 for the HALF ADJUST operation. The notation "Type" indicates the actuation of the thyratrons in preparation for typing a digit.

The entries in the last column of the table in FIGURE 17 are notations to provide reminders of the status of the Up-down Counters in terms of the N position represented at the conclusion of the last cycle during which the calculator is in a given K state. At such times the Up-down Counters always correspond to the N0, N10, or N11 position.

For the input sequence, the calculator is initially set to the K1 state and the N0 digit position, and the Timing Pulse Generator is started as explained previously. As indicated by the entries in the first row, which is in the K1 section, of the table in FIGURE 17, at T1 time the Up-down Counters are stepped down. For the first cycle, this action is to step the counters from the N0 to the N11 position. The stepping is the result of the presence of a positive signal at terminal K1 in FIGURE 11. At T2 time the digit in the N11 position of the Input Register is caused to appear in the Adder if terminal 558 in FIGURE 9 is positive. Terminal 558 will be connected to the positive terminal K1 if any one or more of relays R1, R8, R15, and R22 are actuated with none of the relays R2, R9, and R16 actuated. If R2 or R9 (or both) is actuated, or if R16 and one or more of R1, R8, R15, and R22 are actuated, no input digit is indicated, so no entry of a digit is wanted. A decimal digit 0 is indicated if R16 but none of the other relays in the set is actuated. In this case all of the bits of the digit are 0, but it is still desired to shift digits in the Input Register by the process to be explained. Also in this case, the path from terminal K1 to terminal 558 will be through contacts 22–3C, 15–3C, 8–3C, 1–3C, and 16–2A. For decimal digits 1 through 9, contacts 22–3, 15–3, 8–3, and 1–3 will be operated in the 8-4-2-1 code, and a closed circuit will exist from terminal K1 to terminal 558 accordingly, with the path including contact 16–2C. If relay R16 is actuated as well as one or more of relays R22, R15, R8, and R1, the circuit between terminal K1 and terminal 558 is broken at contact 16–2C. At time T3, the digit in the Adder is re-written in the Storage Unit, unless because of an open circuit between terminals K1 and 558 no digit was sent to the Adder.

At T4 time of the input sequence, the U-down Counters will be stepped up one step, which during the first cycle is back to the N0 position. This action is also a result of the presence of a positive signal at terminal K1 in FIGURE 11. Although the E*i* entry appears in the T5 column of the first row of the table in FIGURE 17, no input action takes place as yet in the input sequence, because, as indicated by the connections to "and" circuit 728 in FIGURE 13, the N1 terminal must be positive for a pulse to be passed through this "and" circuit to the relay contacts used for entering an input digit.

At T6 time during the first cycle of the input sequence the Input Register is sensed again. This time it is the N0 position that is sensed. Inasmuch as no N0 position actually exists in the Storage Unit, the Storage Unit is not affected. At T7 time, although the corrective 6 circuits would operate if the decimal digit in the Adder were greater than 9, no correction takes place because the digit, which was obtained at T2 time, in the Adder will in no case (except a malfunction) be greater than 9. At T8 time, the digit in the Adder would be stored in the N0 position of the Input Register of the Storage Unit if such a position existed. Again, inasmuch as no N0 position exists, the Storage Unit is not affected. Also at T8 time the Up-down Counters are stepped down to the N11 position.

The net effect of the first cycle of the input sequence is to enter the digit in the N11 position of the Input Register into the N0 position, but because no N0 position actually exists, the Storage Unit contains the same digits as before. However, the Up-down Counters are now at position N11 instead of N0.

At the end of the first cycle none of the gating inputs of the various gates in the Electronic State Control Array in FIGURE 10 is positive. Therefore, no signal is generated that would cause the calculator to change to a state other than K1. The calculator then goes through another cycle which is the same as the first cycle except that there has been a net change of one step in the downward direction of the Up-down Counters. At T1 time of this second cycle the Up-down Counters step from the N11 position down to the N10 position. At T2 and T3 times the digit in the N10 position of the Input Register is caused to be entered into the Adder. At T4 time the Up-down Counters are stepped up one position to the N11 position. At T6 time the digit in the N11 position is sensed, but this digit is not entered into the Adder because at this time none of the terminals connected to the inputs of "or" circuit 730 in FIGURE 13 are positive. The sensing operation causes the N11 position of the Input Register to be set to zero. Then at T8 time the digit currently in the Adder is entered into the N11 position. Also at T8 time the Up-down Counters are stepped down again to the N10 position. The net effect of the second cycle is to enter the digit in the N10 position of the Input Register into the N11 position and to eradicate any digit that may have been in the N11 position at the start of the cycle. Also, the Up-down Counter is left stepped down one position from N11 to N10.

The third cycle of the input sequence is the same as the second cycle except that because the Up-down Counters are at the N10 position at the start of the cycle, the effect of the third cycle is to enter the digit initially in the N9 position of the Input Register into the N10 position and to eradicate any digit in the N10 position at the start of the cycle. Also, at the end of the third cycle, the Up-down Counters are at the N9 position.

The fourth through the eleventh cycles of the input sequence are analogous to the second and third cycles. The digits in the N8 through N1 positions are entered into the N9 through N2 positions, respectively. The net effect of the first eleven cycles has been to shift all digits in the Input Register to the "left" one position, that is, to higher numbered N positions. The digit, if any, originally in the N11 position has been lost. At the end of the eleventh cycle the Up-down Counters are in the status corresponding to the N1 position.

At T1 time of the twelfth cycle of the input sequence the Up-down Counters are stepped down from N1 to N0. At T2 time the N0 position of the Input Register is sensed, but because no N0 position exists in the Storage Unit, there is no effect on the Storage Unit. At T4 time the Up-down Counters are stepped up from T0 to T1. At T5 time a positive pulse will be generated at the output of "and" circuit 728 in FIGURE 13 if terminal 558 is positive, as it will be when a digit is to be entered as explained previously. It is to be noted that terminal N1 in FIGURE 13 will be positive during this portion of the twelfth cycle. This positive pulse will pass through any of the contacts 23–2, 15–2, 8–2, and 1–2 that may be closed in accordance with the decimal digit to be entered. This digit will thereby be entered into the Adder. At T6 time the digit in the N1 position of the Input Register will be sensed, but not entered into the Adder, with the result that the N1 position will be set to zero. At T8 time the digit which is in the Adder and which is the digit obtained from the input relays will be entered into the N1 position of the Input Register.

Also, at T8 time the Up-down Counters will be stepped down to the N0 position.

If, for example, the Input Register contained the digits 00000000085 prior to the start of an input sequence, and if the digit 3 is entered, the Input Register will contain 00000000853 after the input sequence.

When both the N0 and K1 terminals connected to "and" circuit 590 in FIGURE 10 are positive, as is the case during T8 time of the twelfth cycle of the input sequence, gate 575–9 is actuated so that a negative pulse is generated at terminal K9' at the end of T8 time by the process described previously. This pulse at terminal K9' is applied to flip-flop 565–9 in FIGURE 8b to cause the calculator to change to the K9 state. In FIGURE 17, the 0 notation in the last column of the first row is a reminder that the Up-down Counters are in the N0 state at the time of completion of the last cycle of the input sequence.

Then at the next T1 time, which is a time interval later as illustrated by the timing chart in FIGURE 6b, the calculator will be in the K9 state, which corresponds to the output sequence. The circuits will then be prepared to function according to the entries in the bottom row, which corresponds to the K9 section, of the table in FIGURE 17.

*The output sequence*

After the completion of the input sequence as previously described, the Timing Pulse Generator continues to proceed through additional cycles, but with the calculator in the K9 state. The entries in the bottom row of the table in FIGURE 17 correspond to the output sequence. The U and D entries are the same as for the first row, that is, the counters are stepped down one position at T1 and T8 times and are stepped up one position at T4 time. The storage register which is actuated at both T2 and T6 times is the Output Register instead of the Input Register, as indicated by the Ou instead of the In entries. The shifting action during the output sequence is substantially the same as for the input sequence except that it is the digits in the Output Register rather than in the Input Register that are shifted to the left. The actuation of the Output Register in the Storage Unit is a result of the fact that terminal 559 in FIGURE 9 will be positive if it is connected to terminal K9. Because of the series connection of relay contacts 26–2C, 25–2C, 19–2C, and 18–2A, a closed circuit will exist between terminal K9 and 559 only if relay R18 and not any of the relays R26, R25, and R19 are actuated. This combination of relay actuations corresponds to a closed circuit between relay contacts 33–4C and 37–1B in FIGURE 16, which as explained before corresponds to the Mechanical Operation of typing a digit from the Output Relays. If some other Mechanical Operation is to take place, there will be an open circuit between terminals K9 and 559 in FIGURE 9 with the result that terminal 559 will be negative, and the Output Register will not be actuated, because a negative potential at terminal 559 will cause a negative potential to exist at terminal Ou. The reason that the potential of terminal 559 will be negative in the case of an open circuit to terminal K9 is that the current through resistor 560 to terminal −125V is sufficiently great to hold the potential suitably negative, whereas in the case of a closed circuit the cathode follower connected to terminal K9 (see FIGURE 8b) is designed to be capable of maintaining a positive potential. Whether or not the Output Register is actuated, the calculator proceeds through the cycles of the output sequence. Of course, no shifting or manipulation of digits takes place if the Output Register is not actuated.

If it is assumed that an output digit is to be typed and terminal 559 in FIGURE 9 is therefore positive as a result of a connection to terminal K9, the first cycle of the output sequence has the net effect of causing the digit in the N11 position of the Output Register to be entered into the N0 position, but because no N0 position exists, the Storage Unit contains the same digits as before. However, the Up-down Counters are at the N11 position at the end of the first cycle.

During the second cycle of the output sequence, the Up-down Counters are stepped down to the N10 position at T1 time so that at T2 time the digit in the N10 position of the Output Register is entered into the Adder, and then automatically restored in the Output Register at T3 time. At T4 time the Up-down Counters are stepped back up to the N11 position. During T5 time of this second cycle all three inputs to "and" circuit 781 in FIGURE 12c are positive. Two of the inputs are positive because they are connected to terminals T5 and N11, respectively, both of which are positive at this time. The third input is connected to the output of "or" circuit 780. This output signal is positive at this time because one of the inputs to this "or" circuit is connected to terminal K9, which is positive. With the output of "and" circuit 781 positive, the thyratrons in FIGURE 12c are actuated, as described previously, in accordance with the decimal digit stored in the Adder. The digit in the N10 position of the Output Register is thereby caused to be stored in the Output Relays R37, R36, R30, and R29. At T6 time the digit in the N11 position of the Output Register is sensed but not entered into the Adder. At T8 time the digit currently in the Adder, which is the digit that was obtained from the N10 position, is entered into the N11 position of the Output Register. Also, at T8 time the Up-down Counters are stepped down again to the N10 position.

By an analogous shifting action, the third through the eleventh cycles of the output sequence cause the digits in the N9 through N1 positions, respectively, of the Output Register to be shifted to the N10 through N2 positions, respectively. The Up-down Counters will be at the N1 position at the end of the eleventh cycle.

During the twelfth cycle of the output sequence, the calculator tends to shift the digit from the N0 position to the N1 position, but because no N0 position exists in the Storage Unit, the effect is to enter a zero in the Adder at T2 time. The N1 position is set to zero at T6 time, and the zero from the Adder is entered into the N1 position at T8 time in the manner described previously.

The net effect of the output sequence is to shift all digits in the Output Register to the left one position and to transmit the digit originally in the N10 position to the Output Relays as well as shift it to the N11 position. The digit originally in the N11 position is lost, and a 0 is entered into the N1 position.

At T8 time of the twelfth cycle, the Up-Down Counters are stepped to the N0 position. At this time the N0 terminal as well as the K9 terminal is positive with the result that both input terminals of "and" circuit 577 in FIGURE 10 are positive. The direct input of gate 575–2 is then positive so that at the termination of the T8 pulse a negative pulse is generated at terminal K2'. This pulse is applied at flip-flop 565–2 in FIGURE 8b to cause the calculator to change to the K2 state. Terminal K2 will now be positive. Then at the next T1 time the calculator will commence the execution of the Electronic Operation called for by the program, that is, by the combination of actuations of relays R4, R5, R11, and R12 in FIGURE 14.

*The electronic operations*

When the calculator is changed to the K2 state and the Timing Pulse Generator is operating as previously described, the calculator is prepared to execute the Electronic Operation that is specified by the combination of actuations of the Electronic Operation relays R4, R5, R11, and R12, the coils of which appear in FIGURE 14 and the major contacts of which appear in FIGURE 15.

Assume first that the Electronic Operation of NO OPERATION (abbreviated Nn) is to be performed. In this case none of the relays R4, R5, R11, and R12 are actuated. A closed circuit will exist between terminal K2 and terminal 11–6C in FIGURE 15 with the path including relay contacts 4–2C, 5–3C, 12–5C, and 11–6C. Terminal 5–3C in FIGURE 15 will also be used in other parts of the calculator and is therefore indicated specifically. The potential of terminals 11-6C and 5-3C will be the same as the potential of terminal K2 during the Nn operation because of the connections between these terminals.

It may be noted that during the Nn operation, other closed circuits will exist in the circuit shown in FIGURE 15. One such circuit is from terminal K3 to terminal 11-7C. However, these other circuits are of no consequence because the calculator will never exist in the K3 state nor in any other state except the K2 state during the Nn operation.

As the Timing Pulse Generator emits pulses, the calculator will function in accordance with the notations in the row designated Nn in the K2 section of FIGURE 17.

The 0 in the third column of the Nn row in FIGURE 17 serves to remind that the Up-down Counters are at the N0 position at the beginning of the first cycle of the Nn operation. This status of the Up-down Counters is a result of the fact that the change to the K2 state was made at a time when the Up-down Counters were at the N0 position. As indicated by the U entry in the T1 column of the Nn row, the Up-down Counters are stepped up one position at this time. This stepping occurs as a result of the positive potential at terminal 5-3C, which is connected to "or" circuit 612 in FIGURE 11. Terminal 5-3C in FIGURE 11 is, of course, the same terminal as terminal 5-3C in FIGURE 15, inasmuch as all terminals with the same designation are actually the same terminal even though they may appear at two or more places in a given figure or in two or more different figures. During the Nn operation, no other action takes place during this first cycle with the result that at the end of the cycle the only change in the calculator is that the Up-down Counters have been stepped up from the N0 position to the N1 position. At the end of the cycle, there is nothing to change the state of the calculator from the K2 state, so the calculator remains in the K2 state and performs another Nn cycle.

The second cycle of the Nn operation is the same as the first cycle except that the Up-down Counters are stepped up from the N1 position to the N2 position. Successive cycles are also the same with the Up-down Counters being stepped up one position on each cycle. At T1 time of the eleventh cycle the Up-down Counters are stepped from the N10 position to the N11 position so that at the end of the eleventh cycle both inputs to "and" circuit 596 in FIGURE 10 will be positive. The input which is connected to terminal N11 will be positive because terminal N11 is positive when the Up-down Counters are at the N11 position. The other input to "and" circuit 596 will be positive because terminal 11-6C, which is connected to one of the inputs of "or" circuit 597, is positive, and because the output of this "or" circuit is connected to the other input of "and" circuit 596. The positive output signal from "and" circuit 596 will be passed through "or" circuit 576-10 to the direct input of gate 575-10. Then at the termination of T8 time a negative pulse will appear at terminal 471 because of the action explained previously.

The negative pulse at terminal 471 is applied to the 0-input of flip-flop 468 in FIGURE 6a to cause this flip-flop to be turned "off." When this flip-flop is "off," pulses are prevented from being applied to single-shot 450-1, and the Timing Pulse Generator ceases operation, also as explained previously. The Nn operation is thereby terminated with no alteration of the digits stored in the calculator.

In the explanation of the other Electronic Operations a notation will be adopted to effect a substantial decrease in the verbiage otherwise necessary to produce a complete explanation. When ever a function takes place as a result of a positive signal being present at some point in the calculator, the terminal that is positive, the pertinent logical element to which the terminal is connected, and the figure in which the terminal and logical element appear will be identified, all in parentheses. For example, in the NO OPERATION operation just described, when the Up-down Counters are stepped up one position, the notation would be: (5-3C to "or" circuit 612 in FIGURE 11). When positive signals on two or more terminals cooperate to initiate some function, each of the terminals and the pertinent logical elements to which they are connected will be identified. For example, the termination of the NO OPERATION operation is caused by signals that would be identified as follows: (N11 to "and" circuit 596 and 11-6C to "or" circuit 597 in FIGURE 10). In each case the character of the detailed action of the circuits involved will have been explained previously in the specifications.

Next, assume that the TRANSFER ACCUMULATOR TO ADDRESS (abbreviated Ta) operation is to be performed. As the name implies, the Ta operation transfers the number stored in the Accumulator to the designated Address in the Storge Unit. The designated Address is determined by the settings of the Address Relays R6, R7, R13, and R14, the coils of which are shown in FIGURE 14, and the major contacts of which are shown in FIGURE 3. The number in the Accumulator remains in the Accumulator after the completion of the Ta operation, and the number originally in the designated Address is lost.

For the Ta operation, relays R11 and R12 are actuated, and relays R4 and R5 are not actuated. With this combination of relay actuations there is a closed circuit between terminals K2 and 11-5A in FIGURE 15 with the circuit including contacts 4-2C, 5-3C, 12-5A, and 11-5A. Terminal K2 is also connected to terminal 5-3C.

As the Timing Pulse Generator emits pulses, the calculator will function in accordance with the notations in the row designated Ta in the K2 section of FIGURE 17.

The action of the Up-down Counters during the Ta operation is the same as for the Nn operation, that is, they are stepped up one position at T1 time (5-3C to "or" circuit 612 in FIGURE 11). Note that terminals K2 and 5-3C are connected together during the Ta operation as well as during the Nn operation. At T2 time during the first cycle of the Ta operation the digit in the N1 position of the Accumulator is sensed and entered into the Adder (11-5A to "or" circuit 527 in FIGURE 9). At T3 time this digit is then restored in the N1 position of the Accumulator. The sensing, the entry, and the restoring are performed by the process described in connection with the description of the Storage Unit and the Adder.

At T6 time the digit in the N1 position of the designated Address is sensed (11-5A to "or" circuit 522 in FIGURE 9), but is not entered into the Adder. This sensing, in effect, sets to zero the N1 position of the designated Address. At T8 time the digit in the Adder is entered into the N1 position of the designated Address. Because this digit is the digit that was originally in the N1 position of the Accumulator, the effect of the first cycle of the Ta operation has been to transfer the N1 digit in the Accumulator to the N1 position of the designated Address, with the N1 digit being unchanged in the Accumulator.

At the end of the first cycle of the Ta operation there is nothing to cause the calculator to change from the K2 state, so the calculator performs another cycle the same as the first except that the Up-down Counters are stepped from the N1 position to the N2 position. During this second cycle the digit in the N2 position of the Accumulator is transferred to the N2 position of the designated Address. Similarly, successive cycles of the Ta operation transfer the digits from successively higher numbered digit positions of the Accumulator to the corresponding positions of the designated Address.

At the end of the eleventh cycle, when the Up-down Counters are at the N11 position, the Ta operation is terminated (N11 to "and" circuit 596 11-5A to "or" circuit 597 in FIGURE 10) in substantially the same way that the N*n* operation was terminated except that a different input to "or" circuit 597 is involved.

Next, assume that the RESET and ADD (abbreviated A*r*) operation is to be performed. In this operation, the Accumulator is reset to zero, and the number in the designated Address is entered into the Accumulator. Although the word ADD is used in the name of this operation, no addition takes place. Instead, it is generally the intention, when this operation is used, to add one or more other numbers to the number entered into the Accumulator by this operation. The actual addition takes place in subsequent operations. Therefore, the A*r* operation is substantially the same as the T*a* operation, which has already been described. The difference is that the roles of the Accumulator and the Address are interchanged as indicated by the entries in the A*r* row of the K2 section of FIGURE 17.

For the A*r* instruction, all four relays R4, R5, R11, and R12 are actuated. In this case there is a closed circuit between terminals K2 and 12-2A in FIGURE 15. Terminal K2 is also connected to terminals 4-2A, 5-2A, and 11-2A. It happens that terminal 12-2A is not used, with all necessary circuit functions being initiated by positive signals on the other terminals, as will be explained.

The Up-down Counters are stepped up at T1 time during each cycle of the A*r* operation (4-2A to "or" circuit 612 in FIGURE 11) . The digit in the Address position corresponding to the current position of the Up-down Counters is sensed at T2 time (5-2A to "or" circuit 521 in FIGURE 9) and is entered into the Adder. The digit is restored in the Address at T3 time. The digit in the corresponding position of the Accumulator is sensed at T6 time (5-2A to "or" circuit 528 in FIGURE 9), but is not entered into the Adder. At T8 time the digit in the Adder is entered into the corresponding position of the Accumulator.

The termination of the A*r* operation occurs at the end of the eleventh cycle when the Up-down Counters are at the N11 position (N11 to "and" circuit 596 and 11-2A to "or" circuit 597 in FIGURE 10) by an action similar to the termination of the N*n* and T*a* operations.

In subsequent explanations of the various operations, the functioning of the calculator at T3 and T8 times with regard to the Storage Unit will not always be stated specifically. It should be understood that the functioning is always the same at these times, however. That is, at T3 time the digit in the Adder is always used to restore to its initial value the Storage Unit position from which the digit came. At T8 time, the digit in the Adder is entered into the Storage Unit position that was sensed at T6 time. This digit, in general, will not be the same digit that was sensed, and further, the new digit will in general be different from the digit sensed whether or not the sensed digit was entered into the Adder. Again, reference is made to the descriptions of the Storage Unit and the Adder for a more complete description of the functioning.

The RESET AND SUBTRACT (abbreviated S*r*) operation is the same as the A*r* operation except that the 9's complement of the number in the designated Address is entered into the Accumulator. This operation, in effect, resets the Accumulator to zero and subtracts the number in the Address from zero, and leaves the result in the Accumulator.

For the S*r* operation, relays R4, R5, and R11 are actuated, and relay R12 is not actuated. In this case a closed circuit exists between terminals K2 and 12-2C in FIGURE 15. Terminal K2 is also connected to terminals 4-2A, 5-2A, and 11-2A as was the case for the A*r* operation.

As indicated by the entries in the S*r* row in the K2 section of FIGURE 17, the details of the S*r* operation are the same as for the A*r* operation except that at T4 time the digit in the Adder is transposed to its 9's complement representation (12-2C to "or" circuit 741 in FIGURE 13). The functioning of the circuits for generating the 9's complement has already been explained.

The other circuits called into play during the S*r* operation are the same circuits that are called into play during the A*r* operation. The Up-down Counters are stepped up one position at T1 time of each cycle (4-2A to "or" circuit 612 in FIGURE 11). The digit in the corresponding Address position is sensed at T2 time (5-2A to "or" circuit 521 in FIGURE 9). The digit in the corresponding Accumulator position is sensed at T6 time (5-2A to "or" circuit 528 in FIGURE 9), but is not entered into the Adder. The S*r* operation is terminated at the end of the eleventh cycle (N11 to "and" circuit 596 and 11-2A to "or" circuit 597 in FIGURE 10).

The ADD 1 TO ADDRESS (abbreviated A1) operation causes 1 to be added to the number in the designated Address. In the practical use of the calculator, this operation can be used for any of several purposes. For example, it can be used to generate numbers as they are needed in the calculations. For a more specific example, the number 2 can be generated by using the A1 operation twice. When the A1 operation is used in combination with the HALF ADJUST, SHIFT RIGHT, and SHIFT LEFT operations in a program, more complex numbers can be generated in a pratical manner. For another example, through the use of the A1 operation, an Address can be used as a counter to count the number of times a sequence of instructions has been executed.

For the A1 operation, relays R5, R11, and R12 are actuated, and relay R4 is not actuated. In this case a closed circuit exists between terminals K2 and 12-4A in FIGURE 15. Terminal K2 is also connected to terminal 11-4A.

The functioning of the Up-down Counters during the A1 operation is the same as for the other operations already described in that the Up-down Counters are stepped up one position at T1 time of each cycle, as indicated by the A1 row of the K2 section of FIGURE 17 (11-4A to "or" circuit 612 in FIGURE 11).

During the first cycle of the A1 operation the Up-down Counters are stepped up from the N0 position to the N1 position so that at T5 time of this first cycle a 1 is entered into the Adder (12-4A to "or" circuit 711 and N1 to "and" circuit 712 in FIGURE 13) by the process previously explained in connection with the description of the Adder Input Array.

At T6 time of the first cycle of the A1 operation the digit in the N1 position of the designated Address is sensed (11-4A to "or" circuit 522 in FIGURE 9) and is entered into the Adder (12-4A to "or" circuit 730 in FIGURE 13) to be added to the 1 which was entered at T5 time. The functioning of "or" circuit 730 was explained in connection with the description of the Adder Input Array. If the digit obtained from the N1 position was a 9, a decimal carry will be generated and will be stored in the carry flip-flop 644 in FIGURE 12*a*. At T8 time the sum digit will be stored in the N1 position of the designated Address.

During the second and succeeding cycles of the A1 operation the entry of a 1 will not occur because the Up-down Counters will no longer be at the N1 position as required by the action of "and" circuit 712 in FIGURE 13. However, if a carry was generated during the first cycle, this carry will be entered into the Adder at T5 time of the second cycle (K2 to "or" circuit 713 in FIGURE 13) because of the action of "and" circuit 714 in FIGURE 13, which has already been described. The digit from the N2 position of the designated Address will then be added to this carry by the same process as the addition that took place during the first cycle. A new carry will be generated and similarly stored if the second digit was also a 9.

Succeeding cycles of the A1 operation continue in an analogous manner with new carries being generated as required for the arithmetic addition of 1.

The termination of the A1 operation occurs at the end of the eleventh cycle (N11 to "and" circuit 596 and 12–4A to "or" circuit 597 in FIGURE 10) in substantially the same manner as before.

Each of the above Electronic Operations utilized only the K2 state of the calculator. Each of the Electronic Operations to be described below utilizes at least one of the states K3 through K8 in addition to state K2.

The TRANSFER INPUT TO ADDRESS (abbreviated T$i$) operation causes the number in the Input Register to be transferred to the designated Address, and the Input Register is set to zero.

For the T$i$ operation, relays R5 and R11 are actuated, and relays R4 and R12 are not actuated. In this case a closed circuit exists between terminals K2 and 12–4C in FIGURE 15. Terminal K2 is also connected to terminal 11–4A. Another closed circuit exists between terminals K6 and 5–6A.

It may be noted that during the T$i$ operation, other closed circuits will exist in FIGURE 15 with one such circuit being between terminals K3 and 4–3C. However, these other circuits are of no consequence because during the T$i$ operation the calculator will never exist in the states, such as K3, to which these other circuits correspond. As will be explained, the calculator will exist in only the K2 and K6 states.

The entires in the T$i$ row of the K2 section of FIGURE 17 indicate the functioning of the calculator during the first eleven cycles of the T$i$ operation. The functioning of the calculator during the first eleven cycles of the T$i$ operation is substantially the same as for the T$a$ operation, already explained, except that it is the Input Register which is sensed at T2 time (12–4C to "or" circuit 523 in FIGURE 9). At T6 time the corresponding digit in the designated Address is sensed (11–4A to "or" circuit 522 in FIGURE 9), but is not entered into the Adder. The Up-down Counters are stepped up one position at T1 time of each cycle (11–4A to "or" circuit 612 in FIGURE 11). The net effect of the first eleven cycles is to transfer the number in the Input Register to the designated Address. However, during this time the number in the Input Register was regenerated, and it remains in the Input Register, whereas it is desired to set the Input Register to zero.

At the end of the eleventh cycle of the T$i$ operation the calculator is changed from the K2 state to the K6 state (N11 to "and" circuit 585 and 12–4C to "or" circuit 598 in FIGURE 10) with the functioning of the Electronic State Control Array being as described previously. A positive potential then appears at terminal K6 instead of K2.

The functioning of the calculator during succeeding cycles of the T$i$ operation is indicated by the entries in the T$i$ row of the K6 section of FIGURE 17. The notation of 11 in the third column of this row serves to remind that the Up-down Counters are at the N11 position at the start of the first cycle after the calculator has been changed to the K6 state. The Up-down Counters continue to be stepped up one position at T1 time of each cycle (5–6A to "or" circuit 612 in FIGURE 11), but this functioning is the result of a positive potential on a different terminal. At T6 time of each cycle the corresponding digit in the Input Register is sensed (5–6A to "or" circuit 524 in FIGURE 9), but is not entered into the Adder. The effect is to set to zero the corresponding digit position of the Input Register.

At T1 time of the first cycle after changing to the K6 state, the Up-down Counters are stepped up from the N11 position to the N0 position. Because there is no N0 position in the Storage Unit, no changes take place in the Storage Unit during this first cycle in the K6 state. However, during cycles after this one when the Up-down Counters are stepped to the N1, N2, and so on, positions, the corresponding digit positions in the Input Register are set to zero. At the completion of the twelfth cycle in the K6 state, when the Up-down Counters are at step N11, the T$i$ operation is terminated (N11 to "and" circuit 596 and 5–6A to "or" circuit 597 in FIGURE 10).

The TRANSFER ADDRESS TO OUTPUT (abbreviated T$o$) operation causes the number in the designated Address to be transferred to the Output Register. If the number in the designated Address is negative, the number will appear in 9's complement form in that Address, but the T$o$ operation is so arranged that the number will appear in true form in the Output Register regardless of whether the number is positive or negative. Also, if the number is negative, as indicated by the occurrence of the digit 9 in the N11 position of the number, the Output Relays will be actuated accordingly so that, through the use of the appropriate Mechanical Operation the sign of the number can be typed.

For the T$o$ operation, relay R12 is actuated, and relays R4, R5, and R11 are not actuated. In this case a closed circuit exists between terminals K2 and 11–5C in FIGURE 15. Terminal K2 is also connected to terminal 5–3C. Another closed circuit exists between terminals K3 and 11–8C. Terminal K3 is also connected to terminals 12–6A and 5–4C.

The entries in the T$o$ row of the K2 section of FIGURE 17 indicate the functioning of the calculator during the first eleven cycles of the T$o$ operation. As indicated by the entries in FIGURE 17, the functioning of the T$o$ operation is substantially the same as for the T$a$ and T$i$ operations except that at T2 time it is the designated Address that is sensed (11–5C to "or" circuit 521 in FIGURE 9) and entered into the Adder, and at T6 time it is the Output Register that is sensed (11–5C to "or" circuit 526 in FIGURE 9), but not entered into the Adder. The Up-down Counters are stepped up one position at T1 time (5–3C to "or" circuit 612 in FIGURE 11).

Another difference between the T$o$ operation and the T$a$ and T$i$ operations is that on the eleventh cycle of the T$o$ operation, the Output Relays will be actuated (N11 to "and" circuit 781 and 11–5C to "or" circuit 780 in FIGURE 12c) at T5 time in the manner explained in connection with the description of the output relay control circuits. In FIGURE 17 this function is noted by the word "Type" in the T5 column of the T$o$ row in the K2 section. If the number being transferred to the Output Register is negative as indicated by the presence of a 9 in the N11 position, relays R37 and R29 in FIGURE 12c will be actuated to represent the 8 bit and 1 bit, respectively. Although both of these relays will be actuated, a contact on one of them is sufficient to control the typing of the minus sign. As indicated by the connections to contact 37–2 in FIGURE 16, it is this contact on relay R37 that is used.

At the end of the eleventh cycle of the T$o$ operation, when the Up-down Counters have been stepped to the N11 position, flip-flop 640 in FIGURE 12a will be in the 1-state or the 0-state according to whether the number that was transferred to the Output Register was negative or positive, respectively. The negative indication results from the fact that the 1 bit of the sign-indicating 9 from the N11 position is 1 if a 9 is present. If the 1 bit is 0, indicating a positive number, the T$o$ operation is complete. The positive signal which appears on the $\bar{I}$ terminal at this time is used to cause the termination of the T$o$ operation (N11 and $\bar{I}$ to "and" circuit 591 and 11–5C to "or" circuit 592 in FIGURE 10).

If, on the other hand, the number that was transferred to the Output Register was negative, the potential at the $\bar{I}$ terminal would be negative at the end of the eleventh cycle, and the operation would not be terminated. Instead, the Timing Pulse Generator would proceed through additional cycles. Then on the twelfth cycle, with the calculator still in the K2 state, the functions performed would be the same as for the first eleven cycles except that, inasmuch as the Up-down Counters would be stepped at T1 time from the N11 to the N0 position, no changes would take place in the Storage Unit because no N0 position exists in the Storage Unit.

If the calculator performs a twelfth cycle of the To operation as a result of the transferred number being negative, the calculator will be changed to the K3 state at the end of this twelfth cycle (N0 to "and" circuit 578 and 11–5C to "or" circuit 579 in FIGURE 10).

The 0/11 notation in the last column of the To row in the K2 section of FIGURE 17 indicates that the Up-down Counters may be in the N0 or N11 state at the time the cycles in the K2 state cease, with the determination being whether the number was negative or positive, respectively, as explained above.

If the transferred number is negative and the calculator is thereby placed in the K3 state, the calculator then functions as indicated by the entries in the To row of the K3 section of FIGURE 17. As indicated by the entries, the functions that the calculator perform produce a second transfer of the number from the designated Address to the Output Register. This second transfer is similar to the first transfer except that the number is transposed to its 9's complement. Inasmuch as the negative number being transferred is already in the 9's complement form, the transposing which occurs during the second transfer causes the number to appear in its true form in the Output Register.

When the calculator is in the K3 state during the To operation the Up-down Counters are stepped up one position at T1 time of each cycle (11–8C to "or" circuit 612 in FIGURE 11). The digit in the corresponding position of the designated Address is sensed at T2 time (11–8C to "or" circuit 521 in FIGURE 9) and is entered into the Adder. The 9's complementing of each digit occurs at T5 time (5–4C to "or" circuit 741 in FIGURE 13). The corresponding digit of the Output Register is sensed at T6 time (11–8C to "or" circuit 526 in FIGURE 9), but is not entered into the Adder. This action on the Output Register causes the number transferred to it during the first part of the To operation to be destroyed. Therefore, the digits that are left in the Output Register are the digits stored there (at T8 time of the respective cycles) during that part of the To operation when the calculator is in the K3 state.

The termination of the To operation when a negative number is involved occurs at the end of the eleventh cycle after the change to the K3 state, when the Up-down Counters will have been stepped through the various positions to the N11 position (N11 to "and" circuit 596 and 12–6A to "or" circuit 597 in FIGURE 10).

If a sign-indicating symbol is to be typed, the Mechanical Operation part of the instruction that includes To as the Electronic Operation should be the one which causes typing of the sign. Because relays R29 and R37 will be released prior to the execution of another instruction, the sign indication will be lost by the time another instruction is executed. If it is desired to type the sign indication after the number itself has been typed, it is possible to type the number by a series of Mechanical Operations that cause typing of an output digit, as described previously, and then use another instruction with the To opeartion for the electronic part. Then the sign can be typed by using the appropriate Mechanical Operation in the same instruction in which the second To operation appears. As indicated by the circuit in FIGURE 16, the minus sign will be typed only if the number transferred to the Output Register was negative. If the number was positive, the circuit path from switch 107 will be through contact 37–2C to the space-actuating solenoid 813.

The ADD (abbreviated Ad) operation causes the number in the designated Address to be added to the number in the Accumulator. The Ad operation is arranged so that one or both numbers to be added may be negative and therefore in the 9's complement form. Also, because the individual numbers may be negative, the sum may be negative. If, for example, the number in the Accumulator is —5, represented by 99999999994, and if —8, represented by 99999999991, is to be added, the result of a simple addition will be 99999999985 with a carry from the N11 position. This sum is not correct, but if a 1 is added to it to produce 99999999986, the correct 9's complement representation for —13 is obtained as desired for the sum of —5 and —8. It is found that in every case where both numbers being added together are negative, the sum will be negative, and a 1 should be added to the simple arithmetic sum. Similarly, when both numbers are positive it is found that in every case the sum will be positive, but no 1 should be added to obtain the correct sum. In this case no carry will be obtained from the N11 position. Actually, no carry will be obtained from the N10 position either under the assumption that neither of the numbers nor their sum exceeds the 10-digit capacity of the calculator. If one number is negative and the other number is positive, the sum may be positive or negative according to which number is larger. If the positive number is larger, such as, for example, when adding 8, represented by 00000000008, to —5, represented by 99999999994, the sum resulting from a simple addition will be 00000000002 with a carry from the N11 position. This sum is not correct, but it can be corrected by adding 1 to produce 00000000003, the correct sum of 8 and —5. If the negative number is larger, such as, for example, when adding —8, represented by 9999999991, to 5, represented by 0000000005, the result of the addition will be 99999999996, which is the 9's complement representation of —3, the correct sum.

From an analysis of the various number combinations that can enter into an addition, it can be observed that a 1 should be added in those instances when a carry from the N11 position is obtained, but not otherwise. It is assumed that the size of the numbers is such that the 10-digit capacity of the calculator is not exceeded.

The calculator performs the addition of two numbers, one or both of which may be negative, by always adding the 1 during the addition, which occurs when the calculator is in the K2 state. If no carry is obtained from the N11 position during this addition, the calculator changes to the K3 state and subtracts 1. Except to cause the calculator to change to the K3 state, the carry from the N11 position is ignored, that is, this carry is not entered into the Adder.

For the Ad operation, relay R4 is actuated and relays R5, R11, and R12 are not actuated. In this case a closed circuit exists between terminals K2 and 11–3C in FIGURE 15. Terminal K2 is also connected to terminals 4–2A and 5–2C. Another closed circuit exists between terminals K3 and 11–7C. Terminal K3 is also connected to terminal 12–6C.

The entries in the Ad row of the K2 section of FIGURE 17 indicate the functioning of the calculator during the first part of the Ad operation. At T1 time of each cycle the Up-down Counters are stepped up one position (4–2A to "or" circuit 612 in FIGURE 11). At T2 time the corresponding digit in the designated Address is sensed (11–3C to "or" circuit 521 in FIGURE 9) and entered into the Adder. At T5 time, but only during the first cycle when the Up-down Counters are at the N1 position, a 1 is entered into the Adder (11–3C to "or" circuit 711 and N1 to "and" circuit 712 in FIGURE 13). This 1 is added to the digit that was entered into the Adder at T2 time of the first cycle. At T6 time of each cycle the corresponding digit of the Accumulator is sensed (11–3C to "or" circuit 528 in FIGURE 9) and is entered into the Adder (11–3C to "or" circuit 730 in FIGURE 13) to be added to the digit already there. The mechanism of the digit addition including the entry of carries from one digit to the next was explained previously in connection with the description of the Adder and the Adder Input Array. The handling of successive digits from positions N1 through N11 is the same as has been described previously for other operations.

At the end of the eleventh cycle the Up-down Counters will have been stepped to the N11 position, and if a carry has been generated from the addition of the digits in the N11 position, the carry flip-flop 644 in FIGURE 12a will be "on" so that terminal C will transmit a positive signal. The Ad operation will then be terminated (N11 and C to "and" circuit 593 and 11-3C to "or" circuit 594 in FIGURE 10).

However, if no carry is obtained from the N11 position, terminal C will transmit a negative signal at the end of the eleventh cycle, and the Timing Pulse Generator will continue to operate. The twelfth cycle will produce the same functions as the previous cycles except that inasmuch as the Up-down Counters will be stepped from the N11 to the N0 position at T1 time, there will be no alteration of the digits in the Storage Unit. The carry flip-flop will be turned "off" at T5 time of this cycle as is the case on every cycle. At the end of the twelfth cycle the calculator will be changed to the K3 state (N0 to "and" circuit 578 and 5-2C to "or" circuit 579 in FIGURE 10).

When the calculator is in the K3 state during the Ad operation, the functions that take place are as indicated in the Ad, Su row of the K3 section of FIGURE 17. The functions for the Su operation, described later, are the same as for the Ad operation when the calculator is in the K3 state. Therefore, the row designated Ad, Su applied to both the Ad and Su operations. At T1 time of each cycle the Up-down Counters are stepped up one position (12-6C to "or" circuit 612 in FIGURE 11). The Storage Unit is not sensed at T2 time. At T4 time the digit in the Adder, which will be zero each cycle because of the automatic setting of the Adder to zero at T1 time, is transposed to its 9's complement (11-7C to "or" circuit 741 in FIGURE 13) to produce the digit 9 in the Adder. At T6 time of each cycle the corresponding digit in the Accumulator is sensed (12-6C to "or" circuit 528 in FIGURE 9) and entered into the Adder (12-6C to "or" circuit 730 in FIGURE 13) to be added to the digit 9 already there. The carries are generated and handled as described previously (K3 to "or" circuit 713 in FIGURE 13). The effect of adding the number of Accumulator to a series of 9's is to cause 1 to be subtracted from the number. For example, if 99999999973 is added to 99999999999, the sum is 99999999972. By ignoring the carry that occurs in the N11 position, the effective sum is 1 less than the original number.

At the end of the eleventh cycle of the Ad operation after the calculator has been changed to the K3 state the Up-down Counters will have been stepped to the N11 position, and the operation will be terminated (N11 to "and" circuit 596 and 11-7C to "or" circuit 597 in FIGURE 10).

The SUBTRACT (abbreviated Su) operation causes the number in the designated Address to be subtracted from the number in the Accumulator. As with the Ad operation, one or both of the numbers involved may be negative and therefore in 9's complement form. The Su operation proceeds in substantially the same manner as the Ad operation except that the number to be subtracted is transposed to the 9's complement of the original representation. For example, if 5, represented by 00000000005, is to be subtracted from 8, represented by 00000000008, the 5 is transposed to 99999999994 and added to produce 00000000002 with a carry from the N11 position. This sum is not correct, but if a 1 is added to it to produce 00000000003, the correct sum is obtained. For another example, if −5, represented by 99999999994, is to be subtracted, the 9's complementing action produces 00000000005, and when this number is added to 00000000008, the sum obtained is 00000000013 without a carry from the N11 position. The sum is correct in this instance. The subtraction of a negative number results in an addition, as desired. As in the Ad operation, a more detailed examination of the possible number combinations that may be encountered in the Su operation reveals that the 1 should be added in each instance that a carry from the N11 position is obtained, but not otherwise. As with the Ad operation, the calculator performs the Su operation by adding a 1 in every instance and then subtracting 1 in those instances where this should be done as indicated by the absence of a carry from the N11 position.

For the Su operation, relays R4 and R5 are actuated, and relays R11 and R12 are not actuated. In this case terminal K2 is connected to terminals 4-2A, 5-2A, and 11-2C in FIGURE 15. Also terminal K3 is connected to terminals 12-6C and 11-7C, which is the same as for the Ad operation.

With the calculator in the K2 state the functioning is as indicated by the entries in the Su row of the K2 section of the table in FIGURE 17. At T1 time the Up-down Counters are stepped up one position (4-2A to "or" circuit 612 in FIGURE 11). At T2 time the digit in the corresponding position of the designated Address is sensed (5-2A to "or" circuit 521 in FIGURE 9). At T4 time this digit is transposed to its 9's complement 11-2C to "or" circuit 741 in FIGURE 13). At T5 time, but only during the first cycle when the Up-down Counters are in the N1 state, a 1 is entered into the Adder (N1 to "and" circuit 712 and 11-2C to "or" circuit 711 in FIGURE 13). At T6 time the digit in the corresponding position of the Accumulator is sensed (5-2A to "or" circuit 528 in FIGURE 9) and entered into the Adder (11-2C to "or" circuit 730 in FIGURE 13) to be added to the complemented digit already there. The carries from one digit position to the next are handled as described previously (K2 to "or" circuit 713 in FIGURE 13).

If a carry is generated during the eleventh cycle when the Up-down Counters are in the N11 state, the Su operation will be terminated at the end of this eleventh cycle (N11 and C to "and" circuit 593 and 11-2C to "or" circuit 597 in FIGURE 10). However, if no carry is generated at this time, the calculator performs a twelfth cycle in the K2 state. During this cycle the carry flip-flop 644 in FIGURE 12a is turned "off" and no alterations are made in the Storage Unit because the Up-down Counters are stepped to the N0 state at T1 time. At the end of the twelfth cycle, the calculator is changed to the K3 state (N0 to "and" circuit 587 and 11-2C to "or" circuit 579 in FIGURE 10).

The functioning of the calculator while in the K3 state during an Su operation is exactly the same as for an Ad operation while in the K3 state. This identical functioning is a result of the fact that terminal K3 is connected to the same other terminals for both the Ad and Su operations.

The REDUCE BY (abbreviated Ry) operation is similar to SUBTRACT except that in instances where the subtraction would ordinarily produce a negative number the negative number is eradicated and a zero result is generated. In general, only positive numbers enter into the REDUCE BY operation. For example, if 8 is "reduced by" 5, the result is 3, as would be obtained in an ordinary subtraction. However, if 8 is "reduced by" 15, a zero result is produced inasmuch as negative numbers are not permitted. Another name that is sometimes used for the REDUCE BY operation is "diminish." The purpose of the REDUCE BY operation is to make it possible to solve certain mathematical problems with fewer instructions and to accomplish the solution without the need for "jump" (sometimes called "branch") operations in the calculator). The usefulness of a REDUCE BY operation is known to the prior art and is discussed in an article titled "A Positive-Integer Arithmetic for Data Processing," by R. W. Murphy in the April 1957, issue of the IBM Journal of Research and Development, pages 158-170.

For the Ry operation, relays R4, R5, and R12 are actuated, and relay R11 is not actuated. In this case terminal K2 is connected to terminals 4–2A, 5–2A, and 11–2C in FIGURE 15. These connections are the same as for the S*u* operation. Terminal K3 is connected to terminals 12–6A and 5–4A, which is different from the connections for the S*u* operation.

With the calculator in the K2 state the functioning is as indicated by the entries in the R*y* row of the K2 section of the table in FIGURE 17. It will be noted that the entries in this row are identical to the entries in the S*u* row of the K2 section. Because of the identical connections to terminal K2, the functioning of the calculator for the R*y* operation is the same as the functioning for the S*u* operation while the calculator is in the K2 state. That is, the number in the designated Address is subtracted from the number in the Accumulator. The subtraction is accomplished by adding the 9's complement of the number in the designated Address to the number in the Accumulator, and also an extra 1 is added in the N1 position. If the result of the subtraction is a positive number (with zero being included as a positive number), the procedure just described produces the correct result with a carry from the N11 position. Therefore, if a carry is obtained, the R*y* operation is terminated in exactly the same way the S*u* operation was terminated (N11 and C to "and" circuit 593 and 11–2C to "or" circuit 597 in FIGURE 10).

However, if the subtraction produces a negative number, no carry from the N11 position will be obtained, and the negative number in the Accumulator should be changed to zero. In this case the Timing Pulse Generator continues to operate, and the calculator is on the next cycle changed to the K3 state in the same manner as in the S*u* operation (N0 to "and" circuit 578 and 11–2C to "or" circuit 579 in FIGURE 10).

When the calculator is in the K3 state during a R*y* operation the functioning is as indicated by the entries in the R*y* row of the K3 section of FIGURE 17. At T1 time the Up-down Counters are stepped up one position (5–4A to "or" circuit 612 in FIGURE 11). At T6 time the corresponding digit in the Accumulator is sensed (5–4A to "or" circuit 528 in FIGURE 9) but is not entered into the Adder. This sensing causes the digit position to be set to zero. After the Up-down Counter has been stepped through all positions N1 through N11 to cause the entire number in the Accumulator to be set to zero, the R*y* operation is terminated (N11 to "and" circuit 596 and 12–6A to "or" circuit 597 in FIGURE 10).

The HALF ADJUST (abbreviated H*a*) operation causes a 5 to be added to the number in the Accumulator. With this operation, the address part of the instruction specifies the digit position to which the 5 is to be added. The digit position is specified in accordance with the following listing.

| Digit position | R6 | R7 | R13 | R14 |
|---|---|---|---|---|
| N1 | 1 | 0 | 1 | 0 |
| N2 | 0 | 1 | 0 | 1 |
| N3 | 1 | 1 | 0 | 0 |
| N4 | 0 | 0 | 1 | 0 |
| N5 | 1 | 0 | 0 | 1 |
| N6 | 0 | 1 | 0 | 0 |
| N7 | 1 | 1 | 1 | 0 |
| N8 | 0 | 0 | 0 | 1 |
| N9 | 1 | 0 | 0 | 0 |
| N10 | 0 | 1 | 1 | 0 |

As before, a 1 or a 0 in the listing indicates that the corresponding relay is actuated or not actuated, respectively.

The listing indicates that to add 5 to the N3 position, for example, in the Accumulator, relays R6 and R7 should be actuated with relays R13 and R14 not actuated. If the number in the Accumulator happens to be, for example, 00000639712, a 5 added to the N3 position will produce a sum of 00000640212. The purpose of the HALF ADJUST operation is to round off the number to an integral value of the digit position which is one decimal order higher than the digit position to which the 5 is added. In the example cited, a 5 added to the N3 position, that is, the hundreds position, causes the number to be rounded off to the nearest digit in the N4 position, that is, the thousands position. After the number is rounded off, the digit in the position in which the 5 was added and also all digits in lower numbered positions generally become meaningless. In the example, the digits 212 in the N3 to N1 positions are meaningless.

A problem occurs in applying the HALF ADJUST operation to negative numbers which are represented in 9's complement form as is the case in this calculator. If the number in the example in the previous paragraph were negative, it would appear in the Accumulator as $$99999360287$$

Adding 5 to the N3 position of this number produces 99999360787, and when this number is transposed to its true form it becomes (—)0000639212. By disregarding the 212 in the digit positions N3 to N1 it is observed that the number has not been rounded off properly. The significant digits should be 640 rather than 639. However, by subtracting 5 from the N3 position in $$99999360287$$

the number 99999359787 is obtained. When complemented, this number is found to be (—)0000640212 as desired. Again, the digits 212 may be disregarded.

The HALF ADJUST operation in the calculator of this invention produces the correct rounded off number, either positive or negative, by first adding 5 to the designated position. If it is subsequently determined that the number was positive, the operation is terminated. But if it is determined that the number was negative, the calculator then subtracts 1 from the next higher order digit position. The subtraction of 1 from the next higher order digit position is equivalent to subtracting 5 twice from the given digit position. One subtraction of 5 is desired to correct the erroneous addition of 5 and the second subtraction is desired to produce the proper rounded off negative number.

In the example of the negative number that was cited previously, after erroneously adding 5 in the N3 position to produce 99999360787, the calculator then subtracts 1 from the N4 position to produce 99999359787, which is the desired result, as was explained. Again, the digits in the N3 to N1 positions, 787 in this example, are generally meaningless and are not used in subsequent calculations.

For the H*a* operation, relays R4, R11, and R12 are actuated, and relay R5 is not actuated. In this case terminal K2 in FIGURE 15 is connected to terminals 4–2A, 5–2C, 11–3A, and 12–3A. Terminal K3 is connected to terminals 12–6A, 5–4C, and 11–8A.

With the calculator in the K2 state the functioning is as indicated by the entries in the H*a* row of the K2 section of the table in FIGURE 17. At T1 time the Up-down Counters are stepped up one position (4–2A to "or" circuit 612 in FIGURE 11). The E5 notation at T2 time indicates that a 5 is entered into the Adder, but only when the Up-down Counters are at the digit position indicated by the designated Address. In the example of entering a 5 into digit position N3, address relays R6 and R7 would be actuated and relays R13 and R14 would not be actuated, as indicated in the listing given above. The coils of these relays appear in FIGURE 14. The major contacts of these relays appear in FIGURE 3, but these contacts do not come into play during the H*a* operation. Instead, the relay contacts which are used during the H*a* operation are shown in FIGURE 7. Specifically, with the example of adding 5 to the N3 position, terminal X3 is connected through contacts 6–3A and 7–1A to terminal X*i*. Also, terminal Y0 is connected through relay contacts 13–1C and 14–1C to terminal Y$i$. With this arrangement, terminals X$i$ and Y$i$ both have positive potentials applied to them when terminals X3 and Y0 are both positive, which is the case when the Up-down Counters are at position N3 as was explained previously. Therefore, in the example cited, a 5 is entered into the Adder only on that cycle when the Up-down Counters are at position N3 (12–3A, X$i$ and Y$i$ to "and" circuit 724, and 12–3A to "or" circuit 709, and X$i$ and Y$i$ to "and" circuit 710 in FIGURE 13). The Storage Unit is not sensed at T2 time. At T6 time the digit in the corresponding position of the Accumulator is sensed (12–3A to "or" circuit 528 in FIGURE 9) and entered into the Adder (12–3A to "or" circuit 730 in FIGURE 13). For digit positions prior to the entry of a 5, which are positions N1 and N2 in the example cited, there is no net change in the digits stored. These digits are entered into the Adder at T6 time but are regenerated in storage at T8 time. In the example, at T2 time of the third cycle a 5 is entered into the Adder, and then at T6 time of the third cycle the digit from the N3 position of the Accumulator is added to the 5. For subsequent digit positions, the carries, if any, are handled in the previously described manner (K2 to "or" circuit 713 in FIGURE 13).

At the end of the eleventh cycle of the H$a$ operation, when the digit from the N11 position of the Accumulator has been sent to the Adder, the operation is terminated if the number in the Accumulator is positive. With ten digits being the maximum size of the number in the Accumulator, as is assumed to be the case, the digit in the N11 position will be either a 0 or a 9 to represent a positive or negative number, respectively. Specifically, the 1-bit stored in flip-flop 640 in FIGURE 12$a$ (the 8-bit stored in flip-flop 643 could alternatively be used) will therefore be 0 or 1 according to whether the number is positive or negative, respectively. If the number is positive, terminal $\bar{I}$ will carry a positive potential at the end of the eleventh cycle, and the operation will be terminated (N11 and $\bar{I}$ to "and" circuit 591 and 12–3A to "or" circuit 592 in FIGURE 10).

If, on the other hand, the number is negative, the potential at terminal $\bar{I}$ will be negative and the operation will not be terminated. Instead, at the end of the next cycle, when the Up-down Counters have been stepped up from the N11 position to the N0 position, the calculator will be changed to the K3 state (N0 to "and" circuit 578 and 5–2C to "or" circuit 579 in FIGURE 10).

The functioning of the calculator is then as indicated by the H$a$ row in the K3 section of FIGURE 17. At T2 time a $\bar{I}$ is entered into the Adder, but only on the cycle when the Up-down Counter are at the position corresponding to the designated Address. The functioning is similar to the addition of 5 when in the K2 state (11–8A to "or" circuit 709, and X$i$ and Y$i$ to "and" circuit 710 in FIGURE 13). The Up-down Counters are not actuated at T1 time when the calculator is in the K3 state during a H$a$ operation. At T4 time of each cycle the digit currently in the Adder is transposed to its 9's complement representation (5–4C to "or" circuit 741 in FIGURE 13) and the Up-down Counters are stepped up one position (11–8A to "or" circuit 614 in FIGURE 11). Because the stepping of the Up-down Counters occurs after the entry of the 1, the effect is to enter the 1 into the next higher numbered N position than the position designated by the Address. In the example of causing the half adjust to occur in the N3 position, the 1 is entered on the cycle when the Up-down Counters are at position N3 at T2 time, but at T4 time the Up-down Counters are stepped to the N4 position. The digit to subsequently arrive at the Adder during the cycle in question is therefore from the N4 position. After giving consideration to the effect of the 9's complementing, the number that is entered is 99999998999 in this example.

At T5 time, but only on the first cycle after the calculator is changed to the K3 state, when the Up-down Counters are at position N1, a 1 is entered into the Adder (11–8A to "or" circuit 711 and N1 to "and" circuit 712 in FIGURE 13). This 1 is entered at this time for the reason that a similar 1 was entered during the A$d$ and S$u$ operations. At T6 time the digit in the corresponding position of the Accumulator is sensed (11–8A to "or" circuit 528 in FIGURE 9) and entered into the Adder (11–8A to "or" circuit 730 in FIGURE 13) to be added to any digit already there. The addition and the handling of any carries produced by the addition are the same as described previously (K3 to "or" circuit 713 in FIGURE 13). The operation is terminated at the end of the cycle on which the Up-down Counters have been stepped to the N11 position (N11 to "and" circuit 596 and 12–6A to "or" circuit 597 in FIGURE 10).

In the example of performing a H$a$ operation in the N3 position with the negative number 99999360287 in the Accumulator, the calculator, when in the K2 state, would add 5 to the N3 position to produce 99999360787. The calculator would then determine that the number is negative by sensing the 9 in the N11 position. Then when in the K3 state the calculator would subtract 1 from the N4 position by adding 99999998999 and also adding 1 in the N1 position to produce a net sum of 99999359787, which as was explained is the desired rounded off form of the number. Note that the addition of 99999998999 and 1 produces the same effect as adding 99999999000 and which also has the same effect of subtracting 1 in the N4 position.

The SHIFT LEFT (abbreviated L$e$) operation causes the number in the Accumulator to be shifted to the left, that is, to higher numbered N positions, with the number of positions shifted being determined by the Address part of the instruction. The Address relays R6, R7, R13, and R14 are actuated in the binary code with the four relays corresponding to the 8, 4, 2, and 1 bit positions, respectively. For example, to shift one position to the left, only relay R14 is actuated. For another example, to shift six positions to the left, only relays R7 and R13 are actuated. In general, there is no purpose in shifting more than nine positions because with ten-digit numbers as in this calculator, a shift of ten or more positions would cause the number to be shifted out of the Accumulator entirely. Actually, because of the manner in which the 6-correct circuits operate in the calculator, a shift of greater than nine positions is not possible.

For the L$e$ operation, relay R5 is actuated, and relays R4, R11, and R12 are not actuated. In this case a closed circuit exists from terminal K2 to terminal 11–4C in FIGURE 15. Closed circuits also exist from terminal K4 to terminal 4–4C, from terminal K7 to terminals 5–5A and 12–7C, and from terminal K8 to terminals 12–8C and 5–7A.

With the calculator in the K2 state the functioning is as indicated by the entries in the L$e$, R$i$ row of the K2 section of FIGURE 17. The R$i$ operation, to which this row also applies, is described later. At T1 time the Up-down Counters are stepped down one position from N0 to N11 (11–4C to "or" circuit 621 in FIGURE 11), as indicated by the letter D in the T1 column. As indicated by the E$a$ notation in FIGURE 17, at T2 time the digit specified by the combination of actuations of Address Relays R6, R7, R13, and R14 is entered into the Adder through the Adder Input Array. This entry is a result of the fact that terminal 11–4C connected to "and" circuit 729 in FIGURE 13 is positive. Because of the T2 pulse which is applied to the pulse input of this "and" circuit, a positive pulse appears at its output. This pulse then passes through those of contacts 6–9, 7–9, 13–9, and 14–9 which provide closed circuits to "or" circuits 704, 703, 702, and 701, respectively. The pulse is thereby distributed to the flip-flops corresponding to the 8, 4, 2, and 1 bits, respectively, by the process described previously. The combination of Address Relay actuations is thereby caused to be interpreted as a decimal digit when entered into the Adder. The major contacts of Address Relays R6, R7, R13, and R14 appear in FIGURE 3 and are not used in the SHIFT LEFT operation. At T4 time the digit in the Adder is transposed to its 9's complement (11–4C to "or" circuit 741 in FIGURE 13). At T6 time the digit in the N11 position of the MQ Register is sensed (11–4C to "or" circuit 530 in FIGURE 9) but not entered into the Adder. At T8 time the digit in the Adder, which is the 9's complement of the Address interpreted as a digit, is entered into the N11 position of the MQ Register. At the end of the cycle the calculator is changed to the K4 state (N11 to "and" circuit 581, $\overline{C}$ to "and" circuit 581, and 11–4C to "or" circuit 582 in FIGURE 10). It is not really necessary to employ the N11 and $\overline{C}$ signals to cause the change to the K4 state. It happens that these signals are required in other instances when the change to the K4 state is made, so that by using the signals in this instance a few components can be saved. The N11 and $\overline{C}$ terminals will, of course, be positive as desired because the Up-down Counters are at position N11 and because the carry flip-flop will not be storing a carry at this time.

When in the K4 state during the L$e$ operation, the calculator functions as indicated by the entries in the M$u$, L$e$, R$i$ row of the K4 section of FIGURE 17. The M$u$ operation as well as the R$i$ operation, to which this row also applies, is described later. At T5 time a 1 is entered into the Adder (K4 to "or" circuit 715 in FIGURE 13). At T6 time the digit in the N11 position of the MQ Register is sensed (K4 to "or" circuit 530 in FIGURE 9) and entered into the Adder (K4 to "or" circuit 730 in FIGURE 13) to be added to the 1 which was entered at T5 time. It is the N11 position that is involved because the Up-down Counters were at the N11 position at the time the change from the K2 state to the K4 state was made, and no stepping of the Up-down Counters has taken place in the meantime. At T8 time the resulting digit is stored in the N11 position of the MQ Register. This action has the effect of causing the N11 position of the MQ Register to be employed as a decimal counter. If the digit in this "counter" was 9 at the beginning of the cycle, the addition of 1 would cause it to be increased to 0 with a carry appearing in the carry storage flip-flop 644 in FIGURE 12$a$. The action of the calculator at the end of this cycle depends on whether or not a carry was produced by the addition of 1. If a carry was produced, the operation is terminated (N11 and C to "and" circuit 593 and 4–4C to "or" circuit 594 in FIGURE 10).

Note that if none of the Address Relays was closed, a shift of no positions, that is, no shift at all would be indicated. The 0 digit thereby entered and complemented to 9 when the calculator was in the K2 state would then be increased to 0 with a carry when the calculator is in the K4 state. The operation would then be terminated, as required for no shifting.

If any digit other than zero was entered from the Address Relays, the addition of 1 while in the K4 state would not produce a carry, and the operation would not be terminated at this time. At T8 time, if no carry is produced, the Up-down Counters are stepped down from the N11 position to the N10 position ($\overline{C}$ to "and" circuit 626 and K4 to "or" circuit 627 in FIGURE 11). Also, if no carry is produced, the calculator is changed to the K7 state at the end of T8 time ($\overline{C}$ to "and" circuit 586 and 4–4C to "or" circuit 587 in FIGURE 10). As indicated by the 10/11 notation in the last column of the M$u$, L$e$, R$i$ row of the K4 section of FIGURE 17, the Up-down Counters may be at the N10 position or the N11 position at the end of the cycle.

As indicated by the lack of entries in the L$e$ row of the K7 section of FIGURE 17, nothing happens during the cycle that the calculator is in the K7 state. At the end of the cycle the calculator is changed to the K8 state (K7 to "and" circuit 588 and 5–5A to "or" circuit 589 in FIGURE 10). The purpose of causing the calculator to exist in the K7 state during the L$e$ operation is to make the circuits more analogous to the circuits for the R$e$ operation, which is described later. It happens that a few components can be saved thereby.

When the calculator is in the K8 state during the L$e$ operation the functioning is as indicated by the entries in the L$e$ row of the K8 section of FIGURE 17. The Up-down Counters are stepped down at T1 time, up at T4 time and down again at T8 time (12–8C to "or" circuit 620 in FIGURE 11). At T2 time the corresponding digit in the Accumulator is sensed (K8 to "or" circuit 527 in FIGURE 9) and entered into the Adder. At T6 time the corresponding digit in the Accumulator (but a different digit from the one sensed at T2 time because of the action of the Up-down Counters at T4 time) is again sensed (K8 to "or" circuit 528 in FIGURE 9) but not entered into the Adder. The effect of the functions just described is to shift the digits in the Accumulator to the left one position with the action being the same as described for the input and output sequences. Each digit is shifted just one position to the left before the calculator is again changed to some other state. Because the Up-down Counters are at step N10 at the time the change to the K8 state is made, the first digit shifted is the digit in the N9 position. This digit is shifted to the N10 position. The digit in the N11 position is not shifted and is not altered. This digit corresponds to the sign digit, and it is desired that the sign remain unchanged during the shifting operation. On that cycle when the Up-down Counters are at position N1 at the start of the cycle, the calculator performs the functions for shifting the digit from the N0 position of the Accumulator to the N1 position. Because no N0 position exists in the Storage Unit, the effect is to shift a zero into the N1 position. This shifting of a zero into the N1 position is as desired for positive numbers being shifted. For negative numbers, it would be preferred to shift a 9 into the N1 position. It would be possible to alter the design of the calculator to cause the shifting of a 9 into the N1 position in case the number is negative, but extra components would be required, and it has been found that the digit shifted into this position is seldom, if ever, used in practice. A major purpose of the SHIFT LEFT operation is to prepare a number for typing when it is known that the number will be less than ten digits in magnitude. In such a case only as many Mechanical Operations are used as there are digits in the number to be typed with the remaining digits, the ones on the right, not being used. In instances where it is actually desired to use the digit shifted into the low order position of a negative number, the correct shifting can be obtained by programming. If it is not known whether the number to be shifted is positive or negative, the programming is a bit complex, but it can be accomplished through the use of the R$y$ operation.

After the cycle in which the calculator performs the functions of shifting a digit from the N0 position to the N1 position, the calculator proceeds through one more cycle during which it performs the functions of shifting the digit from the N11 position to the N0 position. Except to get the Up-down Counters to the N11 position as desired for changing back to the K4 state again, there is no net effect of this cycle. The digit in the N11 position is sensed at T2 time of this cycle, but is automatically regenerated at T3 time. The functions performed at the N0 position have no effect because no N0 position exists in the Storage Unit.

At the end of the cycle described in the previous paragraph the calculator is again changed to the K4 state (N11 and $\overline{C}$ to "and" circuit 581 and 5–7A to "or" circuit 582 in FIGURE 10). The use of the N11 signal is significant when making this change to the K4 state because the calculator performs several cycles while in the K8 state, and the change must be made on the particular cycle when the Up-down Counters are at the N11 position. The use of the $\overline{C}$ signal is still a matter of saving components, and this signal may be used because it happens to be positive at the time the change to the K4 state is desired.

During the second time the calculator is in the K4 state for the L*e* operation, a second 1 is added to the N11 position of the MQ Register. The addition is accomplished as before. Also, as before, the operation is terminated or not according to whether the addition of 1 produces or does not produce a carry, respectively. The number of times that the calculator proceeds through the K4–K7–K8–K4 sequence is determined by the value of the digit originaly entered through the Address Relay contacts into the N11 position of the MQ Register. The number in the Accumulator is shifted to the left one position each time the calculator proceeds through the K4–K7–K8–K4 sequence.

That the number of positions shifted is equal to the value of the digit entered through the Address Relay contacts can be illustrated by an example. If the digit 2 is entered into the N11 position of the MQ Register, this digit is complemented to 7 when the calculator is in the K2 state. The 7 is increased to 8 without a carry when the calculator is in the K4 state. A shift of one position subsequently takes place. The second time the calculator is in the K4 state the 8 is increased to 9 without a carry. A second shift of one position subsequently takes place. The calculator is changed to the K4 state a third time, and this time the 9 is increased to 0 with a carry, and the operation is terminated with a net shift of two positions as specified.

The SHIFT RIGHT (abbreviated R*i*) operation is similar to the L*e* operation except that the shifting is done to the right, that is, to lower numbered N positions.

For the R*i* operation, relays R5 and R12 are actuated, and relays R4 and R11 are not actuated. In this case a closed circuit exists from terminal K2 to terminal 11–4C in FIGURE 15. Closed circuits also exist from terminal K4 to terminal 4–4C, from terminal K7 to terminals 5–5A and 12–7A, and from terminal K8 to terminal 12–8A.

Because the connections from terminals K2 and K4 are exactly the same for the R*i* and L*e* operations, the functioning of the calculator is the same for these two operations when the K2 or K4 states. This similarity is indicated in FIGURE 17 by combining the corresponding rows in the K2 section to form a single L*e*, R*i* row and in the K4 section to form a M*u*, L*e*, R*i* row. The functions for the M*u* operation, described later, are also the same in the K4 state.

When the calculator is changed to the K7 state during a R*i* operation, the functioning is as indicated by the entries in the R*i* row of the K7 section of FIGURE 17. At T1 time the Up-down Counters are stepped up from the N10 position to the N11 position (12–7A to "or" circuit 612 in FIGURE 11) and at T8 time are stepped up again from the N11 position to the N0 position (12–7A to "or" circuit 618 in FIGURE 11). At the end of the cycle, the calculator is changed to the K8 state (K7 to "and" circuit 588 and 5–5A to "or" circuit 589 in FIGURE 10). The purpose of having the calculator in the K7 state during the R*i* operation is merely to change the status of the Up-down Counters from the N10 position to the N0 position as desired at the start of the functioning while in the K8 state.

The functioning of the calculator when in the K8 state during the R*i* operation is as indicated by the entries in the R*i* row of the K8 section of FIGURE 17. The Up-down Counters are stepped up at T1 time 12–8A to "or" circuit 612 in FIGURE 11), down at T4 time (12–8A to "and" circuit 623 in FIGURE 11), and up again at T8 time (12–8A to "or" circuit 618 in FIGURE 11). At T2 time the corresponding digit in the Accumulator is sensed (K8 to "or" circuit 527 in FIGURE 9) and entered into the Adder. The analogous digit, but a different digit because of the change in the Up-down Counters at T4 time, is sensed again at T6 time (K8 to "or" circuit 528 in FIGURE 9) but is not entered into the Adder. On the first cycle after changing to the K8 state during the R*i* operation, the Up-down Counters are initially stepped up from the N0 position to the N1 position. The digit from the N1 position of the Accumulator is entered into the Adder at T2 time. Then at T6 time after the Up-down Counters have been stepped back down to the N0 position, the calculator performs the functions for setting to zero the digit in the N0 position and for storing the digit from the N1 position in the N0 position. However, because no N0 position exists in the Storage Unit, there is no net change in the digits stored. At T8 time the Up-down Counters are stepped back up to the N1 position again.

On the second cycle while in the K8 state during a R*i* operation, the Up-down Counters are at T1 time stepped from the N1 position to the N2 position. The digit from the N2 position of the Accumulator is entered into the Adder at T2 time. Then at T6 time after the Up-down Counters have been stepped back to the N1 position, the N1 position in the Accumulator is set to zero. At T8 time the digit in the Adder, which is the digit from the N2 position, is stored in the N1 position. The net effect is to shift the digit from the N2 position of the Accumulator to the N1 position, that is, to the right. At T8 time the Up-down Counters are again stepped up to the N2 position. On subsequent cycles the digits in the higher numbered N positions are similarly shifted to the right.

On the cycle when the Up-down Counters are initially at position N10 while in the K8 state during a R*i* operation, the digit in the N11 position of the Accumulator is shifted to the N10 position by the same process used for digits in other positions. However, the digit in the N11 position represents the sign of the number in the Accumulator. It happens that the correct shifted number is obtained when the sign digit is shifted into the N10 position. If the number is positive, the sign digit is 0, and in this case it is desired to shift a 0 into the N10 position. If the number is negative, the sign digit is 9, and with negative numbers, which are represented in 9's complement form, it is desired that a 9, which is the 9's complement of 0, be shifted into the N10 position. At T8 time of this cycle the Up-down Counters are stepped up from the N10 position to the N11 position, and the calculator is then changed to the K4 state (N11 and $\overline{C}$ to "and" circuit 581 and 12–8A to "or" circuit 582 in FIGURE 10).

All other features of the R*i* operation are the same as for the L*e* operation, which was described previously.

The MULTIPLY (abbreviated M*u*) operation causes the number in the designated Address to be multiplied by the number in the MQ Register. The product is generated in the Accumulator. Ordinarily, in the applications for which the calculator is intended, both numbers entering into the multiplication are positive.

For the M*u* operation, relay R11 is actuated, and relays R4, R5, and R12 are not actuated. In this case a closed circuit exists from terminal K2 to terminals 5–3C and 11–6A in FIGURE 15. Closed circuits also exist from terminal K3 to terminals 12–6C, 11–7A, and 4–3C, from terminal K4 to terminal 4–4C, from terminal K6 to terminals 5–6C and 4–6C, from terminal K7 to terminal 5–5C, and from terminal K8 to terminals 12–8C and 5–7C.

As indicated by the entries in the various rows containing a M*u* designation in FIGURE 17, the calculator executes the M*u* operation in the following manner. With the calculator in the K2 state the Up-down Counters are stepped up one position at T1 time (5–3C to "or" circuit 612 in FIGURE 11). At T6 time the corresponding digit in the Accumulator is sensed (11–6A to "or" circuit 528 in FIGURE 9) but is not entered into the Adder. These functions have the effect of setting the Accumulator to zero. Any number that may have been in the Accumulator at the start of the M$u$ operation is lost. At the end of the eleventh cycle, when the Up-down Counters have been stepped to the N11 position, the calculator is changed to the K6 state (N11 to "and" circuit 585 and 11-6A to "or" circuit 598 in FIGURE 10). With the Accumulator now cleared of any extraneous digits, the calculator then proceeds with the actual multiplication.

To perform the multiplication, an over-and-over addition process is used. In the explanation of the process the numbers in the designated Address and the MQ Register will be termed the multiplicand and the multiplier, respectively. First, the digit in the N10 position of the multiplier is sensed, and the multiplicand is added into the Accumulator a number of times equal to the value of the digit. Then the multiplier is shifted to the left one position, and the number in the Accumulator is also shifted to the left one position. The number in the Accumulator at intermediate points of the multiplication process may be termed the partial product. The digit in the N10 position of the MQ Register, which is now the digit that was originally in the N9 position of the multiplier, is sensed again, and the multiplicand is added into the Accumulator a number of times equal to the value of this next digit from the multiplier. The multiplier and partial product are again shifted to the left one position, and the process is repeated again. Because there are ten digits (some or all of which may be zero) in the multiplier, the calculator proceeds through the process of sensing the multiplier digit and adding the multiplicand ten times. The N11 position of the MQ Register is used as the counter to count the number of multiplier digits sensed.

After the calculator has been changed to the K6 state from the K1 state during the M$u$ operation, the Up-down Counters are stepped down from the N11 position to the N10 position at T1 time (4-6C to "or" circuit 621 in FIGURE 11). At T4 time the digit in the Adder is transposed to its 9's complement (4-6C to "or" circuit 741 in FIGURE 13). Because the digit is initially zero, the effect of the complementing is to place a 9 in the Adder. At T6 time the digit in the N10 position of the MQ Register is sensed (5-6C to "or" circuit 530 in FIGURE 9) and entered into the Adder (5-6C to "or" circuit 730 in FIGURE 13) to be added to the 9 already there. At T8 time the sum digit is returned to the N10 position of the MQ Register, and also the Up-down Counters are stepped back up from the N10 position to the N11 position. The effect of adding the digit from the N10 position to 9 is to subtract 1 from the digit. For example, if the digit was 6, the sum after adding it to 9 is 5 with a carry. If the digit was any value other than 0, adding it to 9 will produce a carry. The presence of the carry is therefore an indication that the digit was not zero, and that the multiplicand should be added into the Accumulator. If the multiplier digit was not zero, the calculator is changed to the K3 state (C and 4-6C to "and" circuit 580 in FIGURE 10).

With the calculator in the K3 state during the M$u$ operation, the Up-down Counters are stepped up at T1 time (12-6C to "or" circuit 612 in FIGURE 11). At T2 time the digit in the corresponding position of the designated Address is sensed (11-7A to "or" circuit 521 in FIGURE 9) and entered into the Adder. At T6 time the corresponding digit in the Accumulator is sensed (12-6C to "or" circuit 528 in FIGURE 9 and entered into the Adder (12-6C to "or" circuit 730 in FIGURE 13) to be added to the digit already there. The details of the addition process and the handling of carries are as described previously (K3 to "or" circuit 713 in FIGURE 13). Inasmuch as the Up-down Counters are at position N11 at the time the change to the K3 state is made, they are stepped to position N0 during the first cycle in the K3 state. Also, during the first cycle in the K3 state the carry flip-flop, which had been turned "on" to create a signal for changing to the K3 state, is turned "off" at T5 time in the manner described previously. The calculator performs the functions of entering this carry into the Adder and then into storage, but because no N10 position exists in the Storage Unit, there is no alteration of the digits stored. The net effect of the functions during the time the calculator is in the K3 state is to add the number in the designated Address to the number in the Accumulator. The number in the designated Address is retained there. At the end of the cycle on which the Up-down Counters are stepped to the N11 position, the calculator is changed back to the K6 state (N11 to "and" circuit 585 and 4-3C to "or" circuit 598 in FIGURE 10).

During the second and succeeding times that the calculator is in the K6 state during the M$u$ operation, the number currently in the N10 position of the MQ Register is reduced by 1 by the same process as before. As long as the digit remains greater than 0, the subtraction process will produce a carry that will cause the calculator to be changed back to the K3 state to cause another addition of the number in the designated Address to the partial product being developed in the Accumulator.

If, when in the K6 state during a M$u$ operation, the digit in the N10 position of the MQ Register is a 0 initially or has been reduced to 0 by the process described, a subtraction of 1 (accomplished by the addition of 9) will not produce a carry. In this case the over-and-over addition is to be terminated for the multiplier digit currently entering into the calculations. Instead, a determination is to be made to establish whether or not the M$u$ operation should be terminated. For this determination, the calculator is changed to the K4 state (N11 and $\overline{C}$ to "and" circuit 581 and 4-6C to "or" circuit 582 in FIGURE 10). In this case the N11 signal is not needed, but the Up-down Counters will always be in the N11 position at the end of a cycle in the K6 state.

With the calculator in the K4 state during the M$u$ operation, the functions performed by the calculator are identical to the functions described for the K4 state during the L$e$ and R$i$ operations because the K4 terminal is connected to the same other terminals and because the Up-down Counters are at the N11 position as was the case in the L$e$ and R$i$ operations. The calculator adds 1 to the digit in the N11 position of the MQ Register. It is assumed that the digit in the N11 position of the MQ Register is zero at the start of the M$u$ operation. The digit, zero, would be obtained in this position if the multiplier is positive, as is assumed to be the case. The first time the calculator is placed in the K4 state during the M$u$ operation the digit in the N11 position of the MQ Register is increased from 0 to 1. No carry is obtained. Without a carry, the Up-down Counters are at T8 time stepped from the N11 position to the N10 position ($\overline{C}$ to "and" circuit 626 and K4 to "or" circuit 627 in FIGURE 11), and at the end of T8 time the calculator is changed to the K7 state ($\overline{C}$ to "and" circuit 586 and 4-4C to "or" circuit 587 in FIGURE 10).

With the calculator in the K7 state during the M$u$ operation, the Up-down Counters are stepped down at T1 time, up at T4 time, and down again at T8 time (5-5C to "or" circuit 620 in FIGURE 11). At T2 time the corresponding digit in the MQ Register is sensed (5-5C to "and" circuit 539 in FIGURE 9) and entered into the Adder. At T6 time the corresponding digit in the MQ Register (but a different digit from the one sensed at T2 time because of the action of the Up-down Counters at T4 time) is again sensed (5-5C to "or" circuit 530 in FIGURE 9) but is not entered into the Adder. The effect of the functions just described is to shift the digits in the MQ Register to the left one position with the action being the same as described for the input and output sequences. Each digit is shifted just one position to the left before the calculator is again changed to some other state. Because the Up-down Counters are at position N10 at the time the change to the K7 state is made, the first digit shifted is the digit in the N9 position. This digit is shifted to the N10 position. The digit in the N11 position of the MQ Register is not altered when the calculator is in the K7 state. This digit position is being used as a counter to count the number of multiplier digits that have entered into the calculation. On the cycle when the counters are at step N1 at the start of the cycle, the calculator performs the functions for shifting the digit from the N0 position of the MQ Register to the N1 position. However, because no N0 position exists in the Storage Unit, the effect is to enter a 0 into the N1 position. This 0 does not enter into the calculations subsequently, except that when the calculator is changed to the K7 state at subsequent times during the M$u$ operation, the 0's entered at this part of the process cause the MQ Register to contain the 10-digit number, zero, at the end of the M$u$ operation. On the next cycle after shifting the digit from the N0 position to the N1 position, the calculator proceeds through one more cycle while still in the K7 state. During this cycle the calculator performs the functions for shifting the digit from the N11 position of the MQ Register to the N0 position. Again, because the N0 position does not exist in the Storage Unit and also because the digit sensed in the N11 position at T2 time is automatically restored at T3 time, there is no change in the digits stored. The purpose of this last cycle is to get the Up-down Counters stepped back to the N11 position as desired when changing to the K8 state. At the end of the cycle just described, the calculator is changed to the K8 state (K7 to "and" circuit 588 and N11 to "or" circuit 589 in FIGURE 10).

With the calculator in the K8 state during the M$u$ operation, the same functions are performed as when in the K7 state except that it is the number in the Accumulator instead of in the MQ Register that is shifted. The Up-down Counters are stepped down at T1 time, up at T4 time, and down again at T8 time (12–8C to "or" circuit 620 in FIGURE 11). The corresponding digit in the Accumulator is sensed at T2 time (K8 to "or" circuit 527 in FIGURE 9) and entered into the Adder. At T6 time the corresponding digit in the Accumulator (but a different digit from the one sensed at T2 time because of the action of the Up-down Counters at T4 time) is again sensed (K8 to "or" circuit 528 in FIGURE 9) but not entered into the Adder. Because the Up-down Counters are at position N11 at the time the change to the K8 state is made, the first digit shifted is the digit in the N10 position. This digit is shifted to the N11 position. This digit will be zero ordinarily however, because of the setting of the Accumulator to zero while the calculator was in the K2 state during the M$u$ operation and because 10 digits is the maximum size of product allowed. During subsequent cycles of the K8 state, digits will be shifted left in the same manner as described previously for other instances of shifting. On the cycle when the Up-down Counters are at position N1 at the start of the cycle, the calculator will perform the functions for shifting the digit in the N0 position of the Accumulator to the N1 position, but because no N0 position exists in the Storage Unit, the effect is to enter a 0 into the N1 position. On the next cycle the calculator performs the functions for shifting the digit from the N11 position of the Accumulator to the N0 position, but for the same reasons that applied when shifting the number in the MQ Register, no change is effected on the stored digits during this cycle. At the end of this cycle, the Up-down Counters will be at position N11, and the calculator will be changed to the K6 state again (N11 to "and" circuit 585 and 5–7C to "or" circuit 598 in FIGURE 10).

When the calculator is changed to the K6 state after being in the K8 state during the M$u$ operation, the calculator performs the same functions as performed when in the K6 state before except that a new digit of the multiplier will have been shifted into the N10 position of the MQ Register. The calculator will then be changed back and forth between the K6 and K3 states again as required for the over-and-over addition of the multiplicand to the partial product. Each time the calculator completes the additions required by the multiplier digit, the calculator will be changed to the K4 state as described before.

The second time the calculator is in the K4 state during a M$u$ operation, the digit in the N11 position of the MQ Register is increased from 1 to 2, again without a carry. The calculator will then again be changed to the K7, K8, K6, and K3 states as described above. After performing the functions required for all ten digits of the multiplier, the digit in the N11 position of the MQ Register will have been increased to 9. Then the next time the calculator is changed to the K4 state, the addition of 1 will change the digit from 9 to 0 with a carry. If a carry is generated, the Up-down Counters are not stepped at T8 time but are instead left at the N11 position, which is the position at which they were at the time the change to the K4 state was made. The presence of the carry signal at this time is used to terminate the M$u$ operation (N11 and C to "and" circuit 593 and 4–4C to "or" circuit 594 in FIGURE 10).

The DIVIDE (abbreviated D$i$) operation causes the number in the Accumulator to be divided by the number in the designated Address. The quotient is generated in the MQ Register. Ordinarily, in the applications for which the calculator is intended, both numbers entering into the division are positive, and with the design of the invention as herein described both numbers must be positive for the correct quotient to be obtained.

For the D$i$ operation, relays R4 and R11 are actuated, and relays R5 and R12 are not actuated. In this case a closed circuit exists from terminal K2 to terminals 4–2A, 5–2C, 11–3A, and 12–3C in FIGURE 15. Closed circuits also exist from terminal K3 to terminals 12–6C, 11–7A, and 4–3A, from terminal K4 to terminal 4–4A, from terminal K6 to terminals 5–6C and 4–6A, from terminal K7 to terminal 5–5C, and from terminal K8 to terminals 12–8C and 4–7A. Terminal K5 is used during the D$i$ operation, but this terminal is not connected to any of the contacts on the Electronic Operation relays R4, R5, R11, and R12 because the calculator exists in the K5 state only during the D$i$ operation and never during any of the other operations.

As indicated by the entries in the rows designated D$i$ in the various sections of FIGURE 17, the calculator executes the D$i$ operation in the following manner. With the calculator in the K2 state, the Up-down Counters are stepped up one position at T1 time (4–2A to "or" circuit 612 in FIGURE 11). At T6 time the corresponding digit in the MQ Register is sensed (12–3C to "or" circuit 530 in FIGURE 9) but is not entered into the Adder. These functions have the effect of setting the MQ Register to zero. Any number that may have been in the MQ Register at the start of the D$i$ operation is lost. At the end of the twelfth cycle, when the Up-down Counters have been stepped to the N0 position, the calculator is changed to the K3 state (N0 to "and" circuit 578 and 5–2C to "or" circuit 579 in FIGURE 10). Actually, during the twelfth cycle, no change takes place in the Storage Unit because no N0 position exists in the Storage Unit. Also, from the standpoint of the execution of the D$i$ operation it would be satisfactory to make the change to the K3 state at the end of the eleventh cycle when the Up-down Counters are at position N11, but additional components would be required. By making the change as described, the same "and" circuit 578 in FIGURE 10 may be used as was used for other operations. With the MQ Register now cleared of any extraneous digits, the calculator then proceeds with the actual division.

To perform the division, an over-and-over subtraction process is used. In the explanation of the process the numbers in the Accumulator and designated Address will be termed the dividend and divisor, respectively. First, the divisor is repeatedly subtracted from the dividend until a negative result is obtained. When a negative result is obtained, the divisor is added once to return the remainder to its last positive value. With each subtraction of the divisor where a positive remainder is produced, a 1 is added to the N1 position of the MQ Register to build up the quotient digit. After the quotient digit has been determined, the quotient and the remainder of the dividend are each shifted to the left one position. The process is then repeated to determine the second quotient digit, which is also built up in the N1 position of the MQ Register, the first quotient digit having been shifted to the N2 position. This sequence of events is repeated ten times in the determination of the ten quotient digits. The N11 position of the MQ Register is used as a counter to count the number of quotient digits determined.

With the calculator in the K3 state during the D$i$ operation, the Up-down Counters are stepped up one position at T1 time (12-6C to "or" circuit 612 in FIGURE 11). At T2 time the corresponding digit in the designated Address is sensed (11-7A to "or" circuit 521 in FIGURE 9) and entered into the Adder. At T4 time the digit in the Adder is transposed to its 9's complement (4-3A to "or" circuit 741 in FIGURE 13). At T5 time, but only on the cycle during which the Up-down Counters are at position N1, a 1 is entered into the Adder to be added to the digit already there (4-3A to "or" circuit 711 and N1 to "and" circuit 712 in FIGURE 13). At T6 time the corresponding digit in the Accumulator is sensed (12-6C to "or" circuit 528 in FIGURE 9) and entered into the Adder (12-6C to "or" circuit 730 in FIGURE 13). This pattern of functions is the same as for the S$u$ operation when the calculator is in the K2 state. The net result is therefore the same, that is, the number in the designated Address is subtracted from the number in the Accumulator. For the same reasons as described before, if no carry is obtained from the N11 position during the subtraction, a negative remainder is indicated. If the remainder is negative, the calculator is changed from the K3 state to the K5 state (N11, $\overline{C}$, and 4-3A to "and" circuit 584 in FIGURE 10). If a carry is obtained, a positive remainder is indicated. With a positive remainder, the conditions for changing to the K5 state will not be satisfied, and the calculator will proceed through one additional cycle while still in the K3 state. During this additional cycle the Up-down Counters will be stepped up from the N11 position to the N0 position, where no corresponding position exists in the Storage Unit, and the carry flip-flop will be turned "off" so that the calculator will be changed to the K4 state (N0 and 4-3A to 583 in FIGURE 10).

Consider first the case where a positive remainder was obtained, and the calculator is changed to the K4 state during the D$i$ operation. In this case the Up-down Counters will be stepped up from the N0 position to the N1 position at T1 time (4-4A to "or" circuit 612 in FIGURE 11). At T5 time a 1 will be entered into the Adder (K4 to "or" circuit 715 in FIGURE 13). At T6 time the digit in the N1 position of the MQ Register is sensed (K4 to "or" circuit 530 in FIGURE 9) and entered into the Adder (K4 to "or" circuit 730 in FIGURE 13) to be added to the 1 already there. At T8 time when the contents of the Adder are entered into the N1 position of the MQ Register, the effect will have been to increase the value of the digit in that position by 1. At the end of the cycle the Up-down Counters are stepped back down from the N1 position to the N0 position to place them at the correct position for the start of another subtraction ($\overline{C}$ to "and" circuit 626 and K4 to "or" circuit 627 in FIGURE 11). At the end of the cycle the calculator is changed back to the K3 state (N0 to "and" circuit 578 and 4-4A to "or" circuit 579 in FIGURE 10).

It is to be noted that, if the numbers involved in the D$i$ operation are of proper relative magnitudes, as is assumed to be the case, the quotient digit being built up at times the calculator is in the K4 state will never be greater than 9. Therefore, no carry will be generated. The presence of a carry on this cycle could be used as a divide overflow signal. In fact, with the arrangement as described, the calculator "locks up" in the K4 state when a quotient digit greater than 9 is indicated. This action results from the fact that the $\overline{C}$ signal will be negative if a carry is generated. Inasmuch as a carry will be generated if the calculator attempts to produce a quotient digit greater than 9, the Up-down Counters will not, at T8 time, be stepped down while the calculator is in the K4 state during a D$i$ operation. Then at the end of the cycle, the N11 signal will not be positive as required for changing to some other state, the K3 state in particular. The calculator continues to perform cycles in the K4 state with the Up-down Counters being stepped up one position at T1 time of each cycle. The various digit positions in the MQ Register are then extraneously actuated with a step down of the Up-down Counters on cycles when no carry is generated. However, no condition for changing to another state is met, and eventually the Up-down Counters are in such position that they are stepped up from the N11 position to the N0 position at T1 time and back down to the N11 position at T8 time with no carry having been generated because no N0 position exists in the Storage Unit to supply digits. This last described cycle then repeats indefinitely until corrective action is taken by the operator. The "if $\overline{C}$" notation is not shown in the D$i$ row of the K4 section of FIGURE 17 because it is assumed that the numbers have appropriate relative magnitudes and that the $\overline{C}$ signal will always be positive so that the "locking up" action described in this paragraph will not be encountered.

With the calculator back in the K3 state during the D$i$ operation, another subtraction is performed as before. The calculator changes back and forth between the K3 and K4 states as long as the subtraction continues to produce positive remainders. When a negative remainder is eventually obtained, the quotient digit will have been determined. The calculator will then be changed to the K5 state as described above.

With the calculator in the K5 state during the D$i$ operation, the Up-down Counters are stepped up at T1 time (K5 to "or" circuit 612 in FIGURE 11). At T2 time the corresponding digit in the designated Address is sensed (K5 to "or" circuit 521 in FIGURE 9) and entered into the Adder. At T6 time the corresponding digit in the Accumulator is sensed (K5 to "or" circuit 528 in FIGURE 9) and entered into the Adder (K5 to "or" circuit 730 in FIGURE 13) to be added to the digit already there. Except that a 1 is not entered into the N1 position, this pattern of functions is the same as for the A$d$ operation when the calculator is in the K2 state. The net result is therefore substantially the same, that is, the number in the designated Address is added to the number in the Accumulator. The entry of the 1 in the N1 position is not desired in this addition because the 1 was entered during the subtraction while the calculator was in the K3 state, and the number in the Accumulator is thereby restored to its value before the subtraction by adding the number from the designated Address without the 1 in the N1 position. Also, it may be noted that during the first cycle that the calculator is in the K5 state, the Up-down Counters are stepped from the N11 to the N0 position. During this first cycle, the calculator performs the functions of adding the digits in the N0 position, but because no N0 position exists in the Storage Unit, there is no change in the digits stored. At the end of the twelfth cycle in the K5 state, when the Up-down Counters will have been stepped to the N11 position again, the calculator is changed to the K6 state (N11 to "and" circuit 585 and K5 to "or" circuit 598 in FIGURE 10).

With the calculator in the K6 state during the D$i$ operation, a 1 will be entered into the Adder at T5 time (4–6A to "or" circuit 716 in FIGURE 13). At T6 time the digit in the N11 position of the MQ Register will be sensed (5–6C to "or" circuit 530 in FIGURE 9) and entered into the Adder (5–6C to "or" circuit 730 in FIGURE 13) to be added to the 1 already there. The effect is to increase the digit in the N11 position of the MQ Register by 1. The first time the calculator is in the K6 state during a D*i* operation, this digit will be increased from 0 to 1, it being noted that the entire MQ Register was set to zero when the calculator was in the K2 state. No carry will be generated. With no carry, the Up-down Counters will be stepped down from the N11 position to the N10 position at T8 time ($\overline{C}$ to "and" circuit 626 and 4–6A to "or" circuit 627 in FIGURE 11). At the end of the cycle the calculator is changed to the K7 state with the lack of a carry contributing to the conditions which cause the change ($\overline{C}$ to "and" circuit 586 and 4–6A to "or" circuit 587 in FIGURE 10).

With the calculator in the K7 state during the D*i* operation the functions performed are identical to the functions performed when the calculator was in the K7 state during the M*u* operation, which has already been explained. The reason is that terminal K7 is connected to the same other terminals for both the M*u* and D*i* operations. Specifically, each digit in the MQ Register except the digit in the N11 position is shifted to the left one position. The digit initially in the N10 position is lost, but this digit is always 0 anyway. A 0 is shifted into the N1 position. At the end of the cycle that the Up-down Counters have been stepped to the N11 position, the calculator is changed to the K8 state (K7 to "and" circuit 588 and N11 to "or" circuit 589 in FIGURE 10).

With the calculator in the K8 state during a D*i* operation, the Up-down Counters are stepped down at T1 time, up at T4 time, and down again at T8 time (12–8C to "or" circuit 620 in FIGURE 11). At T2 time the corresponding digit in the Accumulator is sensed (K8 to "or" circuit 528 in FIGURE 9) and entered into the Adder. At T6 time the corresponding digit in the Accumulator (but a different digit from the one sensed at T2 time because of the action of the Up-down Counters at T4 time) is again sensed (K8 to "or" circuit 528 in FIGURE 9) but is not entered into the Adder. The effect of the functions just described is to shift the digits in the Accumulator to the left one position with the action being the same as described for the M*u* operation except that the process is terminated one cycle sooner. As before, a 0 is shifted into the N1 position of the Accumulator. At the end of the cycle when the Up-down Counters have been stepped to the N0 position the calculator is again changed to the K3 state (N0 to "and" circuit 578 and 4–7A to "or" circuit 579).

With the calculator in the K3 state for the determination of the second quotient digit during the D*i* operation, the same procedure is used as for the first quotient digit. That is, the calculator is changed back and forth between the K3 and K4 states as long as the subtraction performed in the K3 state produces a positive remainder. The tentative value of the quotient digit is increased by 1 each time the calculator arrives in the K4 state. When a negative number is obtained from the subtraction in the K3 state, the calculator changes to the K5 state to restore the remainder to its last positive value. A change to the K6 state is then made to add 1 to the N11 position of the MQ Register. This N11 position acts as a counter to count the number of quotient digits determined. The calculator then again changes to the K7 and K8 states in succession to shift the numbers in the MQ Register and the Accumulator to the left one position. Another change to the K3 state is then made. This procedure is repeated until all ten quotient digits have been determined.

After ten quotient digits have been determined, the calculator will, when in the K6 state, increase the digit in the N11 position of the MQ Register from 9 to 0 with a carry. On this cycle, the Up-down Counters will not be stepped down at T8 time, but will be left at the N11 position, and the D*i* operation will be terminated (N11 and C to "and" circuit 593 and 4–6A to "or" circuit 594 in FIGURE 10).

With several of the operations, notably ADD, SUBTRACT, MULTIPLY, and DIVIDE, it is necessary that the numbers involved in the operations be of correct relative magnitude. Otherwise, an overflow will occur. In ADD, SUBSTRACT, and MULTIPLY an overflow occurs when the sum, difference, or product, respectively, exceeds ten digits. In DIVIDE the relative magnitudes of the two numbers must be such that the first quotient digit, as determined by the process which was described, is not greater than 9. If this first quotient digit is greater than 9, a carry will be obtained during the first cycle when the calculator is in the K4 state in the course of a D*i* operation. The carry generated at this time can also be termed an overflow. Circuits for the detection of overflows and for taking corrective action, such as stopping the calculator, upon the detection of an overflow are not shown in this disclosure but may easily be incorporated into the calculator by using the principles described herein in combination with means well known to the art.

Illustrative program

The procedure by which the calculator is caused to perform its operations in a useful manner will be explained by an example. In this example, two numbers are added and the sum is typed. The array of holes which are punched in a program card and a detail card are as shown in FIGURE 18. An X in a position indicates that a hole is punched in the corresponding position, and no hole is implied where no X is present. As previously explained, insofar as the principles of the invention are concerned, a hole can correspond to the manual actuation of a certain contact in each case.

The two numbers to be added have four and six digits, respectively. The four digits of the first number, 9405, are shown punched in the first four columns, respectively, of the Detail Card in FIGURE 18. The six digits of the other number, 033900, are punched in the columns number 6 through 11, respectively. The first digit, 0, of 033900 need not actually be punched, as indicated by the lack of an X in column 6 of the Detail Card. The two 0's at the right-hand end of the number must be punched as indicated in columns 10 and 11.

The various rows in the Program Card correspond to the similarly numbered PC contacts in FIGURE 14. For example, the top row, designated 12, corresponds to contact PC12, and so on. The various rows in the detail card correspond to the similarly numbered DC contacts in FIGURE 14.

The calculator is first caused to perform the operations indicated by the holes in the first column of the Program Card and Detail Card. The digit 9 in the Detail Card is first entered into the N1 position of the Input Register, which for purposes of this example may be assumed to have been previously cleared of digits, that is, set to zero. The hole in the 7 row of the first column of the Program Card causes the digit 9 from the Detail Card to be typed. Contacts 810 and solenoids 811 in FIGURE 16 come into play during the typing. The mechanism for the entry and the typing of the input digit are as explained previously.

The calculator next performs the operations indicated by the holes in the second column of the Program Card and Detail Card. The digit 9 in the N1 position of the Input Register is shifted to the N2 position, and the digit 4 from the Detail Card is entered into the N1 position. The hole in the 7 row of the second column of the Program Card causes the 4 to be typed.

For the operations indicated by the third column, the digits 9 and 4 are shifted from the N2 and N1 positions in the Input Register to the N3 and N2 positions, respectively. The digit 0 from the Detail Card is entered into the N1 position. The hole in the 7 row of the third column of the Program Card causes the 0 to be typed.

The electronic operation of NO OPERATION was performed for each of the first three columns of holes.

For the fourth column in FIGURE 18, the digits 9, 4, and 0 are shifted from the N3, N2, and N1 positions in the Input Register to the N4, N3, and N2 positions respectively. The digit 5 from the fourth column of the Detail Card is entered into the N1 position. The hole in the 7 row of the Program Card causes the 5 to be typed. Also for the fourth column, the Electronic Operation, T$i$, with an Address of 1 is performed. The T$i$ operation is selected by the holes in the 11 and 0 rows of the Program Card, and the Address of 1 is selected by the hole in the 5 row. This operation causes the number 9405 in the Input Register to be transferred to Address 1 of the Storage Unit. The T$i$ operation also causes the Input Register to be set to zero in preparation for the entry of new digits into the Input Register.

For the fifth column, no new digits are entered into the calculator from the Detail Card. The holes in the 12, 11, 0 and 1 rows of the Program Card do, however, cause the Electronic Operation, A$r$, to be performed, with 1 as the Address as controlled by the hole in the 5 row of the 5th column. This operation causes the Accumulator to be reset to zero, and the number 9405 in the Address 1 to be entered into the Accumulator. Also for the fifth column, the hole in the 8 row of the Program Card causes the typewriter carriage to be tabulated to a new position that is controlled by a tabulate stop setting on the typewriter. The tabulate stop devices are well known to the prior art and are found on most typewriters. It is assumed that before the calculator is started, the tabulate stop devices are set as desired for the proper placement of the numbers on the paper in the typewriter.

The entry of the number 03390 from columns 6 through 11 of the Detail Card proceeds in the same manner as for the entry of the number from columns 1 through 4. Also, the holes in the 7 row in columns 6 through 11 in the Program Card cause typing of the input digits in the same manner as before.

No shifting in the Input Register takes place for columns 5 and 6 by virtue of the circuit connected between terminals K1 and 558 in FIGURE 9. In the example under consideration, the lack of a hole in column 6 of the Detail Card produces the same net result as would the presence of a hole in the 0 row, that is, all digits in the Input Register remain 0.

For the eleventh column, the hole in the 12 row of the Program Card causes the operation of A$d$ to be performed with the Input Register as the Address as controlled by the holes in the 2, 3, and 5 rows. This instruction causes the addition of the number in the Input Register to the number in the Accumulator with the sum remaining in the Accumulator.

In this example it is assumed that the sum of a 4-digit number and a 6-digit number might produce a 7-digit number. Therefore 7 digits of the sum are typed. For this purpose the 7-digit number, which will be in the N7 through N1 positions of the Accumulator, is shifted to the left three positions. The number then appears in the N10 through the N4 positions, respectively. This shifting is accomplished by the L$e$ operation controlled by the hole in the 11 row of the twelfth column of the Program Card. The holes in the 4 and 5 rows of the twelfth column cause the shift to be three positions. Also, for the twelfth column, the hole in the 8 row of the Program Card causes the carriage tabulate mechanism to be actuated again to move the typewriter carriage to a new position.

For the thirteenth column, the hole in the 1 row causes the T$o$ operation to be performed. The absence of holes in the 2, 3, 4, and 5 rows causes the Address in this case to be the Accumulator. The number in the Accumulator is thereby caused to be transferred to the Output Register. The desired sum is now in the N10 through the N4 positions of the Output Register.

The holes in the 6 row of the fourteenth through twentieth columns of the Program Card cause the 7-digit number in the N10 through N4 positions of the Output Register to be typed, one digit per column.

The holes in the 6 and 8 rows of the twenty-fist column of the Program Card cause the typewriter carriage to be returned in preparation for the addition of another pair of numbers.

In the example as presented, the number 03390 will still be in the Input Register. The Input Register may be set to zero, if desired, by any of a variety of ways. One simple way is to include another T$i$ operation which transfers the number to some otherwise unused Address such as Address 2. An instruction for such a transfer could be included in any one of the columns 13 through 21 in the example.

A second pair of numbers may be added in a similar manner by using a second Detail Card with the numbers punched in the same columns as in the first Detail Card. The Program Card would be used again. The Program Card may be passed through the card reading mechanism a second time in any of several different ways known to the prior art. One way is to wrap the Program Card around a cylindrical card holding device (drum) that rotates with the holes brought into position in synchronism with the holes of the Detail Cards.

Although the calculator always handles 10-digit, plus sign, numbers in its electronic portion, numbers of smaller size may be handled insofar as the input and output devices are concerned, as is illustrated by the example which was presented. Within the calculator the digits in the unused positions are assumed to be all 0's. Therefore, the calculator, insofar as its usage is concerned, is a variable field length machine even though its electronic components appear to have fixed field length characteristics.

*Concluding remarks*

A person skilled in the art can make numerous variations, substitutions, and elaborations to the embodiment of the invention herein disclosed without departing from the spirit and scope of the invention. Some of these will be mentioned briefly.

Electronic components can be substituted for the relays. Each relay is, in effect, a binary storage device, and its contacts perform the logical functions of "and," "or," and "not" in transmitting signals from place to place within the calculator. Electronic means for accomplishing these functions are well known to the prior art, and their incorporation into the calculator can be made by a person skilled in the art. Relays are used is disclosed because, at the speeds at which the calculator is intended to operate, relays are sufficiently fast in their operation and are substantially less expensive than corresponding electronic components.

Other operations may be incorporated into the calculator, either in addition to or instead of the operations which were described. One operation that may be particularly useful is an AD TO ADDRESS operation. This operation would be the same as the ADD operation except that the number in Accumulator is added to the designated Address with the sum appearing in the designated Address instead of in the Accumulator. An ADD TO ADDRESS operation can be built into the calculator by incorporating circuits and components to perform the same functions as performed for the ADD operation except that the holes of the Address and Accumulator are interchanged.

A Storage Unit comprised of components other than magnetic cores may be used. It is sufficient that the Address Relays or their equivalent be capable of selecting an "address" along one coordinate of the Storage Unit and that the Up-down Counters be capable of controlling the selection of the digit position along the other coordinate of the Storage Unit.

Transistors may be substituted for tubes. Because of the differences in the electrical characteristics of tubes and transistors, it is not likely that the substitution could be on a direct one-to-one basis with all other items in the circuit remaining the same. However, the differences and the changes in circuit design that are needed to employ transistors instead of tubes are well known to the art. Because of the high input impedance of tubes, especially in comparison with transistors, tubes are better current amplifiers than transistors. That is, the output signal from one tube can be used to actuate the input circuits of several other tubes, even when a substantial number of diode "and" and "or" circuits are in the path from the one tube to the other tubes. For this reason, at the pulse repetition frequencies used by the calculator, a large number of relatively inexpensive diode circuits can be employed as described, and relatively few extra current amplifiers are required. The net result is that the calculator is less expensive to construct with tubes than with transistors, although with further advances in transistor technology, this situation might not always be true.

The speed of operation can be increased over the speeds mentioned.

The capacity of the Storage Unit can be increased to more than sixteen numbers. A straightforward manner of increasing the capacity would involve using more bits or holes in the Address portion of each instruction. Another way to increase the storage capacity, but without increasing the instruction size, would be to have two or more sections to the Storage Unit, with each section having a capacity of up to sixteen numbers. Then a special operation could be devised that would select the section to come into play for instructions that follow the instruction containing this special operation. The same section would come into play as called for by the following instructions until another instruction containing a special operation is encountered, at which time a different section of storage is called into play.

A switch or other contact can be inserted in series with contacts 39-1 and 33-3 in FIGURE 16 to provide for deactuation of relay R33 without using a Mechanical Operation for this purpose.

Decimal codes other than the 8-4-2-1 code may be used.

Means other than manual means or punched cards may be used to actuate the various PC and DC contacts in FIGURE 14. In fact, it is not necessary that mechanical contacts be used at all. For example, photo-electrically actuated transistors could be used.

The output device need not be a typewriter but may be any device, such as a punched paper tape unit, a magnetic tape unit, or a storage buffer unit capable of receiving one character at a time.

A serial instead of a parallel mode for the transmission of digits may be used while still employing some of the principles of this invention, although for a variation such as this, numerous alterations in the logical design would be required. Such alterations are nevertheless within the ability of a person skilled in the art.

What is claimed is:

1. A calculator comprised of storage means and calculating means where said storage means is comprised of at least three essentially identical addresses with each address being capable of storing one number, means for causing a first one of said addresses to function as and therefore be an accumulator, means for causing a second one of said addresses to function as and therefore be a multiplier register, means for causing the multiplication of the number in a third one of said addresses by the number in said multiplier register, and means for causing the product to appear in said accumulator.

2. A calculator comprised of storage means and calculating means where said storage means is comprised of at least three essentially identical addresses with each address being capable of storing one number, means for causing a first one of said addresses to function as and therefore be an accumulator, means for causing a second one of said addresses to function as and therefore be a quotient register, means for causing the division of the number in a third one of said addresses into the number in said accumulator, and means for causing the quotient to appear in said quotient register.

3. A calculator comprised of storage means and calculating means where said storage means is comprised of at least three essentially identical addresses with each address being capable of storing one number, means for causing a first one of said addresses to function as and therefore be an accumulator, means for causing a second one of said addresses to function as and therefore be a multiplier register, means for causing the multiplication of the number in a third one of said addresses by the number in said multiplier register, and means for causing the product to appear in said accumulator, and where said means for causing said multiplication includes means for causing the number is said third address to be added repeatedly into said accomulator a number of times equal to the value of the highest order digit in said multiplier register, means for shifting each digit of the partial product thus generated in said accumulator to the next higher order position is said accumulator, means for shifting each digit in said multiplier register to the next higher order position in said multiplier register, means for adding one to the digit in a preselected position in a preselected address, means for repeating said repeated addition, said shifting, and said addition of one, and means for terminating said multiplication when the digit is said preselected position has been increased to a preselected value.

4. A calculator comprised of storage means and calculating means where said storage means is comprised of at least three essentially identical addresses with each address being capable of storing one number, means for causing a first one of said addresses to function as and therefore be an accumulator, means for causing a second one of said addresses to function as and therefore be a quotient register, means for causing the division of the number in a third one of said addresses into the number in said accumulator, and means for causing the quotient to appear in said quotient register, and where said means for causing said division includes means for causing the number in said third address to be subtracted repeatedly from the number in said accumulator as many times as said subtraction leaves a positive remainder, means for generating in the lowest order position in said quotient register a quotient digit of value equal to the number of times said subtraction left a positive remainder, means for shifting each digit of the smallest positive remainder thus generated in said accumulator to the next higher order position in said accumulator, means for shifting each digit in said quotient register to the next higher order position in said quotient register, means for causing one to be added to the digit in a preselected position in a preselected address, means for repeating said repeated subtraction, said generation of a quotient digit, said shifting, and said addition of one, and means for terminating said division when the digit in said preselected position has been increased to a preselected value.

5. A calculator comprised of: (1) storage means having a plurality of essentially identical addresses with each address being capable of storing one number in a manner whereby the digits of a given order in all stored numbers are stored in the same digit position; (2) an up-down counter with means for causing the actuation of a digit position in each address in accordance with the state of said up-down counter; (3) first up-down counter input means for causing said counter to count up; (4) second up-down counter input means for causing said counter to count down; (5) means for generating at least one up-down counter signal that indicates when said counter is in a preselected state; (6) address selection means for selectively actuating any one of said addresses; (7) address selection input means for controlling the selection of the address to be actuated; (8) a one-digit adder; (9) a first digit transmission means for causing the transmission of a digit from said adder to the actuated digit position in the actuated address; (10) first digit transmission input means for actuating said first digit transmission means; (11) a second digit transmission means for causing the transmission of a digit from the actuated digit position in the actuated address to said adder; (12) second digit transmission input means for actuating said second digit transmission means; (13) means for generating at least one adder signal that indicates the value of a digit in said adder; (14) a timing pulse generator which emits timing pulses repetitively and cyclically on a plurality of timing pulse lines; (15) a multi-state control device which generates a set of state control signals on a plurality of state control lines in accordance with the state of said control device; (16) multi-state control device input means for selectively causing said multi-state control device to exist in any of its stable states; and (17) a switching network which combines said at least one up-down counter signal, said at least one adder signal, said timing pulses, said state control signals, and said operation control signals and generates signals which are transmitted to said first up-down counter input means, said second up-down counter input means, said address selection input means, said first digit transmission input means, said second digit transmission input means, and said multi-state control device input means in pre-determined sequences as required for the execution of pre-determined ones of the various operations said calculator is thus capable of executing.

References Cited by the Examiner

UNITED STATES PATENTS

| | | | |
|---|---|---|---|
| 3,034,721 | 5/1962 | Schulze | 235—160 |
| 3,102,997 | 9/1963 | Dirlss | 340—172.5 |
| 3,109,162 | 10/1963 | Wolensky | 340—172.5 |
| 3,126,475 | 3/1964 | Coddington et al. | 235—160 |
| 3,141,964 | 7/1964 | Fleisher | 235—164 |

OTHER REFERENCES

R. K. Richards: "Digital Computer Components and Circuits," Van Nostrand Co., pp. 381–392, 1957.

U. Chu: "Digital Computer Design Fundamentals," McGraw-Hill, p. 399, 1962.

ROBERT C. BAILEY, *Primary Examiner.*

MALCOLM A. MORRISON, *Examiner.*

E. M. RONEY, M. LISS, *Assistant Examiners.*